(12) United States Patent
Sai et al.

(10) Patent No.: US 8,134,737 B2
(45) Date of Patent: Mar. 13, 2012

(54) PRINTING APPARATUS AND PRINTING METHOD

(75) Inventors: Noriyuki Sai, Nagano (JP); Yasuhiro Oshima, Nagano (JP); Yoshihisa Motominami, Nagano (JP); Tomohiro Takahashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 175 days.

(21) Appl. No.: 12/484,912

(22) Filed: Jun. 15, 2009

(65) Prior Publication Data

US 2009/0303516 A1     Dec. 10, 2009

Related U.S. Application Data

(63) Continuation of application No. 10/673,360, filed on Sep. 30, 2003, now abandoned.

(30) Foreign Application Priority Data

Oct. 3, 2002   (JP) ................................ 2002-291589
Nov. 19, 2002  (JP) ................................ 2002-335048
Sep. 8, 2003   (JP) ................................ 2003-315069

(51) Int. Cl.
*G06K 15/00*   (2006.01)
*G06K 1/00*    (2006.01)
*G06F 3/12*    (2006.01)
*G03G 15/00*   (2006.01)
*H06N 1/60*    (2006.01)

(52) U.S. Cl. ...... 358/1.16; 358/1.9; 358/1.15; 358/1.17; 358/1.18; 358/1.13; 399/368; 399/369; 399/371; 399/387; 399/396

(58) Field of Classification Search .................. 399/368, 399/369, 387
See application file for complete search history.

(56) References Cited

U.S. PATENT DOCUMENTS

| | | | | |
|---|---|---|---|---|
| 4,627,707 A * | 12/1986 | Tani et al. | ..................... | 399/184 |
| 4,872,035 A | 10/1989 | Miyake et al. | | |
| 5,450,213 A * | 9/1995 | Kobori et al. | ................. | 358/450 |
| 5,465,163 A | 11/1995 | Yoshihara et al. | | |
| 5,731,879 A * | 3/1998 | Maniwa et al. | ............... | 358/296 |
| 5,767,892 A | 6/1998 | Mikami | | |
| 5,864,732 A * | 1/1999 | Kato | ............................... | 399/43 |
| 6,118,971 A * | 9/2000 | Sato et al. | ..................... | 399/368 |
| 6,164,740 A * | 12/2000 | Hirai et al. | ......................... | 347/3 |
| 6,217,143 B1 * | 4/2001 | Munakata et al. | .............. | 347/16 |
| 6,285,460 B1 | 9/2001 | Koh et al. | | |
| 6,362,870 B2 * | 3/2002 | Mui et al. | ........................ | 355/24 |

(Continued)

FOREIGN PATENT DOCUMENTS

JP    62-029367 A    2/1987

(Continued)

*Primary Examiner* — Hilina S Kassa

(57) ABSTRACT

The printing apparatus of the present invention comprises a scanner unit for reading an image in an original; an instruction unit for receiving an instruction from a user and instructing operation of reading the image with the scanner unit; and a printer unit for printing the image that has been read on a medium. In the printing apparatus of the present invention, each reading operation with the scanner unit is started by receiving an instruction from the user with the instruction unit when the reading operation is to be performed with the scanner unit for a plurality of number of times and a plurality of the images that have been read are to be printed in their respective predetermined positions on the medium. The printing apparatus makes it possible to perform N-up printing of a new procedure that is different from conventional N-up printing.

4 Claims, 29 Drawing Sheets

U.S. PATENT DOCUMENTS

| | | | |
|---|---|---|---|
| 6,370,344 B1 * | 4/2002 | Fujii et al. | 399/75 |
| 6,375,319 B1 | 4/2002 | Kamano et al. | |
| 6,407,822 B1 | 6/2002 | Ueda | |
| 6,547,355 B1 * | 4/2003 | Shimada et al. | 347/12 |
| 6,563,598 B1 | 5/2003 | Johnson et al. | |
| 6,608,978 B2 * | 8/2003 | Robertson et al. | 399/82 |
| 6,618,161 B1 * | 9/2003 | Fresk et al. | 358/1.15 |
| 6,642,943 B1 | 11/2003 | Machida | |
| 6,711,626 B1 | 3/2004 | Okada | |
| 6,757,073 B1 * | 6/2004 | Kuroda | 358/1.2 |
| 6,795,210 B1 * | 9/2004 | Fujiwara | 358/1.18 |
| 6,963,412 B1 * | 11/2005 | Toda | 358/1.13 |
| 7,062,190 B2 * | 6/2006 | Miyamoto | 399/81 |
| 7,203,364 B2 | 4/2007 | Yamazaki | |
| 7,206,095 B2 * | 4/2007 | Nakayama et al. | 358/1.18 |
| 7,359,073 B2 * | 4/2008 | Uemura | 358/1.14 |
| 7,463,370 B2 * | 12/2008 | Yada et al. | 358/1.1 |
| 7,532,350 B2 * | 5/2009 | Takahashi et al. | 358/1.16 |
| 7,583,395 B2 * | 9/2009 | Ohtsu | 358/1.14 |
| 2001/0042086 A1 | 11/2001 | Ueda et al. | |
| 2004/0212825 A1 | 10/2004 | Sai et al. | |
| 2008/0259377 A1 | 10/2008 | Sai et al. | |
| 2009/0303516 A1 | 12/2009 | Sai et al. | |

FOREIGN PATENT DOCUMENTS

| | | |
|---|---|---|
| JP | 5-199382 A | 8/1993 |
| JP | 6-183095 A | 7/1994 |
| JP | 11-157169 A | 6/1999 |
| JP | 11-254781 A | 9/1999 |
| JP | 2000-127548 A | 5/2000 |
| JP | 2000-332951 | 11/2000 |
| JP | 2001-096871 A | 4/2001 |
| JP | 2002-091994 A | 3/2002 |
| JP | 2002-247382 A | 8/2002 |
| JP | 2002-335395 A | 11/2002 |
| JP | 2003-087448 A | 3/2003 |
| JP | 2003-274147 | 9/2003 |
| JP | 2004-167782 A | 6/2004 |

* cited by examiner

| Paper type | Quality mode |
|---|---|
| Plain paper | Economy |
|  | Fast |
|  | Fine |
| Super fine paper | Fast |
|  | Fine |
| Glossy paper | Fine |
| PM photographic paper | Fine |
| PM matte paper | Fine |

Fig. 6

PRINTING APPARATUS AND PRINTING METHOD

The present application is a continuation application of U.S. application Ser. No. 10/673,360, filed on Sep. 30, 2003, which claims priority upon Japanese Patent Application No. 2002-291589, filed Oct. 3, 2002, Japanese Patent Application No. 2002-335048, filed Nov. 19, 2002, and Japanese Patent Application No. 2003-315069, filed Sep. 8, 2003. All of these applications are herein incorporated by reference.

BACKGROUND OF THE INVENTION

1. Field of the Invention

The present invention relates to printing apparatuses and printing methods capable of printing a plurality of images on predetermined positions of a medium.

2. Description of the Related Art

Printing modes for printing a plurality of images on one sheet of paper (referred to as N-up printing modes below) are known. Conventionally, when the user executes the N-up printing mode, N-up printing is completed according to one print start instruction if the user makes settings instructing to perform N-up printing.

Incidentally, multifunction apparatuses that comprise a scanner unit (also referred to as a scanner section) for reading images from originals, and a printer unit (also referred to as a printer section) for printing on paper are known.

SUMMARY OF THE INVENTION

The present invention relates to N-up printing modes in such multifunction apparatuses.

That is, the printing apparatus of the present invention comprises a scanner unit for reading an image in an original; an instruction unit for receiving an instruction from a user and instructing operation of reading the image with the scanner unit; and a printer unit for printing the image that has been read on a medium. In the printing apparatus of the present invention, each reading operation with the scanner unit is started by receiving an instruction from the user with the instruction unit when the reading operation is to be performed with the scanner unit for a plurality of number of times and a plurality of the images that have been read are to be printed in their respective predetermined positions on the medium.

Further, another printing apparatus of the present invention comprises a scanner unit for reading an image in an original; and a printer unit for printing the image that has been read on a medium. In the printing apparatus of the present invention, when the reading operation is to be performed with the scanner unit for a plurality of number of times and a plurality of the images that have been read are to be printed in their respective predetermined positions on the medium, the printer unit starts printing, on the medium, the image that has already been read before the scanner unit finishes the plurality of number of times of the reading operations.

Features and objects of the present invention other than the above will become clear by reading the description of the present specification with reference to the accompanying drawings.

BRIEF DESCRIPTION OF THE DRAWINGS

FIG. 6 is an explanatory diagram showing quality modes.

Figure 1:
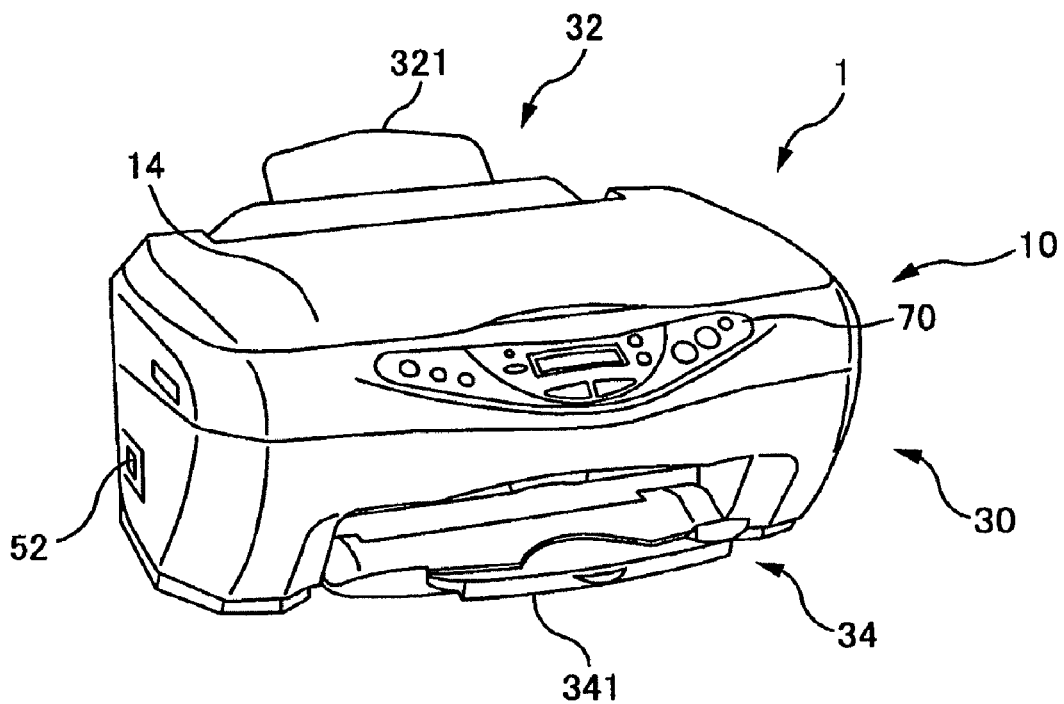
FIG. 1 is a perspective view showing a schematic configuration of a printing apparatus according to the present embodiment.

The description below and the accompanying drawings are to be referred to for complete understanding of the present invention and its advantages.

DESCRIPTION OF PREFERRED EMBODIMENTS

At least the following matters are made clear by the description of the present specification and the accompanying drawings.

A printing apparatus comprises: a scanner unit for reading an image in an original; an instruction unit for receiving an instruction from a user and instructing operation of reading the image with the scanner unit; and a printer unit for printing the image that has been read on a medium, wherein each reading operation with the scanner unit is started by receiving an instruction from the user with the instruction unit when the reading operation is to be performed with the scanner unit for a plurality of number of times and a plurality of the images that have been read are to be printed in their respective predetermined positions on the medium.

Such a printing apparatus makes it possible to perform N-up printing of a new procedure that is different from conventional N-up printing.

In the printing apparatus, it is preferable that the printing apparatus does not comprise an automatic paper supply device. In this way, it is possible to provide a printing apparatus that is low in cost.

In the printing apparatus, it is preferable that before the scanner unit finishes the plurality of number of times of the reading operations, the printer unit starts printing, on the medium, the image that has already been read. In this way, it is possible to increase the speed in printing.

In the printing apparatus, it is preferable that the printer unit: carries the medium intermittently and performs printing on the medium between the intermittent carries; brings the intermittent carrying into a standby state before printing of the image that has already been read is finished; restarts the intermittent carrying after the next reading operation is started; and carries the medium maintaining a carry amount of the medium constant before and after the standby state. In this way, since the intermittent carrying can be performed at a constant carry amount, the images printed on the medium become uniform and it is possible to perform printing with high image quality.

In the printing apparatus, it is preferable that the printer unit has a plurality of nozzles that move; and when the plurality of nozzles move after the next reading operation is started, a portion of the image that has been read before the standby state and a portion of the image that has been read after the standby state are printed on the medium by the plurality of nozzles. In this way, it becomes possible to print, at the same time, a portion of the image that has been read before the standby state and a portion of the image that has been read after the standby state. That is, it is possible to print the joining section between images at the same time.

In the printing apparatus, it is preferable that when there is an instruction to stop printing during the standby state, the printer unit: finishes printing the image that has already been read; and discharges the medium. In this way, it is possible to print the image that has already been read.

In the printing apparatus, it is preferable that the printer unit carries the medium intermittently and performs printing on the medium between the intermittent carries; the printer unit performs printing until printing of the image that has already been read is finished; and if the next reading operation has not started when printing of the image that has already been read is finished, the printer unit brings the intermittent carrying into a standby state until the next reading operation is started. In this way, it is possible to prevent the images from deteriorating due to the difference in the printing states (for example, the way in which the ink dries) before and after standby.

In the printing apparatus, it is preferable that the printing apparatus allows the number of the images that are to be printed on the medium to be changed; and a number of the images that are read before printing is started differs according to the number of the images that are to be printed on the medium. In this way, for example, the number of images that are read before printing is started for 2-up printing (printing of two images on one sheet of medium) and the number of images that are read before printing is started for 4-up printing (printing of four images on one sheet of medium) are different.

In the printing apparatus, it is preferable that the printer unit has nozzles that move in a moving direction; and if a plurality of the images are to be positioned in the medium along the moving direction, the printer unit starts printing after the scanner unit performs the reading operation for all of the images that are arranged along the moving direction. In this way, printing is started when image data necessary for the nozzles are ready when the nozzles are moved.

In the printing apparatus, while the scanner unit is performing the reading operation, the printer unit starts printing the image in the original that is being read by that reading operation. In this way, the print speed increases.

In the printing apparatus, it is preferable that the printer unit is capable of printing, on the medium, the images according to different print modes; and when the plurality of images that have been read are to be printed in their respective predetermined positions on the medium, the printer unit is capable of printing, on the medium, each of the images according to a different print mode. In this way, since the print mode can be changed for each page in the medium, it is possible to enhance the flexibility in expression of printing on the medium.

In the printing apparatus, it is preferable that the printer unit is capable of printing, on the medium, the images according to a monochrome print mode and a color print mode. In this way, since changing between the monochrome print mode and the color print mode becomes possible for each page in the medium, it is possible to enhance the flexibility in expression of printing on the medium.

In the printing apparatus, it is preferable that the different print modes are quality modes that differ in print resolution. In this way, since the resolution can be changed for each page in the medium, it is possible to enhance the flexibility in expression of printing on the medium.

In the printing apparatus, it is preferable that the instruction unit has members for selecting the print modes, each member being provided for each print mode; and the instruction unit receives the instruction from the user through the members. For example, a color copy button for selecting the color print mode and a monochrome copy button for selecting the monochrome print mode are provided, and starting of the reading operation of the scanner section is instructed when these buttons are pressed. In this way, since the member for selecting the print mode and the member for instructing the reading operation to start can be shared, it is possible to reduce the apparatus cost.

In the printing apparatus, it is preferable that the printer unit is capable of printing, on the medium, the images according to different print modes; and when the plurality of images that have been read are to be printed in their respective predetermined positions on the medium, the printer unit prints, on the medium, each of the images according to the same print mode. In this way, it is possible to simplify user operations and improve usability.

In the printing apparatus, it is preferable that the instruction unit selects the print mode for printing the images on the medium when it receives an instruction from the user. In this way, the user can instruct the reading operation and select the print mode with the instruction unit.

In the printing apparatus, it is preferable that when the plurality of images that have been read are to be printed in their respective predetermined positions on the medium, other images are printed on the medium according to the print mode that has been initially selected. In this way, it is possible to simplify user operations and improve usability.

In the printing apparatus, it is preferable that it further comprises a notification device that provides notification of an error, wherein the notification device provides notification of an error if a print mode that is different from the initially selected print mode is selected when the reading operation is performed for a second time and thereafter. In this way, it is possible to call the user's attention.

In the printing apparatus, it is preferable that it further comprises a display device, wherein the display device displays information about the initially selected print mode when the reading operation is performed for a second time and thereafter. In this way, it is possible to call the user's attention.

In the printing apparatus, it is preferable that the same print mode as the initially selected print mode is selected regardless of the print mode selected when the reading operation is performed for a second time and thereafter. In this way, it is possible to prevent errors from occurring.

In the printing apparatus, it is preferable that the instruction unit has members for selecting the print modes, each member being provided for each print mode; and the instruction unit receives the instruction from the user through the members. For example, a color copy button for selecting the color print mode and a monochrome copy button for selecting the monochrome print mode are provided, and starting of the reading operation of the scanner section is instructed when these buttons are pressed. In this way, since the member for selecting the print mode and the member for instructing the reading operation to start can be shared, it is possible to reduce the apparatus cost.

A printing method comprises: instructing a reading operation when an instruction is received from a user; reading an image in an original according to the instruction to perform the reading operation; and printing the image that has been read on a medium, wherein each reading operation is started by receiving an instruction from the user when the reading operation is to be performed for a plurality of number of times and a plurality of the images that have been read are to be printed in their respective predetermined positions on the medium.

Such a printing method makes it possible to perform N-up printing of a new procedure that is different from conventional N-up printing.

A printing apparatus comprises: a scanner unit for reading an image in an original; and a printer unit for printing the image that has been read on a medium, wherein when the reading operation is to be performed with the scanner unit for a plurality of number of times and a plurality of the images that have been read are to be printed in their respective predetermined positions on the medium, the printer unit starts printing, on the medium, the image that has already been read before the scanner unit finishes the plurality of number of times of the reading operations.

Such a printing apparatus makes it possible to increase the speed in printing.

First Embodiment

Schematic Configuration of Printing Apparatus

Figure 2:
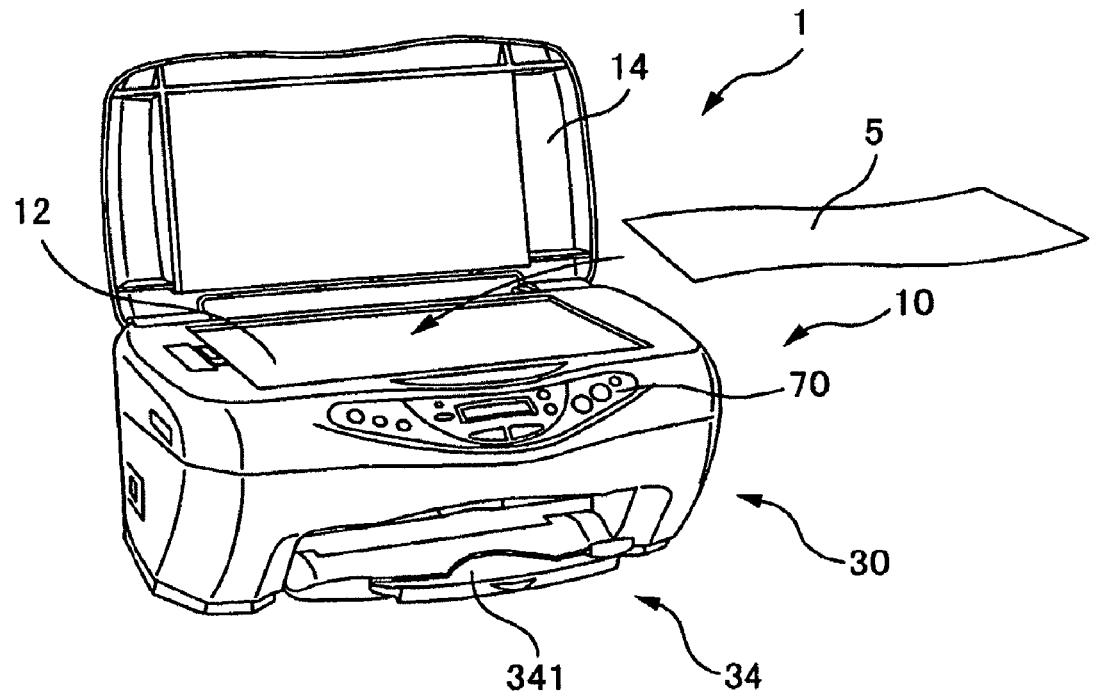
FIG. 2 is a perspective view showing a state in which a cover of a scanner section is opened.
Figure 3:
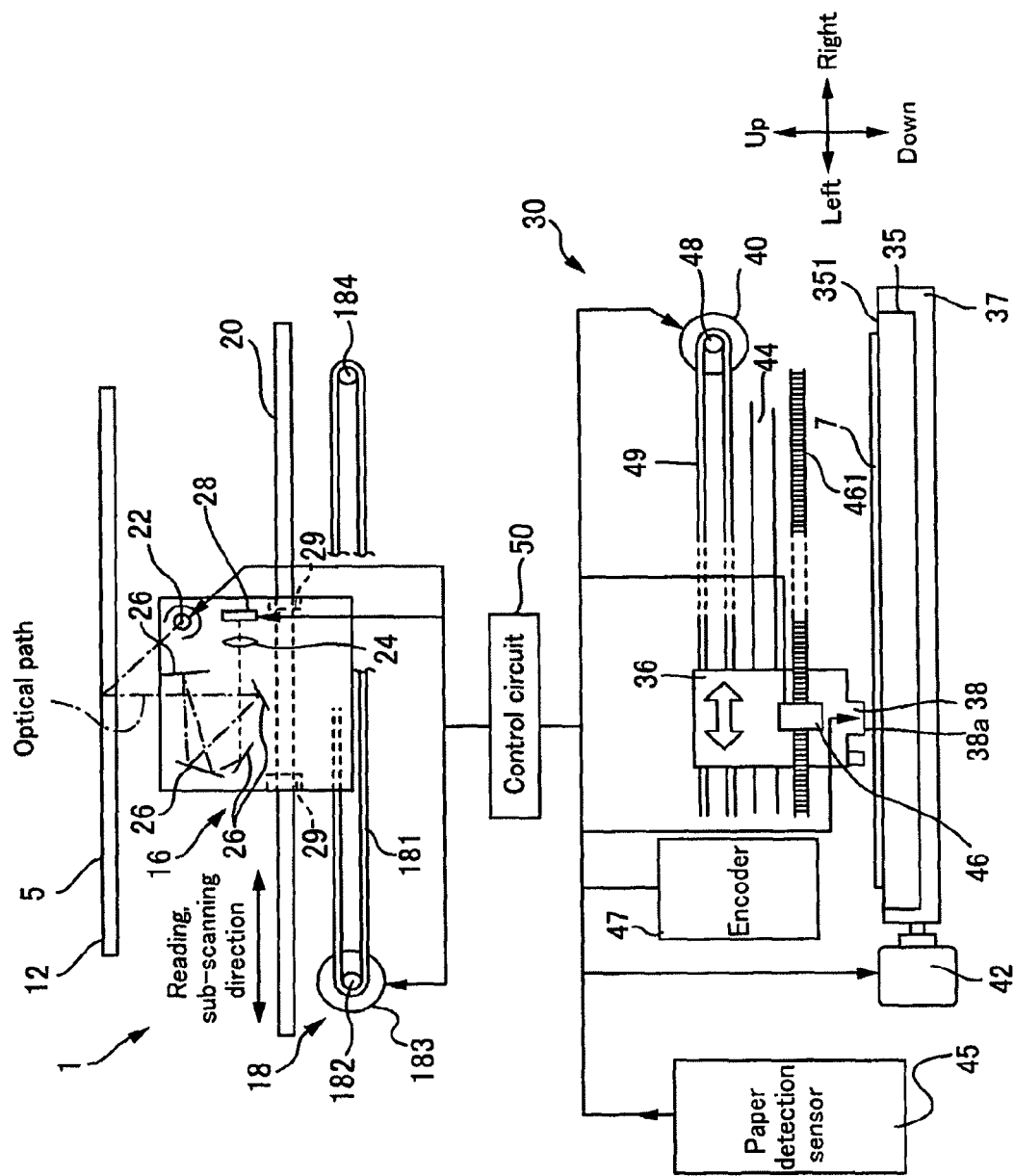
FIG. 3 is an explanatory diagram showing an internal configuration of the printing apparatus.
Figure 4:
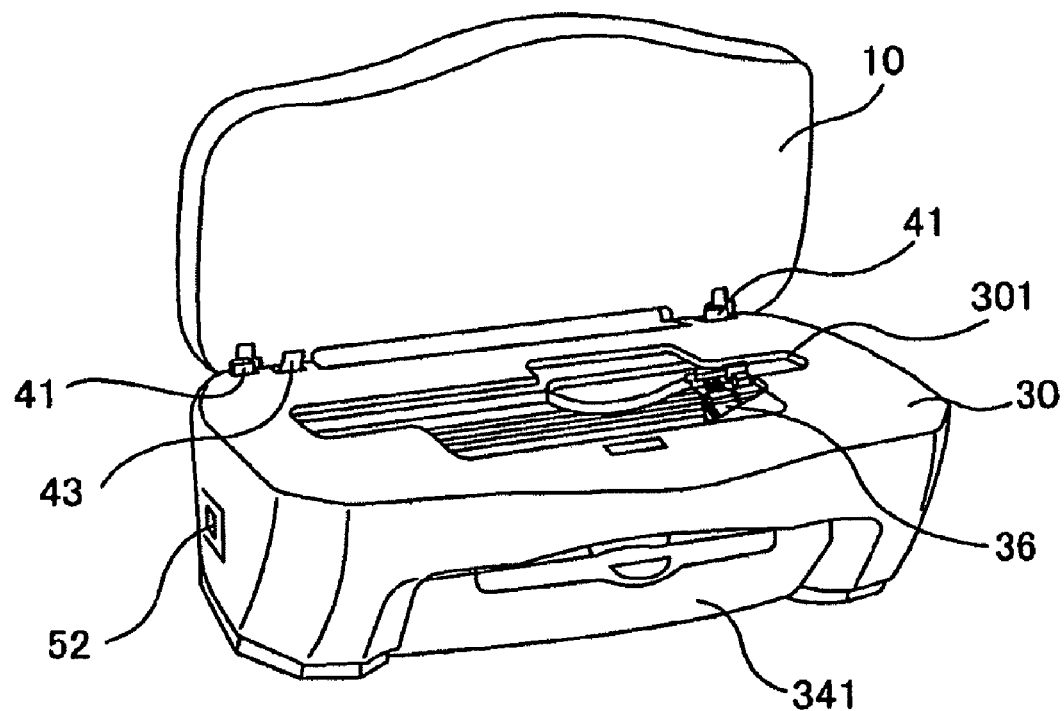
FIG. 4 is a perspective view showing a state in which the inside of a printer section is exposed externally.
Figure 5:
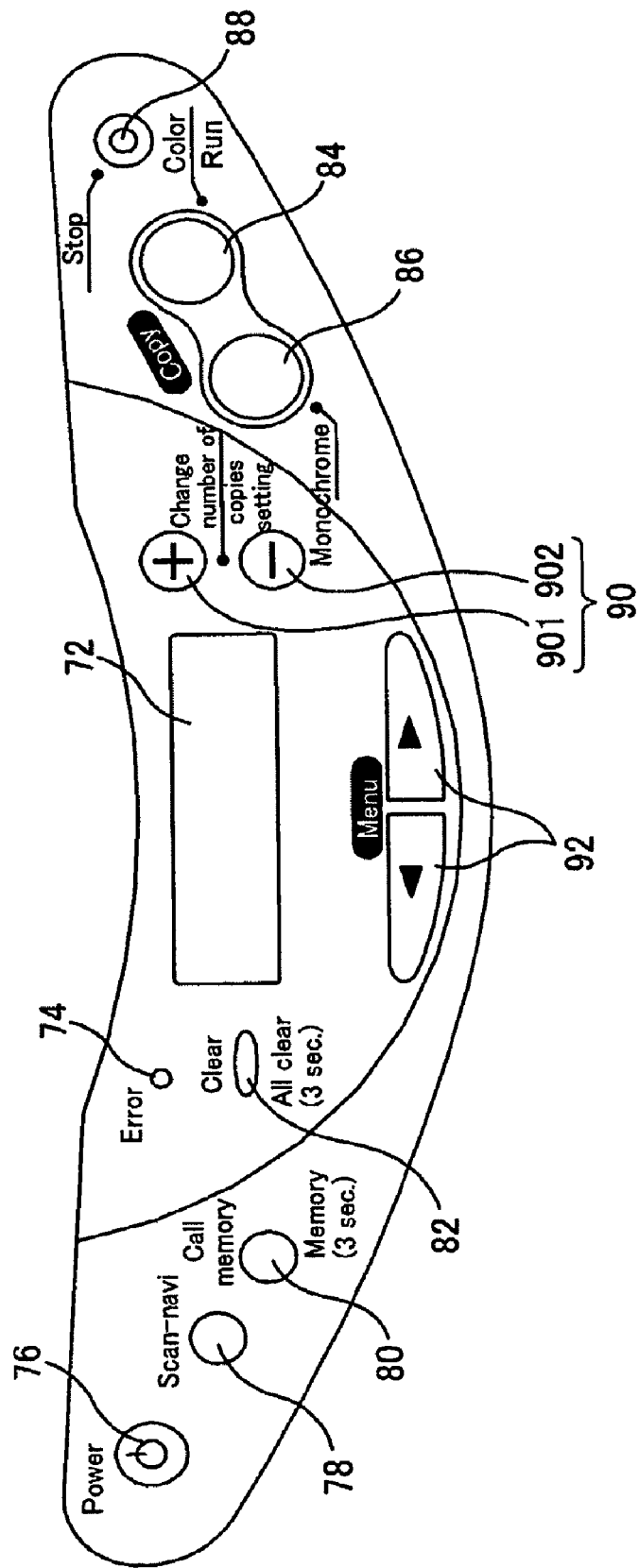
FIG. 5 is a diagram showing an example of a control panel section.

A schematic configuration of a printing apparatus according to the present embodiment is described with reference to FIG. 1 through FIG. 5. FIG. 1 is a perspective view showing a schematic configuration of a printing apparatus according to the present embodiment, FIG. 2 is a perspective view showing a state in which a cover of a scanner section 10 is opened, FIG. 3 is an explanatory diagram showing an internal configuration of the printing apparatus, FIG. 4 is a perspective view showing a state in which the inside of a printer section is exposed externally, and FIG. 5 is a diagram showing an example of a control panel section. The printing apparatus of the present embodiment is a scanner/printer/copier multifunction apparatus (referred to as an SPC multifunction apparatus below) that has the function as a scanner for inputting an original image, the function as a printer that prints an image on a medium (also referred to as a medium to be printed or a print-recording medium) such as paper according to image data, and the function as a local copier that prints, on paper and so forth, the image input by the scanner function, for example.

The SPC multifunction apparatus 1 has a scanner section 10 for reading an image of an original 5 and inputting it as image data, a printer section 30 that prints an image on a medium, such as paper, according to the image data, a control circuit 50 that manages control of the entire SPC multifunction apparatus 1, and a control panel section 70 serving as input means. Under control of the control circuit 50, the scanner function, the printer function, and the local-copier function for printing the data input from the scanner section 10 with the printer section 30 are achieved.

The scanner section 10 is arranged above the printer section 30, and on the upper portion of the scanner section 10 are provided an original bed glass 12 for placing the original 5 to be read, and an original bed cover 14 that covers the original bed glass 12 when the sheet-like original 5 is being read or when the apparatus is not in use. The original bed cover 14 is formed to be openable and closable and also has the function of pressing the original placed on the original bed glass 12 toward the original bed glass 12 when the cover is closed. Further, on the rear side of the SPC multifunction apparatus 1 is provided a paper supply section 32 for supplying paper 7 to the printer section 30. On the front side, a paper discharge section 34 where the printed paper 7 is discharged is provided on the lower side, and the control panel section 70, serving as the input means, is provided on the upper side. The control circuit 50 is built into the printer section 30.

The paper discharge section 34 is provided with a paper discharge tray 341 that is capable of closing the paper discharge opening when the apparatus is not in use. The paper supply section 32 is provided with a paper supply tray 321 that holds cut paper (not shown). The medium used for printing is not limited to single-sheet print paper such as cut paper, but it may be continuous print paper such as roll paper, and the SPC multifunction apparatus 1 may have a paper supply structure that enables it to print on roll paper.

As shown in FIG. 4, the printer section 30 and the scanner section 10 are coupled by hinge mechanisms 41 at the rear side, and the unitized scanner section 10 is raised from the front side about the turning section of the hinge mechanisms 41. In a state in which the scanner section 10 is raised, the configuration is such that the inside of the printer section 30 is exposed externally from an opening 301 provided on the upper portion of a cover that covers the printer section 30. By making the inside of the printer section 30 be exposed externally in this way, the configuration enables, for example, easy exchange of ink cartridges and so forth and handling of a paper jam.

Further, a power source section for the present SPC multifunction apparatus 1 is provided on the side of the printer section 30, and a power supply cable 43 for supplying power to the scanner section 10 is provided close to the above-mentioned hinge mechanism 41. Furthermore, the SPC multifunction apparatus 1 is provided with a USB interface 52 for enabling images to be output to a host computer 3 by the scanner function as well as the image data sent from the host computer 3 to be output by the printer function.

===Configuration of Control Panel Section 70===

As shown in FIG. 5, the control panel section 70 is provided with a liquid crystal display 72 at approximately the center thereof and a notification lamp 74. The liquid crystal display 72 is capable of displaying thirty two characters, i.e., two lines by sixteen columns, and is capable of displaying, for example, setting items, setting states, or operation states using characters. The notification lamp 74 that is located on the side of the liquid crystal display 72 is a red LED and notifies the user of occurrence of errors by lighting up when an error occurs.

On the left of the liquid crystal display 72 are provided a power button 76, a scan-start button 78, a setting-display button 80, and a clear button 82. The power button 76 is the button for turning the power of the present SPC multifunction apparatus 1 ON and OFF. The scan-start button 78 is the button for causing the scanner section 10 to start reading the original 5 in a state in which the SPC multifunction apparatus 1 is connected to the host computer 3. The setting-display button 80 is the button for making the liquid crystal display 72 display the setting states for the copying function that have been set by the user. The clear button 82 is the button for resetting the settings for the copying function in order to change the setting items to their default values.

On the right of the liquid crystal display 72 are provided a color copy button 84, a monochrome copy button 86, a stop button 88, and number-of-copies-setting buttons 90.

The color copy button 84 is the button for starting color copying, and the monochrome copy button 86 is the button for starting monochrome copying. Therefore, these copy buttons 84, 86 serve both as to instructing the copy operation to start and as selecting means (a selecting unit) for selecting whether the print image to be output is in color or monochrome. Specifically, by pressing either one of the copy buttons 84, 86, print mode information that specifies by which of the print modes—either color printing or monochrome printing—printing is performed is generated, and an input signal including this information is sent to a CPU 54. It should be noted that the print mode information is used for the N-up printing process, which is the characteristic matter of the present invention described later. The stop button 88 is the button for stopping the copying operation that has started.

The number-of-copies-setting buttons 90 are made up of two buttons 901, 902, each having a "+" or a "−" written on its surface. By pressing the "+" button 901, the setting of the number of sheets increases, and by pressing the "−" button 902, the setting of the number of sheets decreases. Further, the number-of-copies-setting buttons 90 are set so that the number successively increases or decreases when one of them is continuously pressed, that the increase or decrease speed becomes faster as the amount of time pressed becomes longer.

On the front side of the liquid crystal display 72 are provided menu buttons 92 for changing the setting items displayed on the liquid crystal display 72. The menu buttons 92 are made up of two buttons arranged on the right and left, each having a rightward arrow or a leftward arrow written thereon. Every time either the right or left one of the menu buttons 92 is pressed, the displayed setting items sequentially change according to a predetermined order, and after all the items have been displayed once, the first setting item is displayed. The left and right arrows are for changing the order in which the setting items are displayed, and each button 92 allows the setting items to be displayed in the order opposite to the displaying order for when the other button is pressed. As with the number-of-copies-setting buttons 90, these menu buttons 92 are also set so that the changing speed becomes faster by continuously pressing them.

With these menu buttons 92, it is possible to set a quality mode for each type of paper. The quality mode relates to the image quality of the image printed on the paper; that is, by selecting the quality mode, the print resolution for when printing is performed by the printer section 30 is mainly determined.

Figure 7:
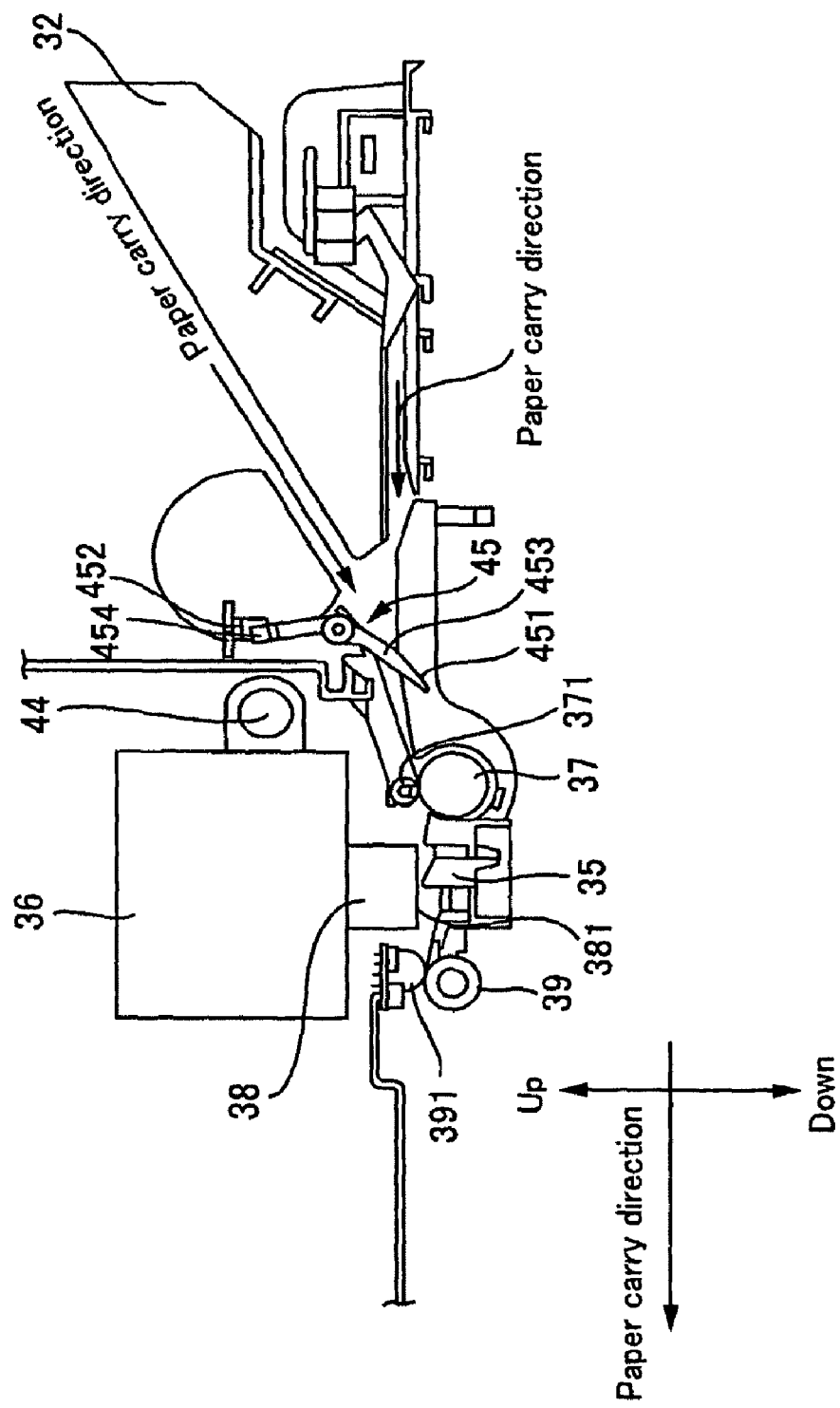
FIG. 7 is an explanatory diagram showing an arrangement of the surroundings of a print head.

FIG. 7 exemplifies the quality modes provided for the SPC multifunction apparatus 1 of the present embodiment. For example, as for plain paper, three types of quality modes—"economy", "fast", and "fine"—can be selected, and as for super-fine paper, two types of modes—"fast" and "fine"—can be selected. Further, as for glossy paper, PM photo paper, and PM matte paper, which usually require higher image quality than the plain paper etc., the quality mode "fine" is provided for each. The user appropriately operates the menu buttons 92 while looking at the liquid crystal display 72 to input the quality mode. Then, quality mode information generated according to this input is sent to the CPU 54 along with the input signal generated by operating the above-mentioned copy buttons.

===Configuration of Scanner Section 10===

The scanner section 10 includes the original bed glass 12 on which the original 5 is placed, the original bed cover 14 for pressing the surface to be read of the original 5, which is placed on the original bed glass 12, toward the original bed glass 12, a reading carriage 16 that is opposed to the original across the original bed glass 12 and that scans along the original 5 while maintaining a constant distance from the original 5, drive means 18 for making the reading carriage 16 scan, and a restriction guide 20 for making the reading carriage 16 scan in a stable state.

The reading carriage 16 includes an exposure lamp 22 serving as a light source for illuminating the original 5 across the original bed glass 12, a lens 24 for concentrating the light reflected from the original 5, four mirrors 26 for guiding the light reflected from the original 5 to the lens 24, a CCD sensor 28 for receiving the reflected light that has passed through the lens, and guide receiving sections 29 that engage with the above-mentioned restriction guide 20.

The CCD sensor 28 includes three linear sensors in which photodiodes for converting light signals into electric signals are arranged in rows, and these three linear sensors are arranged parallel to each other. The CCD sensor 28 includes three, not-shown filters for R (red), G (green), and B (blue); a filter for a different color is provided for each linear sensor. Each linear sensor detects the light component corresponding to the color of the filter. For example, the linear sensor with the R filter detects the intensity of the red light component. The three linear sensors are arranged in a direction (referred to as the main-scanning direction below) that is approximately orthogonal to the moving direction of the reading carriage 16 (referred to as the sub-scanning direction below).

The length of the CCD sensor 28 is sufficiently shorter than the width of the original 5 (the length in the main-scanning direction) that is readable. Therefore, the image made by the reflected light from the original 5 is reduced in size by the lens 24 and then formed on the CCD sensor 28. That is, the lens 24 placed between the original 5 and the CCD sensor 28 is arranged close to the CCD sensor 28. Further, the distance between the original 5 and the lens 24 needs to be long, and a long optical path length is required. Therefore, in order to secure the distance between the original 5 and the lens 24 in the limited space of the reading carriage 16 that scans, the light is reflected on the four mirrors 26 to secure the long optical path length.

The reflected light from the original 5 is reflected by the four mirrors 26, passes through the lens 24, and reaches the CCD sensor 28; however, since the three linear sensors are arranged in parallel, the positions on the original from which the reflected light that forms an image on each linear sensor at the same time was reflected are misaligned, in the sub-scanning direction, by an amount equal to the width of each linear sensor. Therefore, a scanner control unit 58 (FIG. 11) of the control circuit 50 performs interline correction processing for correcting this misalignment. The interline correction processing is described later.

The above-mentioned restriction guide 20 is provided in the sub-scanning direction and is formed of a cylindrical material made of stainless steel. The restriction guide 20 passes through the two guide receiving sections 29 that are provided on the reading carriage 16 and that are formed of thrust bearings. By widening the distance, in the sub-scanning direction, between the two guide receiving sections 29 provided on the reading carriage 16, it becomes possible to cause the reading carriage 16 to scan stably.

The drive means 18 includes an annular timing belt 181 fixed to the reading carriage 16, a pulse motor 183 that has a pulley 182 engaging with the timing belt 181 and that is arranged on one end in the sub-scanning direction, and an idler pulley 184 that is arranged on the other end and that applies tension force to the timing belt 181. The pulse motor 183 is driven by the scanner control unit 58 (FIG. 11) of the control circuit 50; according to the scan speed of the reading carriage 16 which is changed according to the speed of the pulse motor 183, it becomes possible to enlarge or reduce, in the sub-scanning direction, the image that has been read.

The scanner section 10 causes the reading carriage 16 to move along the original 5 while illuminating the original 5 with the light of the exposure lamp 22 and forming an image on the CCD sensor 28 with the reflected light. At this time, by reading-in, according to a predetermined cycle, the amounts of light received by the CCD sensor 28 as values in voltage, the image for the distance for which the reading carriage 16 moved during one cycle is taken in as data for one line of an image to be output. At this time, three kinds of data—the R component, the G component, and the B component—are taken in as data for one line.

===Configuration of Printer Section 30===

The printer section 30 adopts the inkjet method.

It uses four colors—cyan (C), magenta (M), yellow (Y), and black (K)—as basic colors and forms color images by ejecting these color inks onto a medium, such as print paper, to form dots. It should be noted that, other than the above-mentioned four colors, light cyan (pale cyan, LC), light magenta (pale magenta, LM), and dark yellow (dim yellow, DY) may be used.

Further, the printer section 30 can perform single-color printing for outputting monochrome images using only black (K) color ink. Whether to output a color image or a monochrome image is based on binary data obtained after binarization processing; the binary data will be described later.

Figure 8:
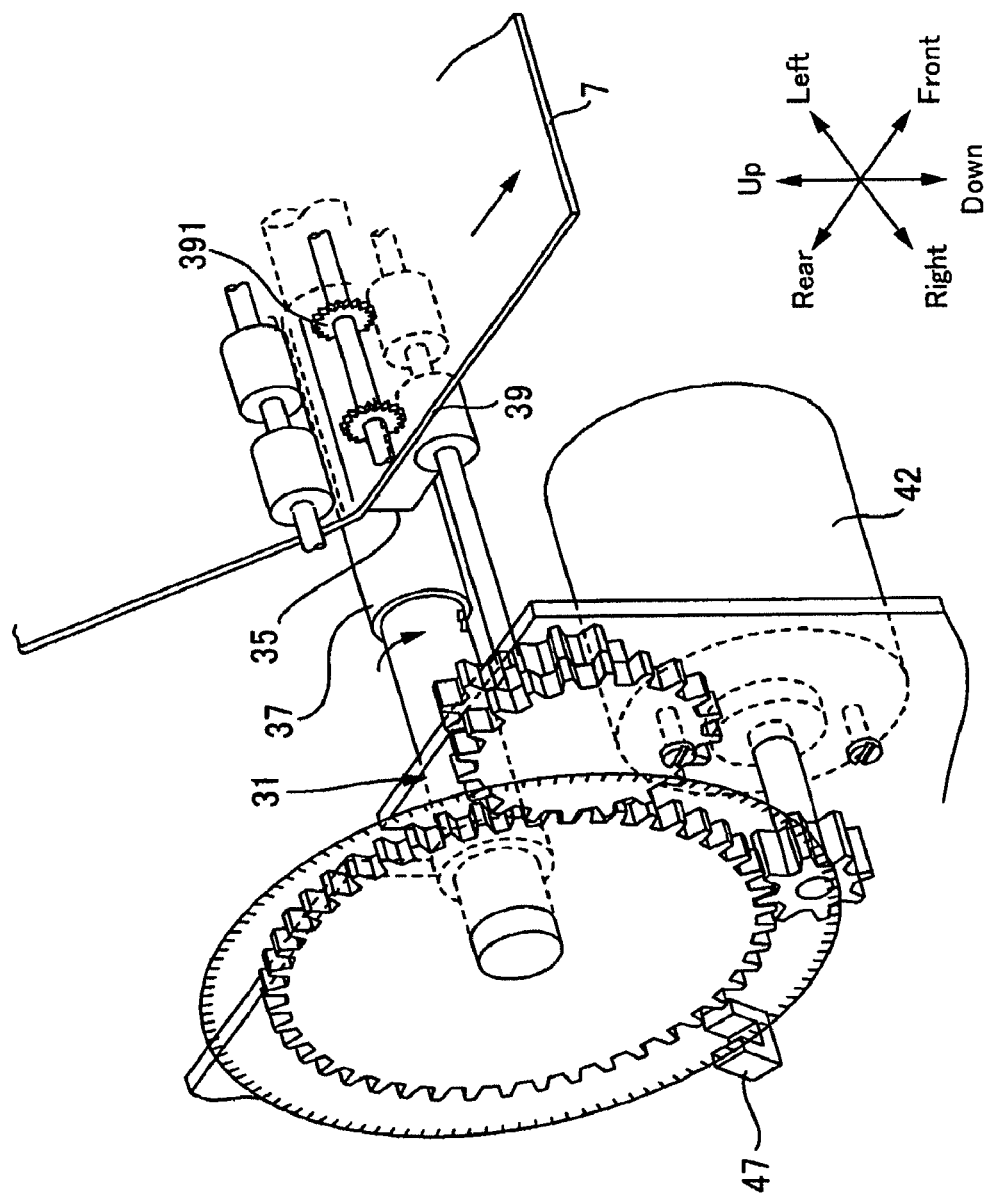
FIG. 8 is an explanatory diagram for illustrating a drive section of a print paper carry mechanism.

Next, with reference to FIG. 3, FIG. 7, and FIG. 8, the printer section 30 is described. FIG. 7 is an explanatory diagram showing the arrangement of the surroundings of the print head, and FIG. 8 is an explanatory diagram for illustrating a drive section of a print paper carry mechanism.

As shown in the figures, the printer section 30 has a mechanism for ejecting ink and forming dots by driving a print head 38 mounted on a writing carriage 36, a mechanism for causing the writing carriage 36 to move back and forth in a direction orthogonal to the direction in which the paper 7 is carried by a carriage motor 40, and a mechanism for carrying the paper 7 supplied from the paper supply tray 321 (see FIG. 1) by the paper feed motor (referred to also as a PF motor below) 42.

The mechanism for ejecting ink and forming dots includes the print head 38 that has a plurality of nozzles serving as ink ejecting sections, and causes predetermined nozzles to eject ink according to print command signals. The plurality of nozzles form rows in the bottom surface 381 of the print head 38 in the carry direction of the paper 7, and the plurality of rows are arranged in the direction orthogonal to the carry direction of the paper 7. Details on the print head 38 and the nozzle arrangement will be described later. The print head 38 includes a 16-bit memory associated with each of the nozzles; data is transferred from a head control unit 68 (FIG. 11), which is described later, to each nozzle in 16-bit units.

The mechanism for causing the writing carriage 36 to move back and forth includes the carriage motor (referred to also as a CR motor below) 40 for driving the writing carriage 36, a slide shaft 44 that is provided in the direction orthogonal to the carry direction of the paper 7 and that slidably holds the writing carriage 36, a linear encoder 46 fixed to the writing carriage 36, a linear encoder code plate 461 in which slits are formed at predetermined intervals, a pulley 48 that is attached to a rotating shaft of the carriage motor 40, and a timing belt 49 that is driven by the pulley 48.

The print head 38 and a cartridge mounting section integrally provided with the print head 38 are fixed to the writing carriage 36, and ink cartridges containing inks of black (K), cyan (C), magenta (M), yellow (Y), and so forth are mounted on the cartridge mounting section.

The mechanism that carries the paper 7 supplied from the paper supply tray 321 has a platen 35 that is arranged opposed to the above-mentioned print head 38 and that serves as a guiding member for guiding the paper 7 so that distance between the paper 7 and the print head 38 is appropriate, a carry roller 37 that is provided upstream from the platen 35 in the carry direction of the paper 7 and that carries the supplied paper 7 to the platen 35 so that the paper comes into contact with the platen at a predetermined angle, a paper discharge roller 39 that is provided downstream from the platen 35 in the carry direction of the paper 7 and that is for carrying and discharging the paper 7 that has disengaged from the carry roller 37, the PF motor 42 for driving the carry roller 37 and the paper discharge roller 39, a rotary encoder 47 for detecting the amount for which the paper 7 has been carried, and a paper detection sensor 45 for detecting the presence of the paper 7 and the front end and the rear end of the paper 7.

The carry roller 37 is provided underneath the carry path of the paper 7, and a driven roller 371 for holding the paper 7 is provided above and in opposition to the carry roller 37. The paper discharge roller 39 is also provided underneath the carry path of the paper 7, and a driven roller 391 for holding the paper 7 is provided above and in opposition to the paper discharge roller 39. However, the driven roller 391 arranged in opposition to the paper discharge roller 39 is a roller that is made of a thin plate and that has fine teeth on its periphery, and thus, the roller 391 is structured so that ink is not scraped even when the roller comes into contact with the surface of the printed paper 7.

Further, the position at which the carry roller 37 and the paper 7 contact each other is arranged so that it is higher than the position at which the platen 35 and the paper 7 contact each other. That is, the paper 7 carried from the carry roller 37 comes into contact with the platen 35 at a predetermined angle and is further carried. In this way, the paper 7 is carried along a later-described guide surface 351 of the platen 35 in such a manner that it is pressed against the guide surface 351. Therefore, the platen 35 maintains the paper 7 in a suitable position from the nozzles, and thus it is possible to obtain a satisfactory image.

Further, the carry roller 37 and the paper discharge roller 39 are linked through a gear train 31, and are made to rotate through transmission of the rotation of the PF motor 42; the speed at which both rollers 37, 39 carry the paper 7 is the same.

In opposition to the bottom surface 381 of the print head 38, that is, the surface with the nozzles, the platen 35 has the guide surface 351 that guides the paper 7 through contact therewith. This guide surface 351 is formed to be narrower than the area of the bottom surface 381 of the print head 38 in which the nozzles are provided, and therefore, some of the nozzles positioned furthest upstream and furthest downstream in the carry direction of the paper 7 are not placed in opposition to the platen 35. In this way, the ink ejected outside the paper 7 is prevented from adhering to the platen 35 when the front end and the rear end of the paper 7 are printed, and the back surface of paper 7 that is carried later on is prevented from getting smeared. More specifically, the platen 35 is not arranged in the positions opposing the nozzles at the upstream end and the downstream end, but rather, there is a space in those positions. Those space portions are provided with ink receivers at a position lower than the guide surface 351 of the platen 35 to collect the unnecessary ink and keep the inside of the printer from getting smeared.

The paper detection sensor 45 is arranged upstream from the carry roller 37 in the carry direction, and has a lever 451 that has an axis of swinging in a position higher than the carry path of the paper 7, and a transmission type optical sensor 452 that is provided above the lever and that has a light emitting section and a light receiving section. The lever 451 is arranged so that it hangs down into the carry path under its own weight, and includes an actuating section 453 that is made to swing by the paper 7 supplied from the paper supply tray 321 and a light-blocking section 454 that is located on the opposite side of the actuating section 453 across the axis of swinging and that is arranged to pass between the light emitting section and the light receiving section. In the paper detection sensor 45, when the lever 451 is pushed by the supplied paper 7 and the paper 7 reaches a predetermined position, the light-blocking section 454 blocks the light that has been emitted from the light emitting section, and thereby, it is detected that the paper 7 has reached the predetermined position. Then, when the paper 7 is carried by the carry roller 7 and the rear end of the paper 7 passes by, the lever 451 hangs down under its own weight, the light-blocking section 454 comes out from between the light emitting section and the light receiving section so that the light from the light emitting section is received by the light receiving section, and it is detected that the rear end of the paper 7 reached the predetermined position. In this way, it is detected that the paper 7 is present at least in the carry path while the light-blocking section 454 is blocking the light from the light emitting section.

===Regarding the Configuration of the Nozzles===

Figure 9:
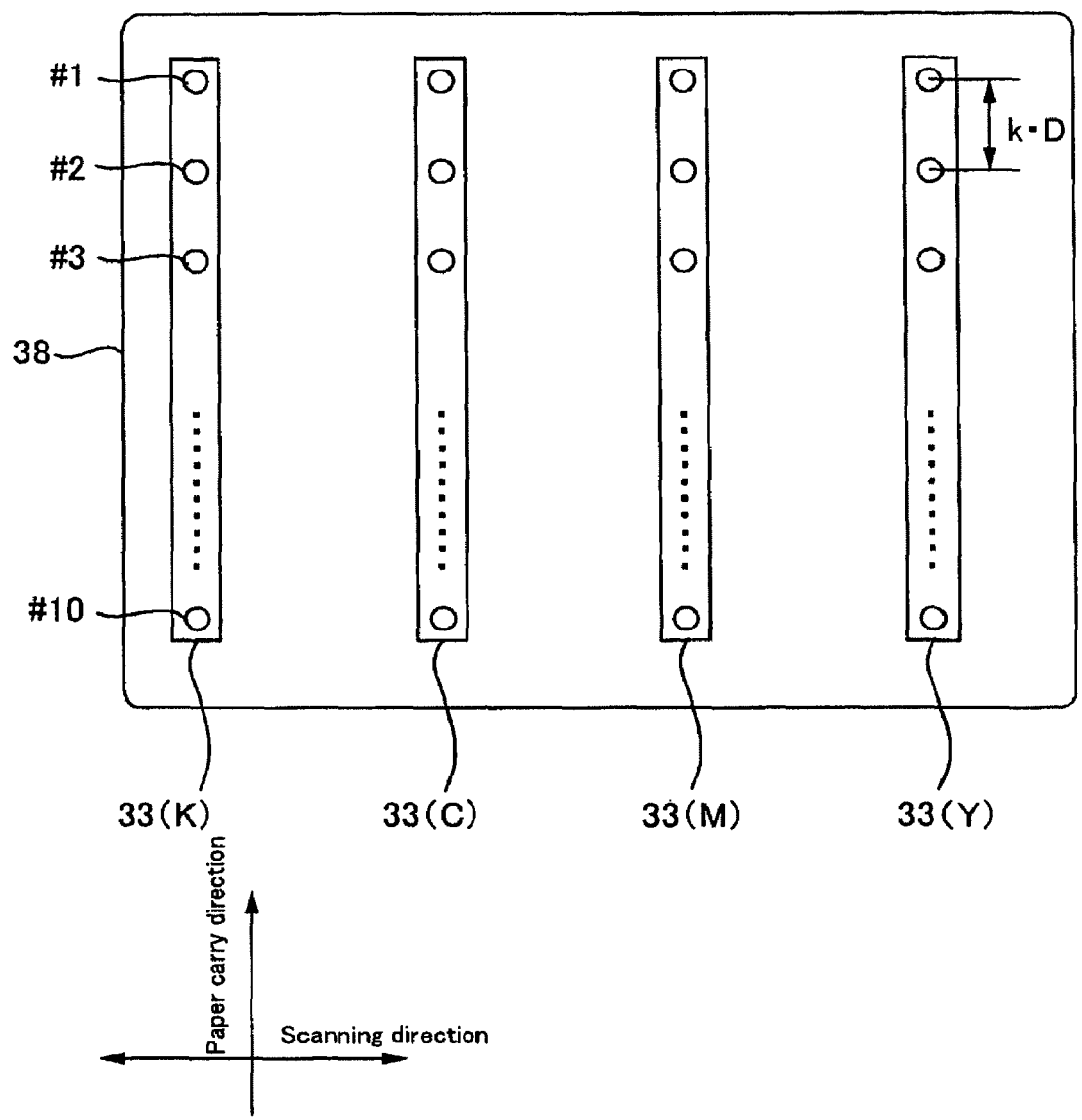
FIG. 9 is an explanatory diagram showing an arrangement of nozzles.

FIG. 9 is an explanatory diagram showing the arrangement of nozzles in the bottom surface 381 of the print head 38. In the bottom surface 381 of the print head 38 are formed a black ink nozzle row 33(K), a cyan ink nozzle row 33(C), a magenta ink nozzle row 33(M), and a yellow ink nozzle row 33(Y). Each nozzle row 33 has a plurality of nozzles (ten in the present embodiment) that are the ejection openings for ejecting ink of each color.

The plurality of nozzles in each nozzle row 33 are aligned in the paper carry direction at regular intervals (nozzle pitch: k·D). Here, D is the minimum dot pitch in the paper carry direction (that is, it is the distance between dots formed on the paper 32 at the highest resolution), and for example, when the resolution is 720 dpi, D is $1/720$ inch (approximately 35.3 μm). Further, k is an integer of 1 or more.

Further, as for the nozzles in each nozzle row 33, nozzles located further downstream have smaller numbers attached to them, and each of the nozzles is referred to as the first nozzle N1 through the tenth nozzle N10. Each nozzle is provided with a piezo element (not shown) as an actuation element for actuating each nozzle to make it eject ink droplets.

It should be noted that, during printing, the paper 7 is intermittently carried by the carry roller 37 and the paper discharge roller 39 by a predetermined carry amount F, and during this intermittent carrying, the writing carriage 36 is moved in the scanning direction and ink droplets are ejected from each of the nozzles.

===Actuating the Print Head===

Figure 10:
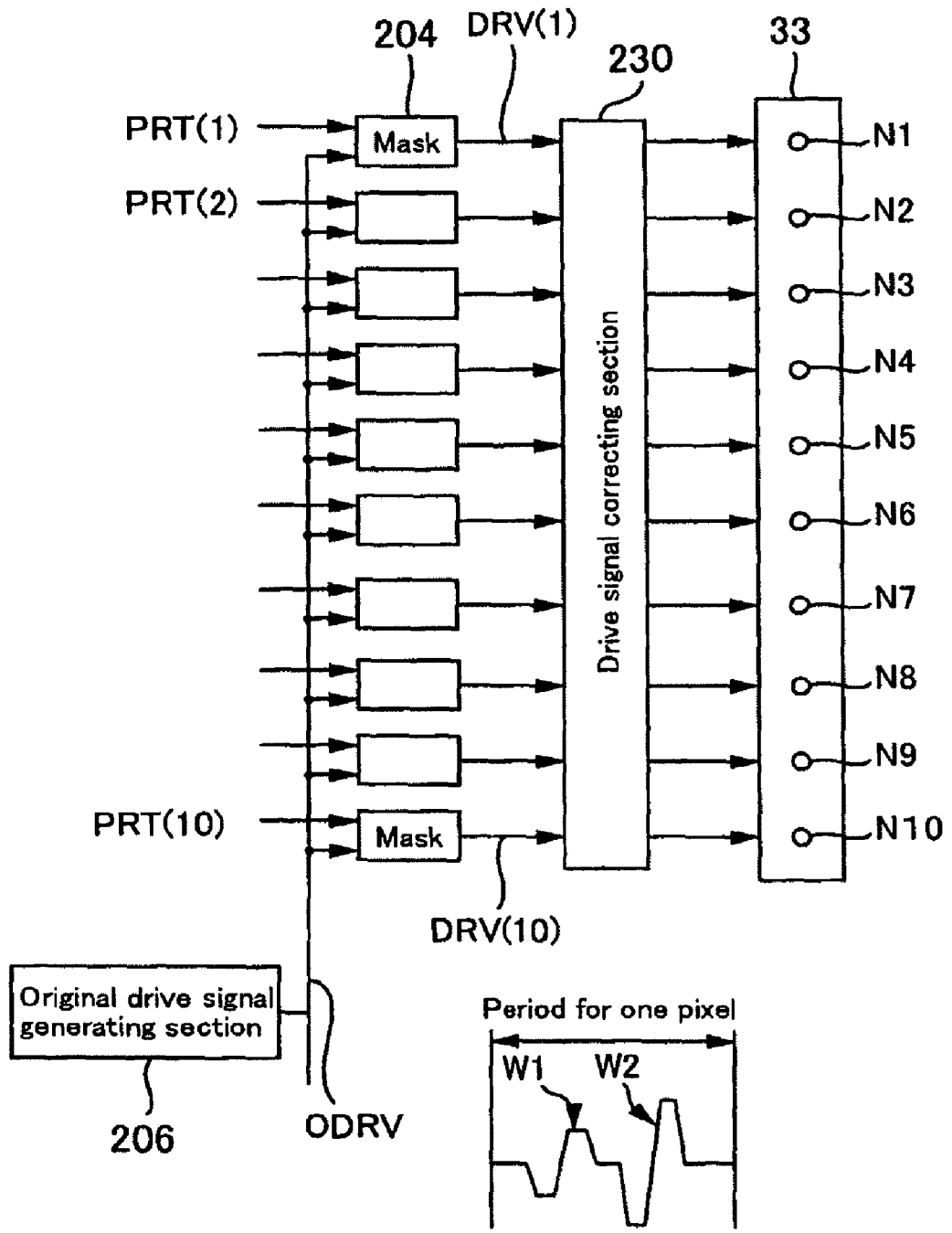
FIG. 10 is a block diagram showing a configuration of a drive signal generating section.
Figure 11:
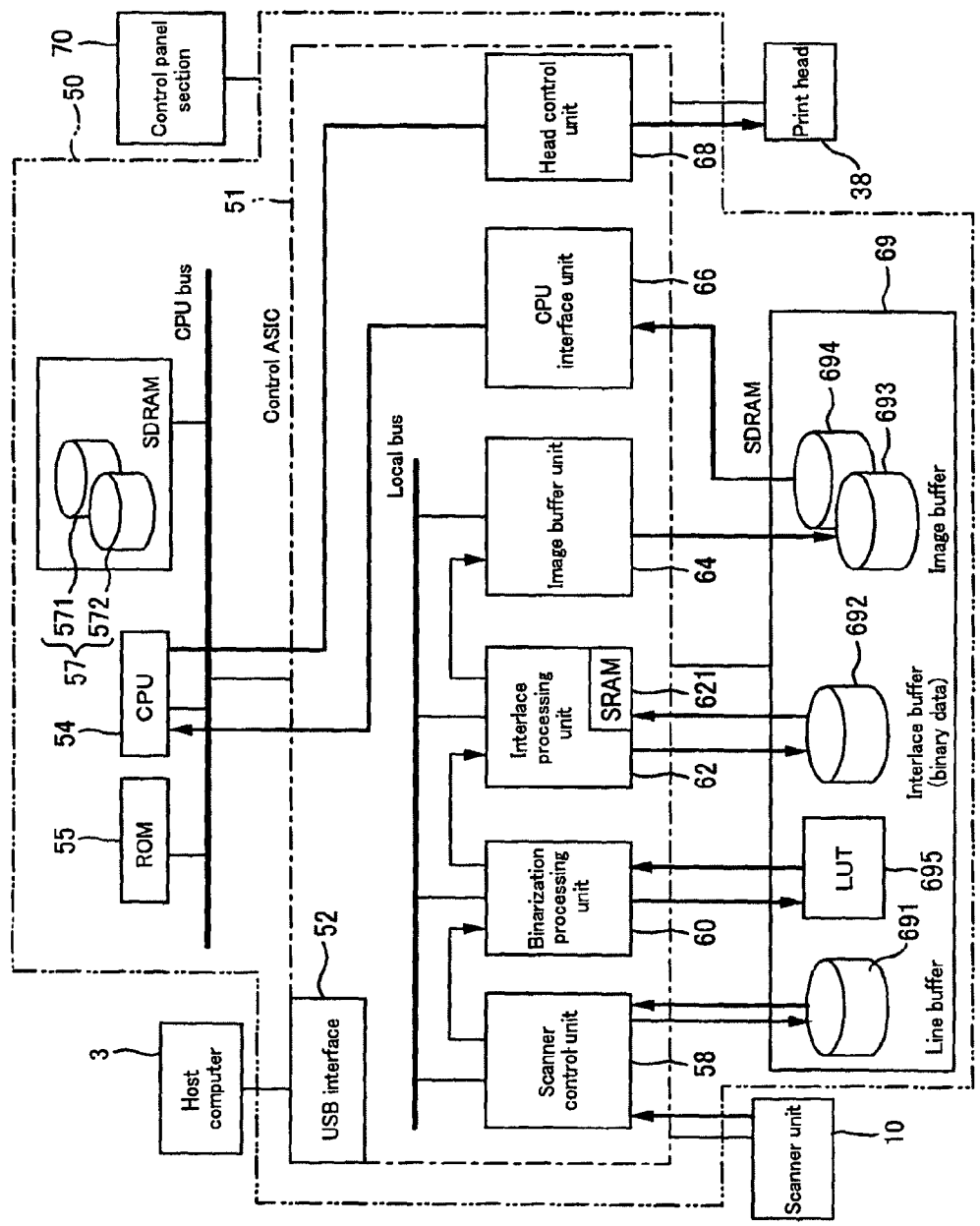
FIG. 11 is a block diagram showing an example of a control circuit.

Next, the actuation of the print head 38 is described below with reference to FIG. 10. FIG. 10 is a block diagram showing the configuration of a drive signal generating section provided in the head control unit 68 (FIG. 11).

In FIG. 10, the drive signal generating section includes a plurality of mask circuits 204, an original drive signal generating section 206, and a drive signal correcting section 230. The mask circuits 204 are provided corresponding to each of the plurality of piezo elements for actuating each of the nozzles N1 through N10 of the print head 38. Note that in FIG. 10, the number in parentheses attached to the end of each signal name indicates the number of the nozzle to which the signal is supplied. The original drive signal generating section 206 generates original drive signals ODRV used in common among the nozzles N1 through N10. The original drive signal ODRV is a signal that includes two pulses—a first pulse W1 and a second pulse W2—during the main scan period for one pixel. The drive signal correcting section 230 performs correction by shifting, either forward or backward for the whole return pass, the timing of the drive signal waveform that has been shaped by each mask circuit 204. By correcting the timing of the drive signal waveform, the misalignment between the positions at which the ink droplets land during the forward pass and the return pass is corrected; that is, the misalignment between the positions at which the dots are formed during the forward pass and the return pass is corrected.

As shown in FIG. 10, input serial print signals PRT(i) are input to the mask circuits 204 along with the original drive signal ODRV that is output from the original drive signal generating section 206. The serial print signal PRT(i) is a serial signal made of two bits per pixel, and each bit corresponds to the first pulse W1 and the second pulse W2, respectively.

Each mask circuit 204 is a gate for masking the original drive signal ODRV according to the level of the serial print signal PRT(i). That is, if the serial print signal PRT(i) is at level 1, the mask circuit 204 lets the corresponding pulse of the original drive signal ODRV pass right through so that the pulse is supplied to the piezo element as a drive signal DRV, whereas if the serial print signal PRT(i) is at level 0, the mask circuit 204 cuts off the corresponding pulse of the original drive signal ODRV.

===Internal Structure of the Control Circuit 50===

FIG. 10 is a block diagram showing an example of a control circuit 50.

In the control circuit 50 of the SPC multifunction apparatus 1, the CPU 54 that manages the control over the entire SPC multifunction apparatus 1, a ROM 55 that stores a program for executing the control, the control ASIC 51 that manages the control over the scanner function, the printer function, and the local copier function, an SDRAM 56 in which data is directly readable and writable from the CPU 54, and the control panel section 70 serving as the input means are connected via a bus. The scanner unit 10, the print head 38, the ASIC-SDRAM 69 in which data is directly readable and writable from the control ASIC 51, and so forth, are connected to the control ASIC 51.

The control ASIC 51 includes the scanner control unit 58, a binarization processing unit 60, an interlace processing unit 62, an image buffer unit 64, a CPU interface unit (referred to as a CPUIF unit below) 66, the head control unit 68, the USB interface (referred to as a USBIF below) 52 serving as input/output means for the external host computer 3, and drivers for each of the motors, lamps, and so forth, that the scanner section 10 and the printer section 30 comprise. Further, a line buffer 691, an interlace buffer 692, and an image buffer 693 are allocated to the control-ASIC-SDRAM 69. In order to achieve increased data transfer rate, so-called burst transmission, in which the data transfer unit is 64 bit, is adopted between the control ASIC 51 and the ASIC-SDRAM 69.

The scanner control unit 58 has the function of executing control over the exposure lamp 22, the CCD sensor 28, the pulse motor 183 serving as a reading carriage drive motor, and so forth, of the scanner section 10, and the function of sending the data read in via the CCD sensor 28 to the binarization processing unit 60 via the line buffer 691.

The binarization processing unit 60 has the function of converting the multi-gradation RGB data, which has been sent, into either binary data for each color in CMYK or binary data only for K and sending the data to the interlace processing unit 62. Whether the RGB data is to be converted into data of either the binary data for each color in CMYK or the binary data only for K is determined according to the above-mentioned print mode information that has been entered through operation of the copy buttons of the control panel section 70. That is, the RGB data is accompanied with the print mode information entered through operation of the copy buttons. If the print mode information is for the color printing mode, the RGB data is converted into the binary data for CMYK, and if it is for the monochrome printing mode, the RGB data is converted into binary data for K.

The interlace processing unit 62 has the function of generating overlap-printing-compliant data (referred to as OL-compliant data below) by dividing the CMYK data for one raster line into data for printing per each scan movement of the writing carriage 36, when so-called overlapped printing is performed in which one raster line (a line in the main-scanning direction in a print image) is printed with several number of times of scan movements of the writing carriage 36. The generated OL-compliant data is stored in the interlace buffer 692 of the ASIC-SDRAM 69.

Further, the interlace processing unit 62 has the function of reading out the data stored in the interlace buffer 692 onto an SRAM 621 in the interlace processing unit 62 in units of predetermined size, rearranging the data on the SRAM 621 so as to associate the data with the nozzle arrangement, and sending the data to the image buffer unit 64.

The image buffer unit 64 has the function of generating, from the data sent from the interlace processing unit 62, head-drive data for causing each nozzle to eject ink per each scan movement of the writing carriage 36.

The CPUIF unit 66 has the function of enabling the CPU 54 to access the control-ASIC-SDRAM 69 connected to the control ASIC 51. In the present control circuit 50, the unit 66 is used when the head control unit 68 is actuated according to the head-drive data generated by the image buffer unit 64.

The head control unit 68 has the function of actuating the print head 38 according to the head-drive data under control of the CPU 54 to make the nozzles eject ink.

===Data Flow in Control Circuit 50===

<As for when Functioning as a Scanner>

A command signal instructing to read an image with the scanner unit 10 and read-information data such as the read resolution and the read area are sent from the host computer 3 connected to the USBIF 52 of the control ASIC 51 to the control circuit 50. In the control circuit 50, the scanner control unit 58 is controlled by the CPU 54 according to the image-read command signal and the read-information data, and reading of the original 5 with the scanner unit 10 is started.

At this time, in the scanner control unit 58, a lamp drive unit, a CCD drive unit, a reading carriage scan drive unit, and so forth, are actuated, and RGB data is read from the CCD sensor 28 according to a predetermined cycle. The RGB data having been read in is temporarily stored in the line buffer 691 allocated to the ASIC-SDRAM 69, subjected to interline correction processing for each R, G, and B data, and sent to the host computer 3 via the USBIF 52. Interline correction processing is a process for correcting the misalignment among the reading positions for the R, G, and B linear sensors, which occurs due to the structure of the scanner section 10.

Describing in detail, the CCD sensor 28 that the scanner unit 10 has is a color sensor and has one line of linear sensor each for the three colors, R (red), G (green), and B (blue). Since these three linear sensors are arranged parallel to each other in the scanning direction of the reading carriage 16, the reflected light, which was illuminated on the same line in the original 5, cannot be received at the same time. That is, when the reflected light, which was illuminated on the same line in the original 5, is received by each of the linear sensors, there will be a time lag. Therefore, the process is for synchronizing the pieces of data that are sent delayed by a delay time that occurs due to the arrangement of the linear sensors.

<As for when Functioning as a Printer>

When the apparatus functions as a printer, the image data to be printed is input through the USBIF 52 after being converted, in a printer driver of the host computer 3 connected to the USBIF 52 of the control ASIC 51, into head-drive data that can be printed by the printer section 30 of the SPC multifunction apparatus 1. The head-drive data is data that provides signals for actuating the print head 38; for example, when printing is performed according to the interlace mode, the head-drive data is made by extracting raster data that corresponds to the print resolution and the pitch and number of nozzles of each nozzle row 33 in the writing carriage 36, and rearranging the raster data in the order to be printed per each scan movement of the writing carriage 36. It should be noted that, when printing is performed according to the interlace mode, the nozzle pitch (the distance between the nozzles) is wider than the distance between the dots formed on the paper.

The head-drive data is stored in an image buffer 57 that is allocated to the SDRAM 56 which is directly readable from the CPU 54. The image buffer 57 has two memory areas each having a capacity capable of storing head-drive data for printing with one scan movement of the writing carriage 36. When data for one scan movement is written into one image buffer 571, the data is transferred to the head control unit 68. When the image data in one image buffer 571 is transferred to the head control unit 68, head-drive data to be used for printing during the next scan movement is stored in the other image buffer 572. Then, when the data for one scan movement is written into the other image buffer 572, the data is transferred to the head control unit 68, and image data is written into the above-mentioned first image buffer 571. In this way, printing is performed by writing and reading the head-drive data alternately using two image buffers 571, 572 and actuating the print head 38 with the head control unit 68.

<As for when Functioning as a Copier>

Next, the data flow for when the apparatus functions as a copier is described. Here, only the data flow for the normal copying operation is described, and the 2-up printing mode of the present embodiment will be described later.

The data having been read in by the scanner unit 10 is taken into the line buffer 691 via the scanner control unit 58. The RGB data taken into the line buffer 691 is successively subjected to the above-mentioned RGB interline correction processing, and the RGB data corresponding to the same line are sent from the scanner control unit 58 to the binarization processing unit 60.

The RGB data sent into the binarization processing unit 60 is subjected to halftone processing. Then, with reference to a lookup table (LUT) 695 stored in the control-ASIC-SDRAM 69, the data is converted into either the binary data for each color in CMYK or the binary data for only K based on the print mode information accompanying the RGB data, and then the data is sent into the interlace processing unit 62.

As for the above-mentioned binary data sent into the interlace processing unit 62, the whole data for each raster line is divided into pieces of data to be printed per every scan movement of the writing carriage 36 according to the designated interlace mode. For example, when one raster line is formed with two scan movements of the writing carriage 36, the whole data for each raster line is divided into data for forming the odd-numbered dots, counted from the end of the raster line, and data for forming the even-numbered dots to generate the OL-compliant data. The OL-compliant data is burst transmitted to the interlace buffer 692 in units of 64 bits and stored there.

Further, the interlace processing unit 62 reads out the data stored in the interlace buffer 692 in units of predetermined size, and burst transmits the data to the SRAM 621 in the interlace processing unit 62.

At this time, the OL-compliant data is read out from the interlace buffer 692 in correspondence with the nozzle arrangement of the print head 38 according to the print resolution and the nozzle pitch. For example, when the print resolution is 720 dpi and the nozzle pitch is $1/180$ inch, three raster lines will be printed between two raster lines that have been printed with adjacent nozzles. Therefore, data for every four raster lines is read out from the OL-compliant data as data corresponding to a scan movement of the writing carriage 36.

The transferred data is rearranged on the SRAM 621 so that it corresponds to the nozzle arrangement, and is sent to the image buffer unit 64.

The image buffer unit 64 burst transmits, to the image buffer 693, the image data that has been blocked into small pieces according to the capacity of the SRAM 621, and stores the data in proper orientation so that it becomes the head-drive data for making each of the nozzles eject ink per every scan movement of the writing carriage 36. Memory areas for storing head-drive data for two scan movements of the writing carriage 36 are allocated to the image buffers 693, 694. Every time head-drive data for one scan movement is stored, the CPU 54 sends it out to the head control unit 68, and head-drive data corresponding to the next scan movement starts to be written into the memory area provided for another scan movement. This process is the same as the process of the image buffers described above in the description of the printer function.

Under control of the CPU 54, the head-drive data for each scan movement stored in the image buffers 693, 694 is read into the CPU 54 via the CPUIF unit 66 and transferred to the head control unit 68 by the CPU 54. The head control unit 68 actuates the print head 38 according to the head-drive data to print the image.

===N-Up Printing Mode of the Present Embodiment===

Below, N-up printing is described, taking 2-up printing as an example.

Figure 12:
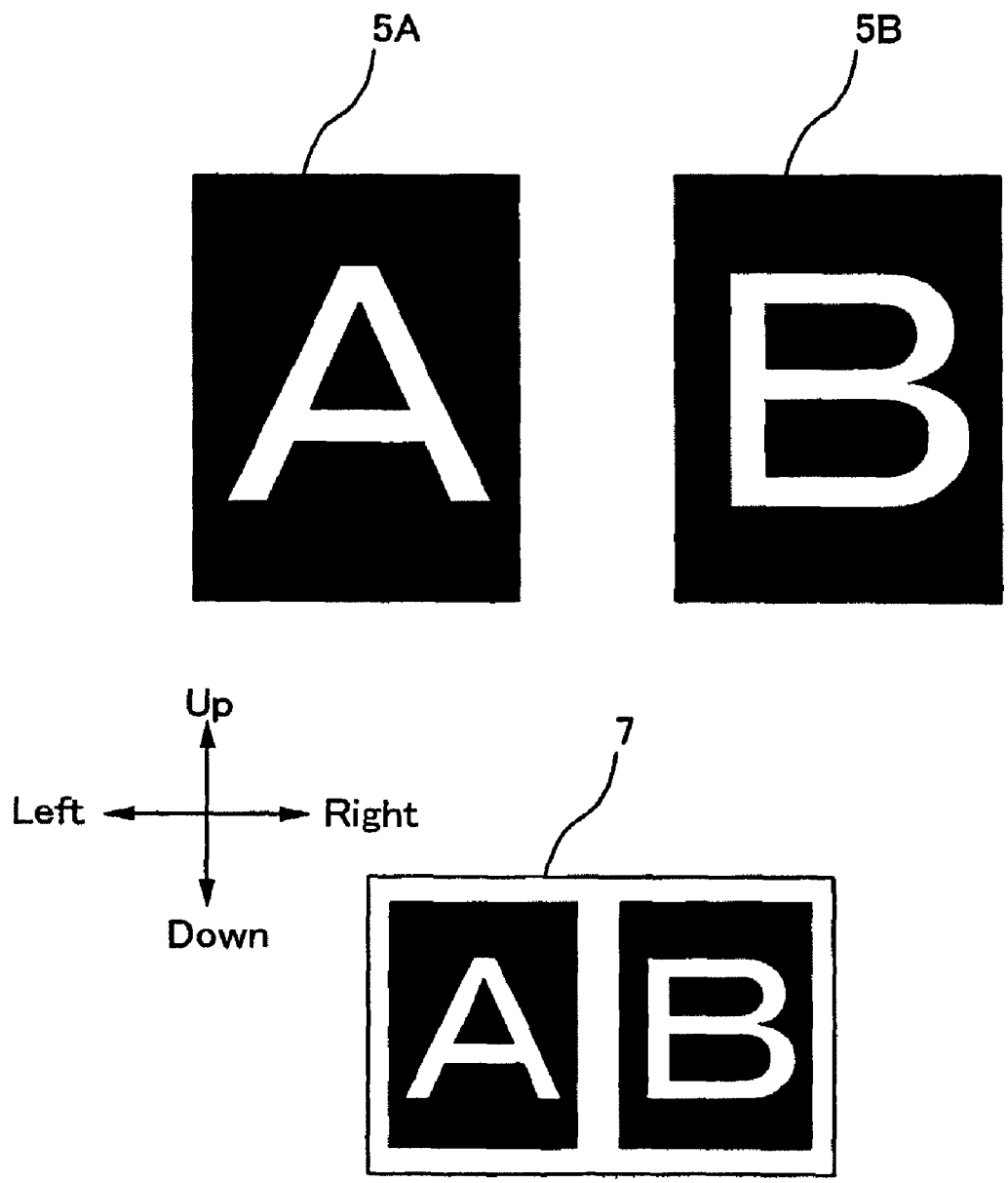
FIG. 12 is an explanatory diagram of a 2-up printing mode of the present embodiment.

FIG. 12 is a diagram for illustrating the 2-up printing mode (copying mode) of the present embodiment. In the figure, 5A is the first original and has an image "A" on its surface. Further, 5B is the second original and has an image "B" on its surface. 7 is the single sheet of paper printed by the SPC multifunction apparatus 1. On this paper 7, the image "A" and the image "B" are printed, according to 2-up printing, respectively in each print area formed by dividing the surface of the paper 7 into half. That is, the image "A" read from the first original 5A is printed on the print area for the first page which is on the left side of the paper 7, and the image "B" read from the second original 5B is printed on the print area for the second page which is on the right side. It should be noted that the above-mentioned page refers to each print area formed by dividing the surface of a sheet of paper into equal parts; for example, as for the 2-up printing mode, the left print area is referred to as the first page and the right area is referred to as the second page. Further, as for 4-up printing mode, a page means each print area formed by dividing the surface of the paper 7 into four equal parts, and each area is called the first through fourth page, respectively.

According to the present embodiment, the print mode for the image "A" on the first page and that for the image "B" on the second page, which is adjacent to the first page, can be set independent of each other when the first sheet of paper 7 is being printed. Therefore, it is possible to print one of either the image "A" or the image "B" by monochrome printing and print the other one by color printing. That is, the image in each page, which is printed next to each other in a predetermined position of the single sheet of paper 7, can be set for either the monochrome printing or the color printing on a page-by-page basis, and therefore, it is possible to enhance the flexibility in expression of printing on the medium.

It should be noted that, in the present embodiment, as shown in FIG. 12, a margin is provided between the end of the paper and each image. Further, a margin is provided between each image.

<About the Processing Operation of 2-Up Printing>

Figure 13:
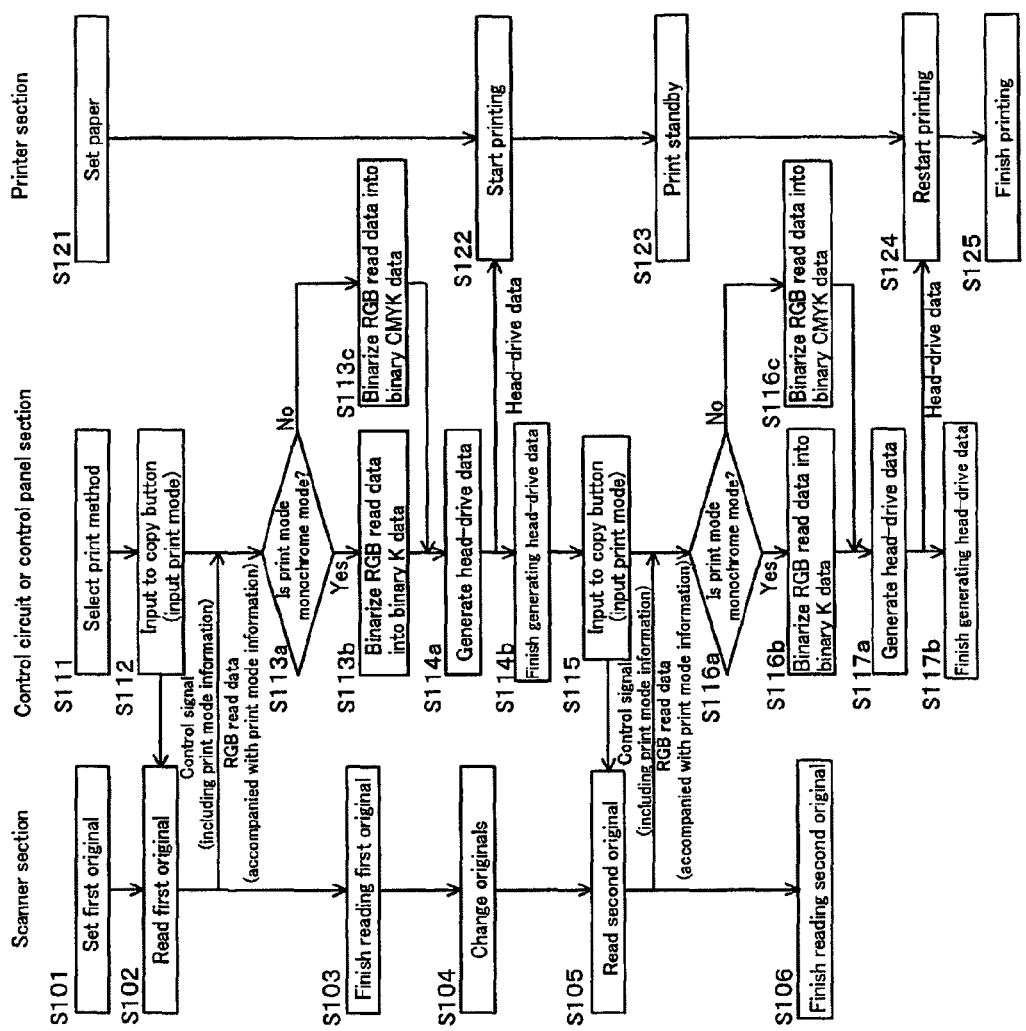
FIG. 13 is a flowchart of 2-up printing of the present embodiment.

FIG. 13 is a flowchart for illustrating the procedure of the processing operation of the 2-up printing of the present embodiment. The figure shows the operation flow for the scanner section 10, the control circuit 50 (or the control panel section 70), and the printer section 30 of the SPC multifunction apparatus 1.

Below, the 2-up printing mode of the present embodiment is described using FIG. 12 and FIG. 13. It should be noted that a program relating to the procedure of the processing operation of the 2-up printing is stored in the ROM 55.

First, the user sets paper 7 in the paper supply tray of the SPC multifunction apparatus 1 (S121). In the following description, it is, assumed that a plurality of single-sheet print paper in A4 size is set. It should be noted that the user may enter information about the paper 7 by operating the various buttons on the control panel section 70.

Next, the user operates the various buttons on the control panel section 70 to select the "2-up printing" of the present embodiment from a plurality of print modes (S111). That is, first, the user successively changes the setting items that have been displayed using the menu buttons 92 to go to the display screen "copy mode" which is the setting item to be set. Next, the user sets the setting value to "2-up printing" by pressing the two buttons 901, 902. In this way, the 2-up printing mode is selected as the print mode of the SPC multifunction apparatus 1. Further, in the same way, the user operates the various buttons on the control panel section 70 to set the size of the width t of the margin. In this way, the SPC multifunction apparatus 1 obtains information about the margin (margin information). If, however, the width t of the margin is not set through the control panel section 70, a default value that is set in advance is used as the preset value for the margin width. In the present embodiment, the margin information indicates that the width is t (mm).

Figure 14A:
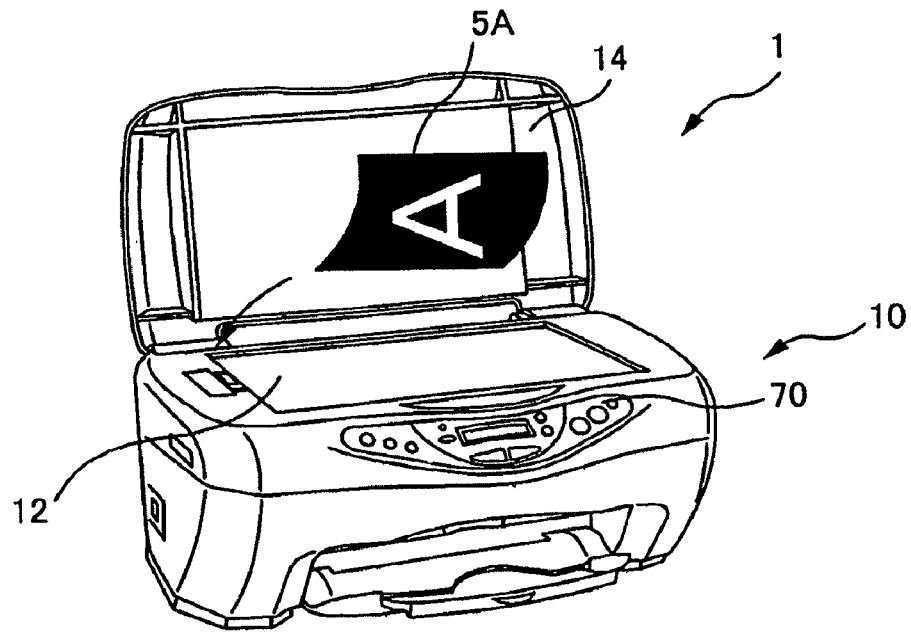
FIG. 14A through FIG. 14B are explanatory diagrams of setting an original.

Next, the user sets the first original 5A, as the first sheet of original, on the scanner section 10 of the SPC multifunction apparatus 1 (S101). The way in which the first original 5A is set is described using FIG. 14A. First, the user opens the original bed cover 14 and places the first original 5A on the original bed glass 12. When the first original 5A is placed on the original bed glass 12, the user faces the side on which the image "A" is written downwards and places a corner of the first original 5A against the origin mark at a corner of the original bed glass 12. Then, the user closes the original bed cover 14 to make the original bed cover 14 press the first original 5A on the original bed glass 12 against the original bed glass 12. In this way, the first original 5A is set on the scanner section 10.

Next, the user instructs the operation of reading the first sheet of original 5A to start. Since the apparatus is already set to perform the 2-up printing (S111), the reading operation starts when the user presses the color copy button 84 or the monochrome copy button 86 of the control panel section 70 (S112).

It should be noted that, as described above, the print mode for printing on the paper 7 the image for the first page that has been read from the first original 5A is determined by operating the copy button. That is, if the monochrome copy button 86 is pressed, the monochrome print mode information, which is entered through this copy button operation, accompanies the later-described read data (RGB data) that is read from the first original 5A, and conversely, if the color copy button 84 is pressed, the color print mode information, which is entered through this copy button operation, accompanies the data. Here, in order to facilitate understanding of the description, it is assumed that the monochrome copy button 86 is pressed to carry out monochrome printing for the first original 5A.

Next, the scanner section 10 of the SPC multifunction apparatus starts operating to read the image "A" in the first original 5A (S102). While the scanner section 10 is reading the image "A" in the original 5A, read data (RGB data) is output from the CCD sensor according to a predetermined cycle. It should be noted that, in the present embodiment, the linear sensors of the CCD sensor are aligned parallel to the lateral direction of the image "A", and the reading carriage 16 performs its scan movement parallel to the vertical direction of the image "A". (That is, in the present embodiment, the image "A" in the first original 5A of FIG. 12 is read by the scanner section 10 from the top toward the bottom.) Therefore, the read data that is output from the scanner section is data formed by successively outputting line data that is in the lateral direction of the image "A".

Next, the control circuit 50 of the SPC multifunction apparatus generates head-drive data based on the read data that is successively sent from the scanner section 10 (S113a, S113b, S113c, S114a). The head-drive data generated at this time is data for printing the image "A" part of the print image "AB" in the paper 7 of FIG. 12. The head-drive data is generated according to the above-mentioned monochrome print mode information accompanying the read data of the image "A" in the first original 5A, and as a result, the head-drive data is structured of data for causing only the K (black) nozzles to actuate. Therefore, the image "A" part in the paper 7 is printed in monochrome. It should be noted that the process of generating the head-drive data according to the read data will be described later. The generated head-drive data is successively sent to the head control unit 68.

In the present embodiment, the print image "AB" is printed on the paper 7 by scan-moving the writing carriage 36 parallel to the short-side direction of the paper 7 and carrying the paper 7 in the long-side direction of the paper 7. (That is, in the present embodiment, the print image "AB" on the paper 7 of FIG. 12 is printed from left to right.) Therefore, the head-drive data will be data formed by successively outputting line data that is in the vertical direction of the image "A". As a result, the printer section 30 is able to start printing the image "A" even before the head-drive data for the image "B" is generated. Therefore, in the present embodiment, printing is started for the image "A" that has already been read from the first original 5A before finishing reading the image "B" in the second original.

The printer section 30 starts printing according to the head-drive data that is successively sent to the head control unit 68 (S122). It should be noted that, when the process of generating the head-drive data for the image "A" is finished (S114b), no head-drive data will be sent to the head control unit 68. Therefore, the printer section 30 stops its printing operation and enters a print-standby state (a state in which various operations, such as the operation of carrying the paper 7 and the printing operation of ejecting ink, are in standby) (S123).

Figure 14B:
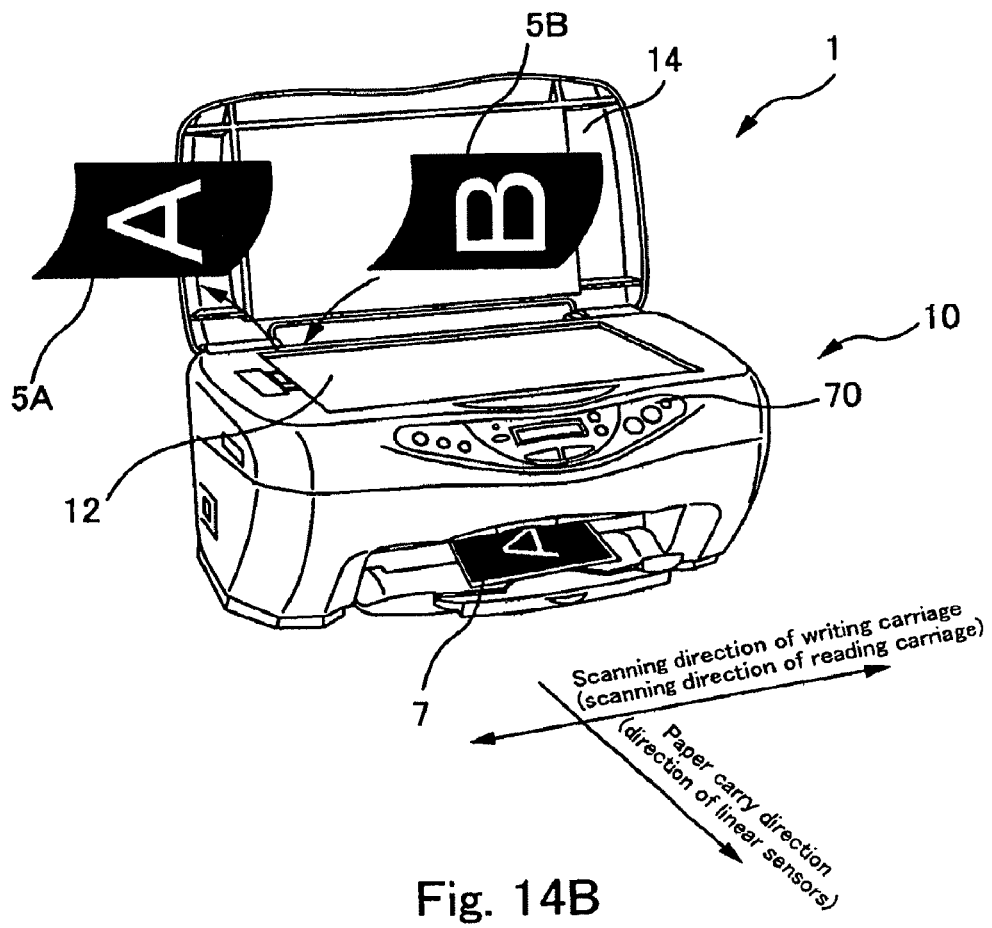

After the operation of reading the first original 5A is finished, the liquid crystal display 72 of the SPC multifunction apparatus 1 displays a message prompting the user to change originals. Confirming this message, the user changes the first original 5A that is set on the scanner section 10 to the second original 5B. The way in which the originals are changed is described using FIG. 14B. First, the user opens the original bed cover 14 and takes out the first original 5A placed on the original bed glass 12. Then, the user sets the second original 5B as a second sheet of original. It should be noted that, since the procedure of setting the second original 5B is the same as the procedure of setting the first original 5A described above, description thereof is omitted.

It should be noted that in the present embodiment, printing of the image "A" of the print image "AB" is started before reading of the image "B" in the second original 5B is started. Therefore, in the present embodiment, a portion of the print image is already discharged from the paper discharge-section 34 when the originals are being changed (refer to FIG. 14B).

After changing the originals, the user instructs the operation of reading the second sheet of original 5B to start. The operation of reading the second sheet of original 5B is also started when the user presses the color copy button 84 or the monochrome copy button 86 on the control panel section 70 (S115). It should be noted that, as with the first original 5A described above, the print mode for printing on the paper 7 the image for the second page that has been read from the second original 5B is determined by the copy button operation for the second original 5B. That is, the print mode for the image on the second page, which is the above-mentioned second original 5B, can be set independent of the first original 5A. Here, in order to facilitate understanding of the description, it is assumed that the color copy button 84 is pressed for the second original 5B, and the color print mode information accompanies the later-described read data (RGB data) read from the second original 5B.

Next, the scanner section 10 of the SPC multifunction apparatus 1 starts operating to read the image "B" in the second original 5B (S105). While the scanner section 10 is reading the image "B" in the original 5B, read data (RGB data) is output from the CCD sensor according to a predetermined cycle.

Next, the control circuit 50 of the SPC multifunction apparatus generates head-drive data based on the read data that is successively sent from the scanner section 10 (S116a, S116b, S116c, S117a). The head-drive data generated at this time is data for printing the image "B" part in the paper 7 of FIG. 12. The head-drive data is generated according to the above-mentioned color print mode information accompanying the read data of the image "B" in the second original 5B, and as a result, the head-drive data is structured of data for causing the nozzles of the four colors CMYK to actuate. Therefore, the image "B" part in the paper 7 is printed in color. It should be noted that the process of generating the head-drive data according to the read data will be described later. The generated head-drive data is successively sent to the head control unit 68.

The printer section 30 restarts printing according to the head-drive data that is successively sent to the head control unit 68 (S124). That is, after the operation of reading the image "B" is started, the printer section 30 restarts the carry operation of intermittently carrying the paper 7, the printing operation of ejecting ink from the nozzles that move in the scanning direction, and so forth.

When printing is finished (S117b, S125), the paper 7 is discharged from the paper discharge section 34. On the discharged paper 7, there will be printed a print image "AB", as shown in the paper 7 of FIG. 12. It should be noted that the image "A" part of the print image "AB" is printed in monochrome, whereas the image "B" part is printed in color.

After the operation of reading the second original is finished, the liquid crystal display 72 of the SPC multifunction apparatus displays a message prompting the user to take out the second original. Confirming this message, the user takes out the second original 5B that is set on the scanner section 10.

<About the Data Flow in Control Circuit 50 During 2-Up Printing>

Figure 15:
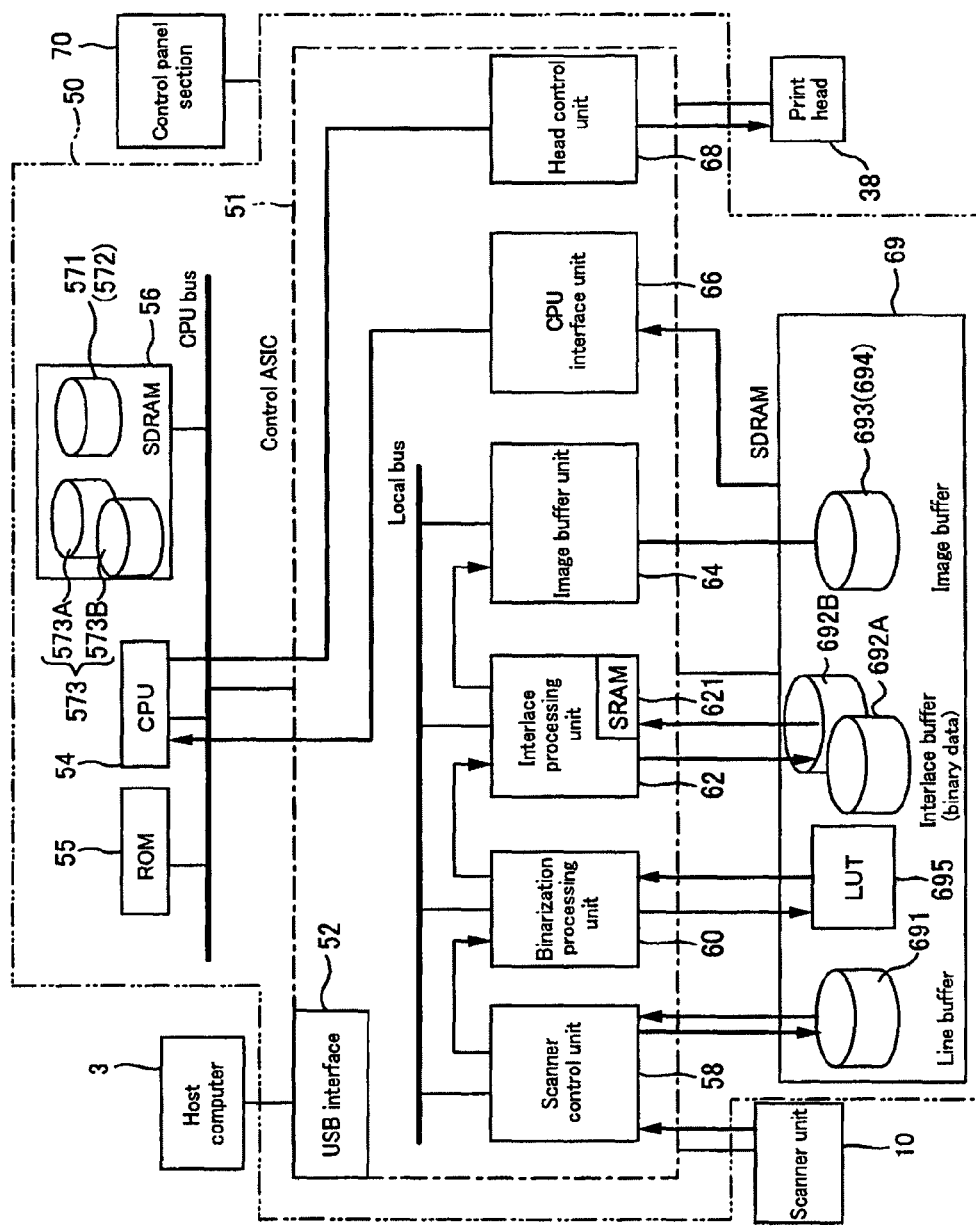
FIG. 15 is a block diagram showing an example of a control circuit when 2-up printing is performed.

FIG. 15 is a block diagram showing an example of the control circuit 50 when 2-up printing is performed. In FIG. 11 described above, two buffers—the image buffers 571, 572 (or the image buffers 693, 694)—were depicted for alternately performing writing and reading. In FIG. 15, however, in order to simplify the description, the two buffers for alternately performing writing and reading are not depicted.

Although the hardware configuration is the same as the control circuit 50 in FIG. 11 described above, the allocation of the memory area in the SDRAM 56, which is directly readable from the CPU 54, is different. Further, in FIG. 11 described above, the CPU 54 only accesses the image buffer 694. In FIG. 15, however, the CPU 54 accesses the line buffer 691 and the interlace buffer 692 via the CPUIF unit 66. Further, the memory area allocation of the interlace buffer 692 is divided into two, and therefore, the buffer 692 is logically made of two buffers.

Below, the data flow in the control circuit 50 when 2-up printing is performed is described using FIG. 15. It should be noted that a program for controlling the data flow in the control circuit 50 when 2-up printing is performed is stored in the ROM 55. In the description above, one raster line was formed by two scan movements of the writing carriage 36. However, in order to simplify the description, here, one raster line is formed by one scan movement of the writing carriage 36. (That is, description is made below in a state in which the dot data of the raster line is not divided into the odd-numbered data and the even-numbered data.)

(1) First, the data flow in the control circuit 50 from when the image "A" is read from the first sheet of original (first original 5A) (S102) until printing is started (S122) is described.

Receiving an input signal of the color copy button 84 or the monochrome copy button 86 from the control panel section 70 after the "2-up printing" is set, the CPU 54 sends control signals to the scanner control unit 58. These control signals include the print mode information based on the copy button operation; since the monochrome copy button 86 is pressed in this example, the monochrome print mode information is included. By the way, the monochrome print mode information is effective until the next copy button operation; that is, the later-described RGB data generated by the scanner section 10 during this period is accompanied with the monochrome print mode information.

The scanner control unit 58 controls the scanner section 10 according to the above-mentioned control signals from the CPU 54 to start the operation of reading the image "A" from the first original 5A.

It should be noted that, since the image "A" of the first original 5A is printed on the paper 7 reduced in size, the scanner control unit 58 reads the image "A" from the first original 5A so that data is thinned out compared to when the image "A" is read at scale 1/1. That is, the data in the lateral direction of the image "A" is reduced in size by thinning out the data that is obtained from the line sensors of the CCD sensor. This thinning-out process is performed by the scanner control unit 58 thinning out the output data from the line sensors. Further, the data in the vertical direction of the image "A" is reduced in size by increasing the scanning speed of the reading carriage. This process is performed by the scanner control unit 58 controlling the scanning speed of the reading carriage so that the speed becomes faster. By thinning out the data of the image "A" in both lateral and vertical directions in this way, the image "A" is read substantially reduced in size.

The scanner control unit 58 controls the scanner section 10 to take the RGB data output from the CCD, sensor at a predetermined cycle into the line buffer 691. Then, the scanner control unit 58 subjects the RGB data, which has been temporarily taken into the line buffer 691, to the RGB interline correction processing (described above), and then sends the RGB data for the same line into the binarization processing unit 60.

The binarization processing unit 60 subjects the RGB data, which has been taken in, to halftone processing. Then, the binarization processing unit 60 refers to the lookup table (LUT) 695 stored in the control-ASIC-SDRAM 69 to convert the halftone-processed data into either the binary data for each color in CMYK or the binary data only for K (black). It should be noted that the conversion into the binary data is performed according to the above-mentioned print mode information; for example, since the above-mentioned RGB data accompanies the monochrome print mode information in the present example, the data is converted into the binary data only for K (black). The binarization unit 60 sends the binary data only for K into the interlace processing unit 62.

The interlace processing unit 62 takes the binary data only for K, which has been sent in from the binarization processing unit 60, into one interlace buffer (referred to as the first interlace buffer 692A) of the interlace buffers that have been divided into two. Then, the binary data taken into the first interlace buffer 692A is sent, via the CPU interface unit 66, into a layout buffer 573 in the SDRAM 56 that is directly readable from the CPU 54.

The layout buffer 573 is a buffer allocated to the SDRAM, and is logically divided into two areas. The binary data that has been sent from the first interlace buffer 692A is taken into one layout buffer (the first layout buffer) 573A of the two areas. The other layout buffer (the second layout buffer (also called the intermediate buffer)) 573B stores layout image data that is generated based on the binary data in the first layout buffer 573A, as described later.

Figure 16:
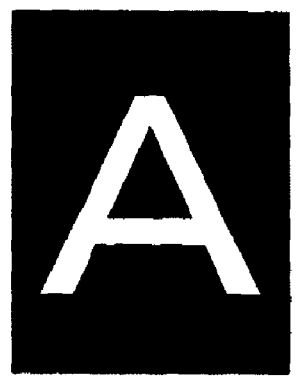
FIG. 16 is a conceptual diagram of binary data of a first layout buffer.

FIG. 16 is a conceptual diagram of the binary data sent into the first layout buffer 573A. This binary data is stored in a continuous memory area, but when it is wrapped around according to the width of the image, it becomes the image information as shown in the figure. (In this description, a single piece of image information is obtained because it is assumed that one raster line is formed by one scan movement of the writing carriage 36, in order to simplify the description.)

The CPU 54 generates layout image data based on the binary data taken into the first layout buffer 573A. However, only an area capable of storing only several lines of line data for the lateral width of paper is allocated to the second layout buffer 573B for storing the generated layout image data. Therefore, the CPU 54 generates linear layout image data and sends the generated layout image data into the second layout buffer 573B. The layout image data for several lines having been sent into the second layout buffer 573B are then successively sent into the second interlace buffer 692B in the control-ASIC-SRAM 69.

In the present embodiment, the read data that is output from the scanner section is data in which line data in the lateral direction of the image "A" have been successively output. Therefore, binary data in the lateral direction of the image "A" are successively sent into the first layout buffer. On the other hand, it is necessary that the head-drive data be data in which line data in the vertical direction of the image "A" have been successively output. Therefore, in the present embodiment, the first layout buffer 573A once takes in the whole data of the image "A", and when the CPU 54 generates the layout image data in the second layout buffer, it performs a process of turning the data of the image "A" and then successively generates the line data in the vertical direction (data that has been turned) of the image "A". As a result, the data successively sent from the second layout buffer 573B to the second interlace buffer 692B become line data in the vertical direction of the image "A", and therefore, it becomes possible to successively generate, based on these data, the head-drive data in the vertical direction of the image "A".

FIG. 17A through FIG. 17G are conceptual diagrams of the layout image data sent into the second layout buffer 573B. The layout image data is stored in a continuous memory area, but when it is wrapped around according to the width of the image and rearranged, it becomes the layout image (a portion of the print image) for several lines in the vertical direction as shown in the figure.

Figure 17A:
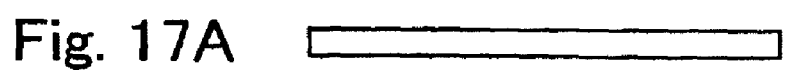
FIG. 17A through FIG. 17G are conceptual diagrams of layout image data of a second layout buffer.
Figure 17B:
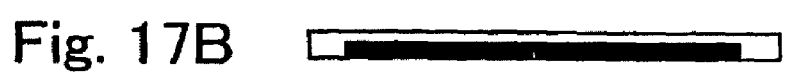
Figure 17C:
Figure 17D:
Figure 17E:
Figure 17F:
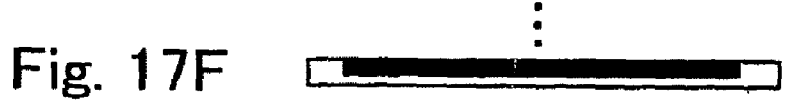
Figure 17G:
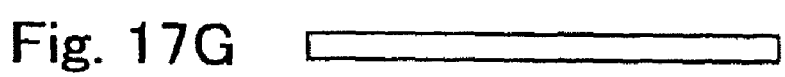

The layout image data is generated as follows. First, the CPU 54 generates null data for the margin to generate image data corresponding to the margin from the upper end of the paper up to the image (the margin on the left of the image "A") (FIG. 17A, FIG. 17B). After the null data amounting to the width of the margin has been generated, the CPU 54 generates a layout image in which line data (binary data) in the vertical direction of the image "A" taken into the first layout buffer 573A are successively arranged (FIG. 17B). When the line data in the vertical direction of the image "A" are being arranged, the CPU 54 inserts null data amounting to the width of the margin from the side end of the paper up to the image. In this way, margins in the lateral direction (margins on the top and bottom of the image "A") are generated in the layout image. The line data in the vertical direction of the image "A" are generated only for the area in the lateral direction of the image "A" (FIG. 17B through FIG. 17F). After finishing generating the layout image for the area of the image "A", the CPU 54 again generates null data for the margin to generate image data for the margin between the images (FIG. 17F, FIG. 17G). In this way, a margin in the vertical direction (the margin on the right of the image "A") is generated in the layout image. It should be noted that the layout image data that are generated as above whenever necessary are successively sent into the second interlace buffer 692B in the control-ASIC-SRAM 69. It should be noted that the layout image data that are sent into the second interlace buffer 692B are the above-mentioned binary data only for K.

The processes that are performed after the binary data (the layout image data) have been sent from the second layout buffer 573B into the second interlace buffer 692B are almost the same as the processes for when the apparatus functions as a copier as described above. That is, the following processes are performed. (However, to simplify the description, description on the process of alternately performing writing and reading is omitted.)

The interlace processing unit 62 reads out the data stored in the second interlace buffer 692B in units of predetermined size, and burst transmits the data to the SRAM 621 in the interlace processing unit 62.

At this time, the binary data is read out from the interlace buffer 692 in correspondence with the nozzle arrangement of the print head 38 according to the print resolution and the nozzle pitch. For example, when the print resolution is 720 dpi and the nozzle pitch is 1/180 inch, three raster lines will be printed between two raster lines that have been printed with adjacent nozzles. Therefore, data for every four raster lines is read out from the binary data as data corresponding to a scan movement of the writing carriage 36.

The transferred data is rearranged on the SRAM 621 so that it corresponds to the nozzle arrangement, and is sent to the image buffer unit 64.

The image buffer unit 64 burst transmits, to the image buffer 693, the image data that has been blocked into small pieces according to the capacity of the SRAM 621, and stores the data in proper orientation so that it becomes the head-drive data for making each of the nozzles eject ink per every scan movement of the writing carriage 36.

Under control of the CPU 54, the head-drive data for each scan movement stored in the image buffers 693, 694 is read into the CPU 54 via the CPUIF unit 66 and transferred to the head control unit 68 by the CPU 54. The head control unit 68 actuates the print head 38 according to the head-drive data to print the image. Here, the head-drive data is formed from the binary data only for K; therefore, only the K (black) nozzles are actuated in the print head 38 and thereby black ink droplets are ejected only from the K nozzles. In this way, in the present embodiment, it is possible to arrange the image "A" in the paper 7 as shown in FIG. 12 and to print the image "A" part in monochrome.

(2) Next, the data flow in the control circuit 50 from when printing has started (S122) up to the print-standby state (S123) is described.

Figure 18:
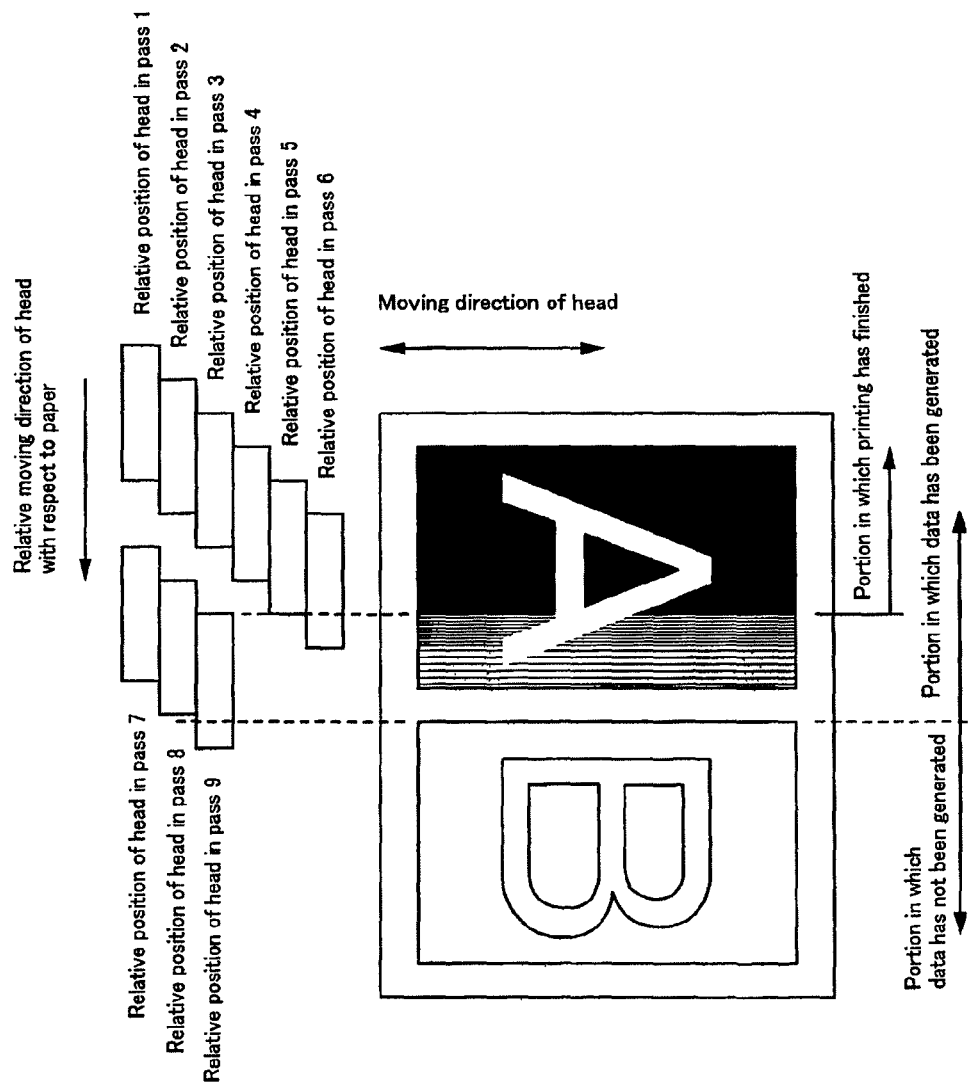
FIG. 18 is an explanatory diagram showing how printing is performed before reading the image "B".

FIG. 18 is an explanatory diagram showing how printing is performed before the image "B" in the second sheet of original (the second original), is read. As already explained, the head-drive data for the image "A" (and the margin portions surrounding it) are successively stored in the image buffer. When the head-drive data for the first scan movement is stored, the stored head-drive data is sent out to the head control unit 68 by the CPU 54. Then, when the head moves in the scanning direction, ink droplets are ejected from the nozzles in the head according to the head-drive data. Therefore, the head-drive data necessary for pass 1 (the first scan movement) through pass 8 in the figure can be sent out successively to the head control unit 68 after the image "A" in the first sheet of original (first original) has been read.

On the other hand, the head-drive data necessary for pass 9 (the ninth scan movement) requires head-drive data for the image "B" in the second original. That is, if the image "B" in the second original has not been read, the head-drive data (data corresponding to a plurality of nozzles) necessary for pass 9 is not stored in the image buffer 693 (that is, the head-drive data has not been assembled); therefore, it is not possible to actuate the head for pass 9. As a result, before the head-drive data for the image "B" of the second original is generated, the printer section cannot print the image that is in the position of pass 9.

Therefore, in the present embodiment, the scan movement of the writing carriage 36 is stopped and the apparatus is in the print-standby state at the point where printing has finished for pass 8 (the eighth scan movement). That is, printing for the part to be printed in pass 9 and thereafter is not finished. Therefore, in the present embodiment, the apparatus enters the standby state in the middle of printing a portion of the image "A" of the first original (the right-side portion of the image "A") that is to be printed on the paper.

It should be noted that in the present embodiment, if the clear button 82 is pressed and there is an instruction to stop printing during the standby state, the SPC multifunction apparatus 1 completes printing the image "A" of the first original, discharges the paper 7, and then terminates printing. This is because the image "A" will be in a half-finished state if the paper 7 is discharged as it is when the apparatus is in the standby state.

(3) Finally, the data flow in the control circuit 50 from when the second sheet of original (the second original) is set until printing is completed is described.

After the operation of reading the first original 5A is finished, the CPU 54 displays on the liquid crystal display 72 a message indicating to change originals. After the originals have been changed, the CPU 54 receives an input signal from the color copy button 84 or the monochrome copy button 86, and sends control signals to the scanner control unit 58. These control signals also include the print mode information according to the copy button operation. That is, in this example, since the color copy button 84 is pressed as described above, the color print mode information is included. By the way, the color print mode information is effective until the next copy button operation; that is, the later-described RGB data generated by the scanner section 10 during this period is accompanied with the color print mode information.

The scanner control unit 58 controls the scanner section 10 according to the above-mentioned control signals from the CPU 54 to start the operation of reading the image "B" from the second original 5B.

It should be noted that, if generation of the head-drive data of the image "A" is still not finished when the input signal of the color copy button 84 or the monochrome copy button 86 is received, the CPU 54 first finishes generating the head-drive data for the image "A" (or enters the standby state) and then sends the control signals to the scanner control unit 58. This is because it is necessary to reserve enough area in the memory (the SDRAM 56 or SDRAM 69) necessary for generating the head-drive data for the image "A". That is, by starting the operation of reading the second original after generation of the head-drive data for the first original has finished (or after the apparatus enters the standby state), it is possible to make the memory small.

The scanner control unit 58 controls the scanner section 10 to take the RGB data, which are output from the CCD sensor at a predetermined cycle, into the line buffer 691. Then, the scanner control unit 58 subjects the RGB data, which has been temporarily taken into the line buffer 691, to the RGB interline correction processing (described above), and then sends the RGB data for the same line into the binarization processing unit 60.

The binarization processing unit 60 subjects the RGB data, which has been taken in, to halftone processing. Then, the binarization processing unit 60 refers to the lookup table (LUT) 695 stored in the control-ASIC-SDRAM 69 to convert the halftone-processed data into either the binary data for each color in CMYK or the binary data only for K (black). It should be noted that the conversion into the binary data is performed according to the above-mentioned print mode information; for example, since the above-mentioned RGB data accompanies the color print mode information in the present example, the data is converted into the binary data for each color in CMYK. The binarization unit 60 sends the binary data for each color in CMYK into the interlace processing unit 62.

The interlace processing unit 62 takes the binary data for each color in CMYK, which has been sent in from the binarization processing unit 60, into the first interlace buffer 692A. Then, the binary data taken into the first interlace buffer 692A is sent, via the CPU interface unit 66, into the first layout buffer 573A in the SDRAM 56 that is directly readable from the CPU 54.

The CPU 54 generates linear layout image data based on the binary data taken into the first layout buffer 573A. The CPU 54 sends the generated layout image data into the second layout buffer 573B. Then, the layout image data for several lines that have been sent into the second layout buffer 573B are successively sent into the second interlace buffer 692B in the control-ASIC-SRAM 69. It should be noted that the layout image data sent into the second interlace buffer 692B is the above-mentioned binary data for each color in CMYK.

The interlace processing unit 62 reads out the data stored in the second interlace buffer 692B in units of predetermined size, and burst transmits the data to the SRAM 621 in the interlace processing unit 62.

At this time, the binary data is read out from the interlace buffer 692 in correspondence with the nozzle arrangement of the print head 38 according to the print resolution and the nozzle pitch. For example, when the print resolution is 720 dpi and the nozzle pitch is 1/180 inch, three raster lines will be printed between two raster lines that have been printed with adjacent nozzles. Therefore, data for every four raster lines is read out from the binary data as data corresponding to a scan movement of the writing carriage 36.

The transferred data is rearranged on the SRAM 621 so that it corresponds to the nozzle arrangement, and is sent to the image buffer unit 64.

The image buffer unit 64 burst transmits, to the image buffer 693, the image data that has been blocked into small pieces according to the capacity of the SRAM 621, and stores the data in proper orientation so that it becomes the head-drive data for making each of the nozzles eject ink per every scan movement of the writing carriage 36.

Then, the head-drive data for the image "B" (and the margins surrounding it) are successively stored in the image buffer. When the head-drive data for one scan movement is stored, the stored head-drive data is sent out to the head control unit 68 by the CPU 54. Then, when the head moves in the scanning direction, ink droplets are ejected from the nozzles in the head according to the head-drive data. Since the head-drive data is made from the binary data for each color in CMYK, each of the CMYK nozzles of the print head 38 is actuated, and therefore, ink droplets are ejected from each of the CMYK nozzles. In this way, in the present embodiment, it is possible to arrange the image "B" in the paper 7 as shown in FIG. 12 and to print the image "B" part in color.

It should be noted that in the present embodiment, the head-drive data for the image "A" for pass 9 (refer to FIG. 18) (the head-drive data for the right-side portion of the image "A") is not accumulated (is not assembled) until the head-drive data for the image "B" is generated. Therefore, the data is not sent out to the head control unit 68. Thus, the head-drive data for the image "A" for pass 9 remains in the image buffer until the head-drive data for the image "B" is generated (that is, until the operation of reading the image "B" is started). After the operation of reading the image "B" is started, the head-drive data for the left-side portion of the image "B" is stored in the image buffer, in which the head-drive data for the image "A" still remains. When the head-drive data for the scan movement for pass 9 is accumulated in the image buffer, the accumulated drive data is sent out by the CPU 54 to the head control unit 68, and printing is restarted. (That is, after the head-drive data for the image "B" has been generated, the printer section 30 restarts the carry operation of intermittently carrying the paper 7, the printing operation of ejecting ink from the nozzles that move in the scanning direction, and so forth.) Therefore, the head-drive data in pass 9 is head-drive data generated based on the image "A" and the image "B". Therefore, the right-side portion of the image "A" and the left-side portion of the image "B" are both printed, at the same time, in pass 9.

It should be noted that, considering the head-drive data for pass 9 from the standpoint of print modes, this head-drive data is structured of a portion that is made up of binary data only for K and a portion that is made up of binary data for each color in CMYK. That is, the portion of the head-drive data that corresponds to the above-mentioned right-side portion of the image "A" is data made up of the binary data only for K for actuating only the K nozzles, whereas the portion of the head-drive data that corresponds to the above-mentioned left-side portion of the image "B" is data made up of the binary data for each color in CMYK for actuating each of the CMYK nozzles. Therefore, during pass 9, ink droplets are ejected only from the K nozzles for the right-side portion of the image "A", whereas ink droplets are ejected from the CMYK nozzles for the left-side portion of the image "B". Therefore, it is possible to perform printing with different print modes even during a scan pass that is used for both images "A" and "B".

In this way, in the present embodiment, it is possible to perform printing such that the print image "AB" is arranged in the paper 7 as shown in FIG. 12. Further, in this print image "AB", it is possible to print the image "A" part in monochrome and print the image "B" part in color.

It should be noted that attention should be paid to the fact that the present SPC multifunction apparatus 1 does not have an automatic document feeder (ADF). The present SPC multifunction apparatus 1 improves, for example, the operability of the user in cases where a plurality of images are read so that they are printed together on a piece of print-recording medium while the user manually changes originals, without using an ADF.

By the way, in the present embodiment, the SPC multifunction apparatus 1 starts the 2-up printing after having finished reading the entire first original because it is necessary to subject the image data to a turning process when 2-up printing is performed. However, if the images are to be arranged without subjecting the image data to the turning process, the head-drive data for one pass will be stored even before finishing reading the first original, and therefore, the SPC multifunction apparatus will be able to start printing the image of the first original while operating to read the first original. In this way, since printing is started earlier, the printing speed becomes faster. It should be noted that, in the same way, printing of the image of the second original may be started before finishing reading the second original.

===Configuration of Computer System Etc.===

Next, an embodiment of a computer system, a computer program, and a storage medium having a computer program recorded thereon is described with reference to the drawings.

Figure 19:
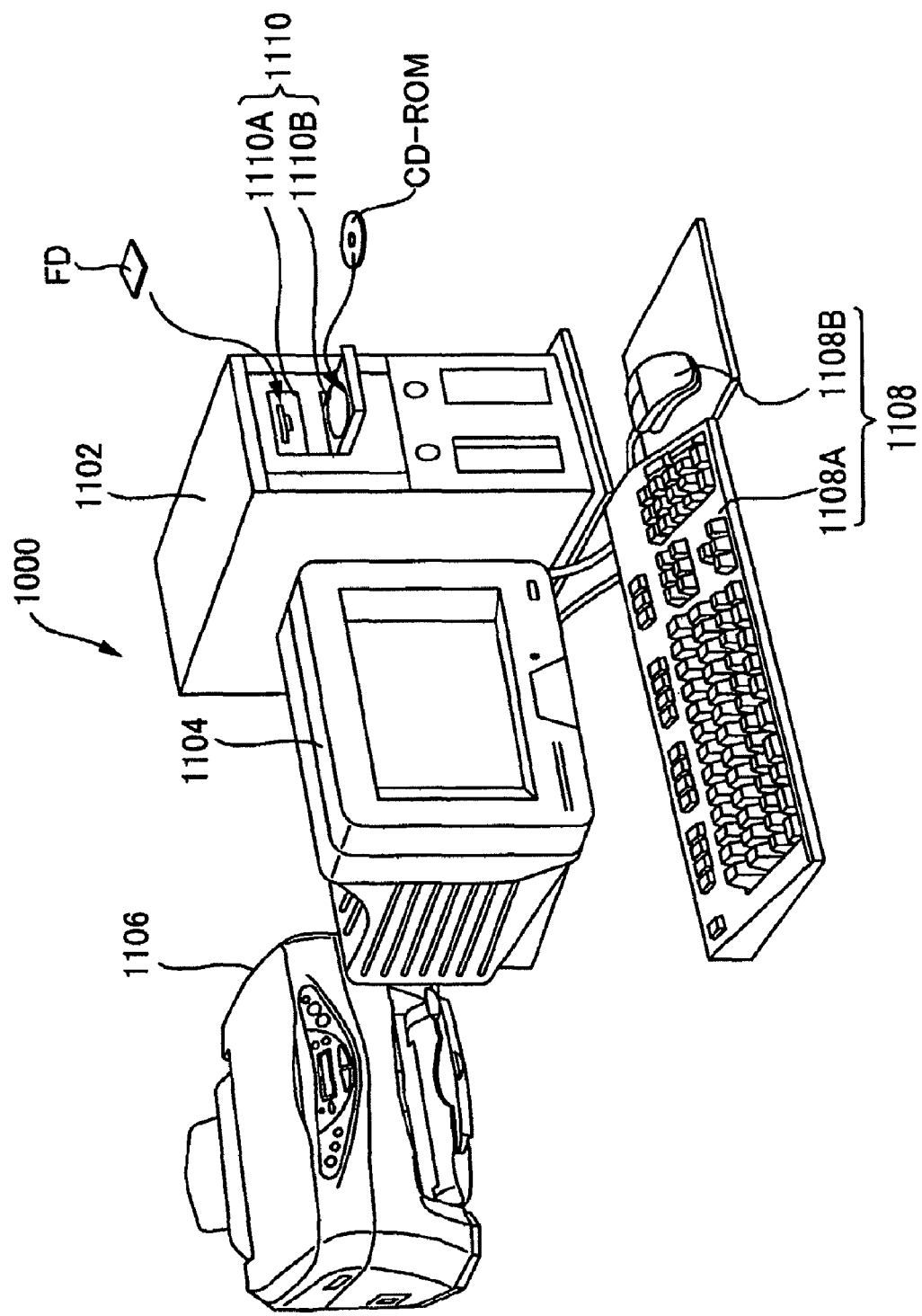
FIG. 19 is an explanatory diagram showing an external configuration of a computer system.

FIG. 19 is an explanatory diagram showing the external configuration of a computer system. The computer system 1000 includes: a computer unit 1102; a display device 1104; an SPC multifunction apparatus 1106; an input device 1108; and a reading device 1110. In the present embodiment, the computer unit 1102 is housed in a mini-tower casing; however the structure is not limited to this example. Although a CRT (cathode ray tube), a plasma display, or a liquid crystal display device is generally used as the display device 1104, any other kinds of devices can be used. The SPC multifunction apparatus described above is used as the SPC multifunction apparatus 1106. In the present embodiment, a keyboard 1108A and a mouse 1108B are used as the input device 1108; however, any other kinds of devices can be used. In the present embodiment, a flexible disk drive device 1110A and a CD-ROM drive device 1110B are used as the reading device 1110; however, it is also possible to use an MO (Magnet Optical) disk drive device, a DVD (digital versatile disk) drive, or any other kinds of devices.

Figure 20:
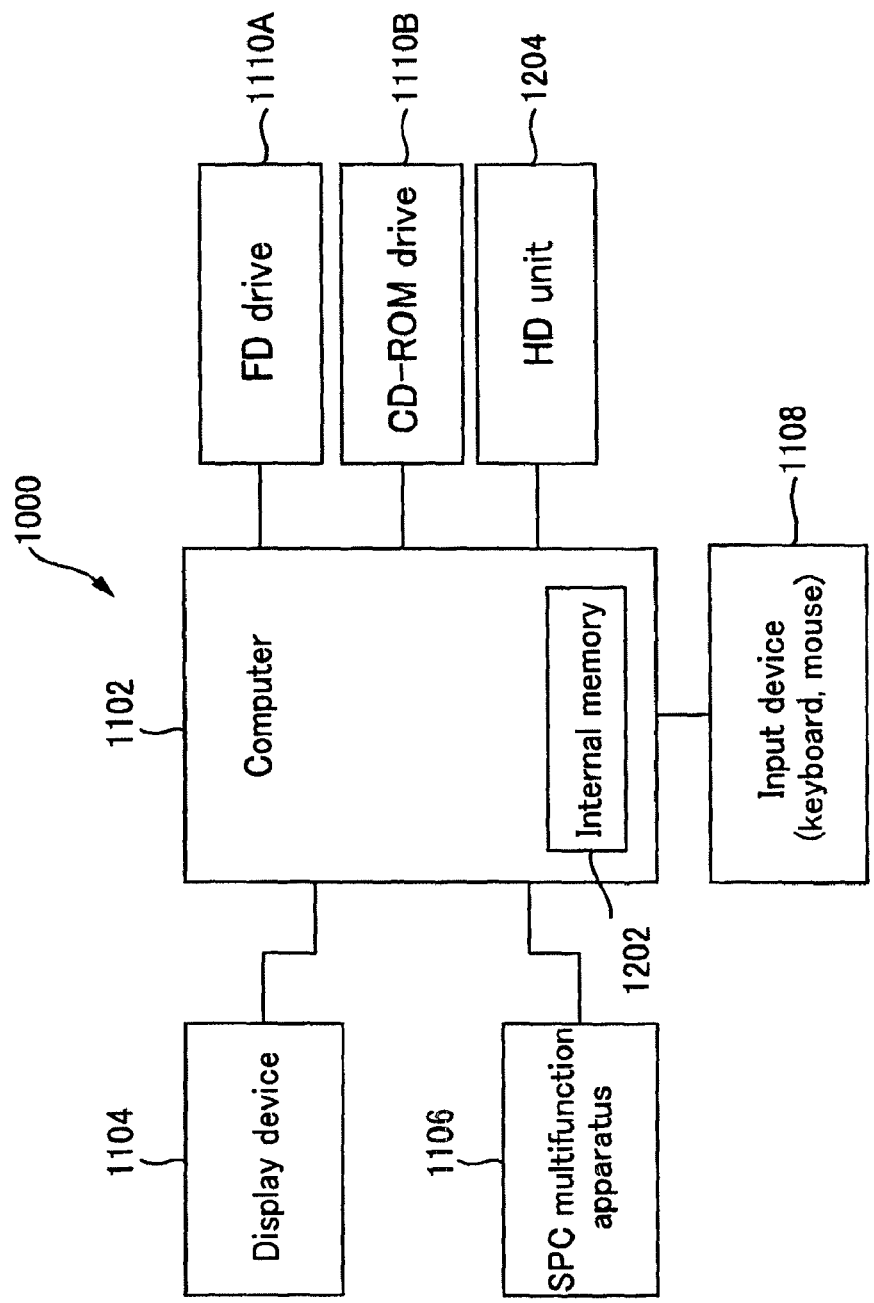
FIG. 20 is a block diagram showing a configuration of the computer system.

FIG. 20 is a block diagram showing the configuration of the computer system shown in FIG. 19. FIG. 20 shows that an internal memory 1202, such as a RAM, provided inside the casing in which the computer unit 1102 is housed, and an external memory, such as a hard-disk drive unit 1204, are also provided.

The above-mentioned computer program for controlling the operations of the printer may be downloaded to, for example, the computer 1000 connected to the SPC multifunction apparatus 1106 via a communications line such as the Internet. It is also possible, for example, to record the program on a computer-readable storage medium and distribute it in this form. It is possible to use various kinds of storage media such as flexible disks FDS, CD-ROMs, DVD-ROMs, magneto-optical disks MOs, hard disks, and memories, as the storage medium. It should be noted that the information recorded on such a storage medium can be read by various kinds of reading devices 1110.

Figure 21:
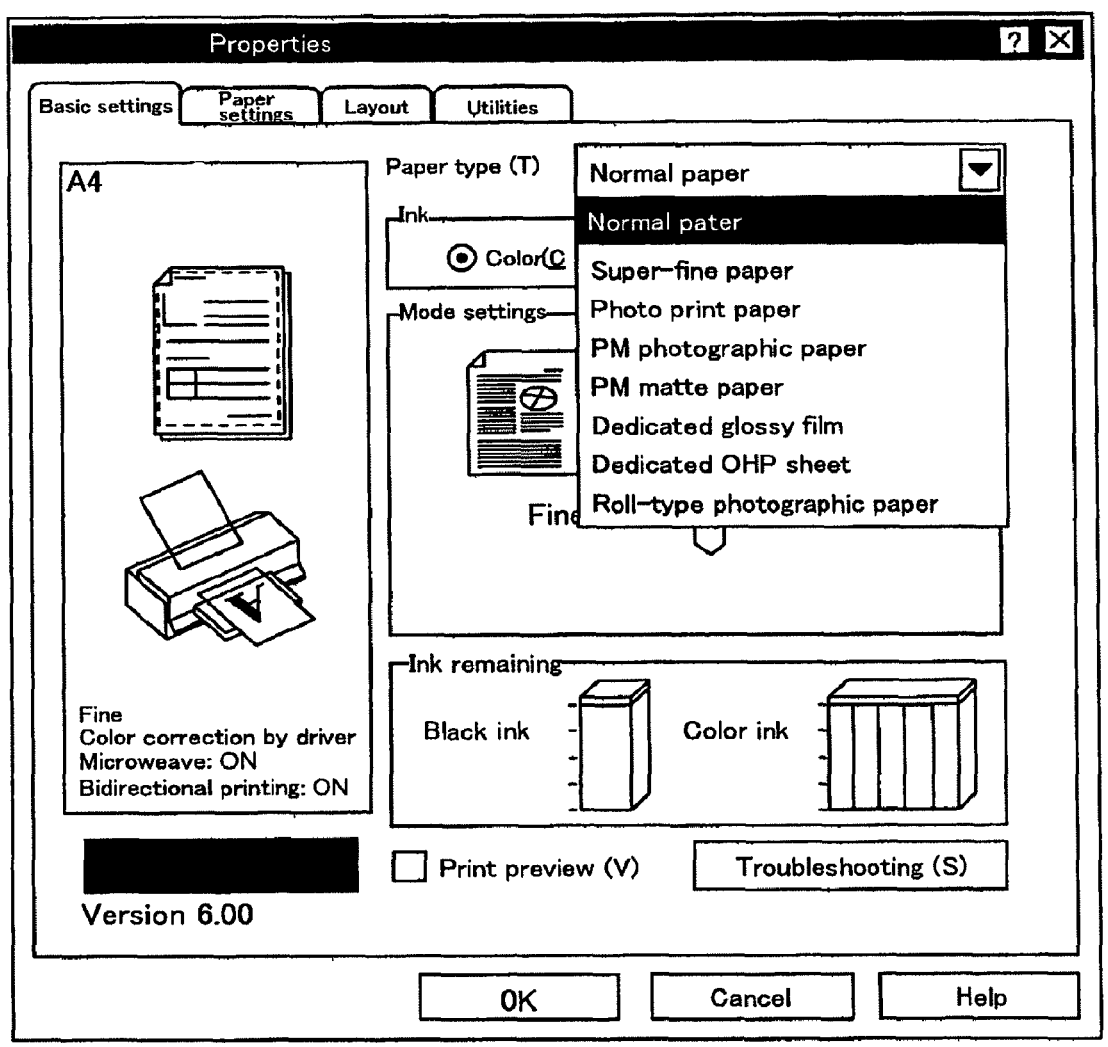
FIG. 21 is an explanatory diagram showing a user interface of a driver.

FIG. 21 is an explanatory diagram showing a user interface of a printer driver displayed on the screen of the display device 1104 that is connected to the computer system. The printer driver serves as a complement to the printer function of the SPC multifunction apparatus. The user can carry out various settings of the printer driver using the input device 1108.

The user can select the print mode from this screen. For example, the user can select the high-speed printing mode or the fine printing mode as the print mode. Further, the user can select the distance between dots (the resolution) for printing from this screen. For example, the user can select, from this screen, 720 dpi or 360 dpi as the print resolution.

Figure 22:
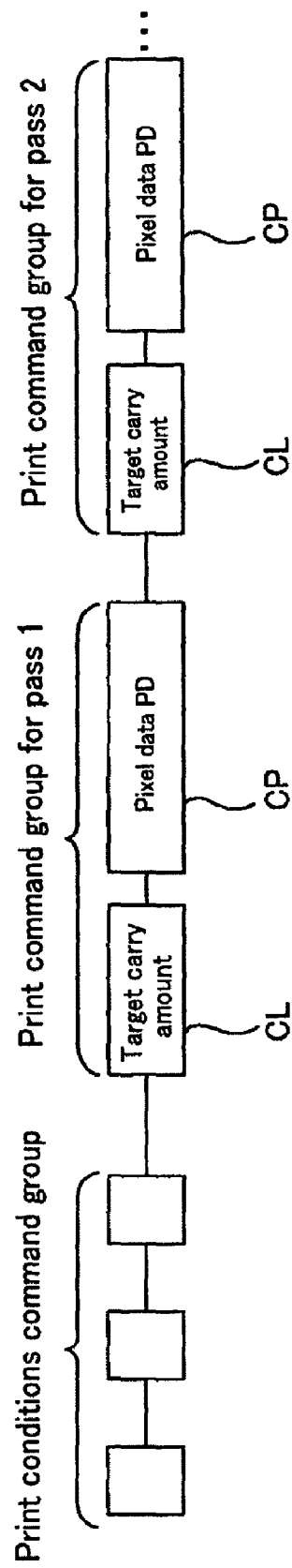
FIG. 22 is an explanatory diagram of a print data format.

FIG. 22 is an explanatory diagram of a format of print data supplied to the SPC multifunction apparatus 1106 from the computer unit 1102. The print data is generated from the image information according to the settings of the printer driver. The print data includes a print condition command group and command groups for each pass. The print condition command group includes commands indicating the print resolution, commands indicating the printing direction (unidirectional/bidirectional), and so forth. Further, the print command group for each pass includes a target carry amount command CL and a pixel data command CP. The pixel data command CP includes pixel data PD indicating the recording status for each pixel of the dots recorded in that pass. It should be noted that, although the various commands shown in the figure each has a header and a data portion, they are depicted in a simplified fashion. Further, these command groups are intermittently supplied from the computer unit to the printer on a command-by-command basis. The print data, however, is not limited to this format.

It should be noted that in the above description, an example in which the SPC multifunction apparatus 1106 is connected to the computer unit 1102, the display device 1104, the input device 1108, and the reading device 1110 to configure the computer system was described. However, the configuration is not limited to the above. For example, the computer system may be configured comprising only the computer unit 1102 and the SPC multifunction apparatus 1106, and it does not have to comprise any one of the display device 1104, the input device 1108, or the reading device 1110. Further, for example, it is also possible for the SPC multifunction apparatus 1106 to have some of the functions or mechanisms of each of the computer unit 1102, the display device 1104, the input devices 1108, and the reading device 1110. For example, it is possible to structure the SPC multifunction apparatus 1106 so that it comprises an image processor for processing images, a display section for performing various kinds of displaying, and a recording media mounting section for detachably mounting a recording medium on which image data captured with a digital camera or the like is stored.

A computer system configured as above will be superior to existing computer systems as a whole.

Modification of the First Embodiment

The above-mentioned embodiment mainly describes an SPC multifunction apparatus and so forth, but it is needless to say that the description includes disclosures of printing apparatuses, printing methods, computer systems, and computer programs.

Further, an SPC multifunction apparatus etc. according to an embodiment was described. The above-mentioned embodiment, however, is for facilitating understanding of the present invention and is not intended for the present invention to be interpreted limited to this. The present invention may be modified and/or altered without departing from the gist thereof, and it is needless to say that the present invention includes its equivalents. Particularly, even the embodiments described below are included in the present invention.

<About the Number of Originals and Number of Pages>

Figure 23A:
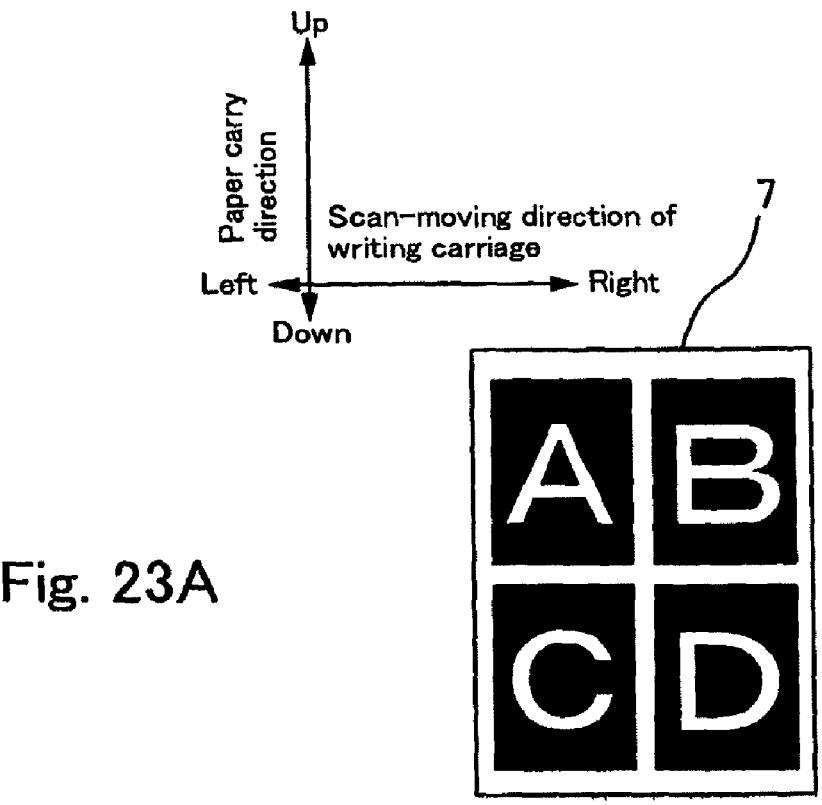
FIG. 23A and FIG. 23B are explanatory diagrams of 4-up printing.

In the above-described embodiment, images for two pages were read from two sheets of originals, the print mode for each image in each page was set independent of each other, and the images were printed on one sheet of paper. The number of originals and the number of pages to be set on one sheet of paper, however, is not limited to two. For example, the embodiment is also applicable to 4-up printing as in the explanatory diagram shown in FIG. 23A. That is, in FIG. 23A, an image for one page is obtained from each of four sheets of originals through a total of four times of reading operations, and each of these images is printed in each page on paper 7. As with 2-up printing described above, even in this 4-up printing, the print mode for each image for each page that has been read is set by carrying out the above-described copy button operation every time the reading operation for each original is performed.

4-up printing, however, differs from the above-mentioned 2-up printing in terms that the timing for starting printing is different and that the image-turning process is unnecessary. That is, in 4-up printing, after reading image "A" in the first sheet of original (first original), the binary data therefor is sent into the first layout image buffer 573A on the CPU 54 side. Printing is not started right after this, but instead, image "B" in the second sheet of original (second original) is read. The binary data for the image "B" is sent into the first layout image buffer 573A on the CPU 54 side.

It should be noted that since the data amount is small because each of the images is reduced in size compared to the above-described embodiment, the first layout image buffer 573A is able to store both data for the image "A" and the image "B". Then, the CPU generates, in the second layout image buffer 573B, the linear layout image data based on the data for the two images that are in the first layout image buffer 573A. In the present embodiment, it is not necessary to turn the image when the layout image data is generated, compared to the above-described embodiment. The data flow after this is approximately the same as that for the above-described embodiment.

Further, in the present embodiment, the apparatus enters the print-standby state before finishing printing the lower part of the image "A" and the lower part of the image "B". The printing is then restarted after the reading operations for image "C" in the third sheet of original and image "D" in the fourth sheet of original are finished.

FIG. 22B is a diagram for illustrating another 4-up printing. In this figure, the order in which the images are arranged is different compared to the case for the above-mentioned 4-up printing. In this case, printing cannot be started until the image "C" in the third sheet of original is read. That is, in case of 4-up printing, the 4-up printing in FIG. 22A, in which the images that have been read are arranged parallel to the scanning direction of the writing carriage, is advantageous because it is possible to start printing earlier. In 4-up printing in FIG. 22B, however, similar effects can be obtained in terms that it is possible to start printing before reading the image "D" in the fourth sheet of original. In this 4-up printing, however, it is necessary to reserve, in the memory (SDRAM 56 or SDRAM 69), area that can store data for three images.

As is clear from the 4-up printing, the number of sheets of originals and the number of images printed on paper may be four. Further, the number of sheets of originals and the number of images printed on paper may be any number. For example, N images may be read from N sheets of originals, and a print image in which N images are arranged on paper may be printed (N-up printing). In this case, it would advantageous if the images that have been read are arranged on the paper parallel to the scanning direction of the writing carriage 36, because it would possible to start printing earlier.

<About the Print Mode>

The print mode according to the above-described embodiment was defined as determining which of either monochrome or color the image in each of the pages, which are printed arranged in one sheet of paper, is to be printed in; however, the print mode is not limited to this as far as it is a parameter for defining print specifications of an image. For example, the above-mentioned quality mode for defining the print resolution of the image may be used as the print mode. That is, it is possible to configure the apparatus so that the print resolution can be set to be different for each page by entering, from the above-mentioned control panel section 70, the quality mode of the image for the page corresponding to each original every time the reading operation is performed for each of the originals.

According to such a configuration, printing can be performed by changing the above-mentioned print resolution of the image for each page, and therefore, it is possible to improve the flexibility in the expression of printing on paper.

<About the Medium>

The medium according to the above-described embodiment was a sheet of paper; however, it is not limited to this as long as it is a single medium in which the above-mentioned images for a plurality of pages can be arranged and printed in predetermined positions. For example, it may be a sheet of cloth, film, and so forth, and further, it may be a medium of a three-dimensional shape such as a can.

<About Image Data Corresponding to One Page>

The image data corresponding to one page according to the above-described embodiment was read data for one sheet of original that has been read by the scanner section 10; however, the image data is not limited to this as long as it is data that enables printing of a predetermined image with respect to each print area formed by dividing the surface of a sheet of paper into equal parts. For example, the concept of the image data includes text data (document data that is made up only of character information) that enables printing of a page of document.

<About the Method for Obtaining Image Data>

In the above-described embodiment, the RGB image data (read data) was obtained by reading the original with the scanner section 10; however, the method for obtaining image data is not limited to this. For example, a data reading section for reading image data from a recording medium such as a memory card may be provided on the above-mentioned SPC multifunction apparatus 1, and N-up printing may be performed based on N pieces of image data that have been read.

<About the Nozzles>

In the foregoing embodiments, ink was ejected using piezoelectric elements; however, the method for ejecting liquid is not limited to this. Other methods may also be employed, such as a method for generating bubbles in the nozzles using heat.

<About the Standby Mode>

According to the above-described embodiment, the printing operation entered a standby state before printing of the image "A" is finished. The timing for the standby state, however, is not limited to this.

Figure 23B:
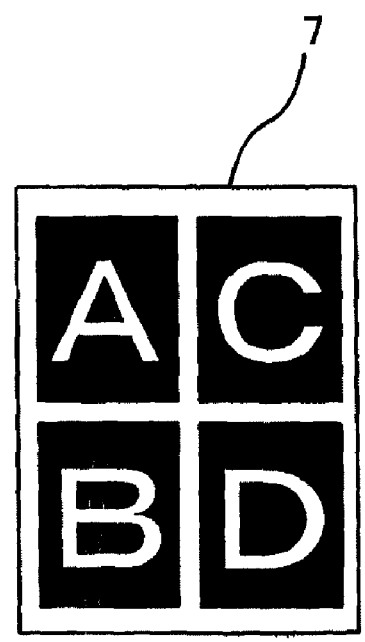
Figure 24:
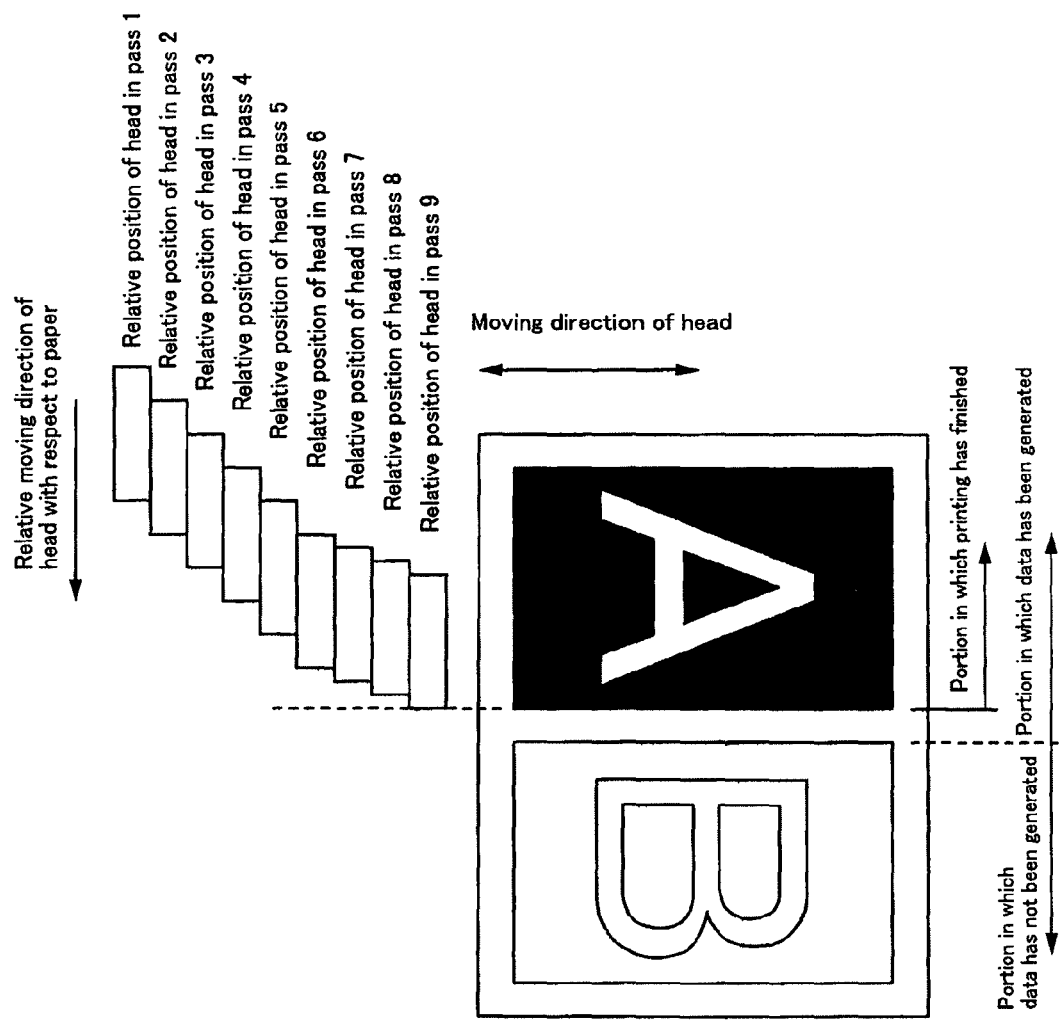
FIG. 24 is an explanatory diagram of another print mode.

FIG. 23 is a diagram for illustrating another print mode. According to this figure, the relative movement distance of the head from pass 6 through pass 9 is made small compared to the relative movement distance between each pass for the prior passes. In this way, it is possible to print the image "A" regardless of whether the head-drive data for the image "B" is going to be generated or not. If the reading operation for the image "B" has not been started when printing of the image "A" is finished, the carrying operation of the paper 7 (or the printing operation of ejecting ink from the nozzles) is brought into a standby state until the reading operation for the image "B" is started. Accordingly, the timing for the standby state may be after printing of the image "A" is finished.

According to this embodiment, since the operation does not enter the standby state in the middle of printing the image "A", it is possible to prevent the image from deteriorating due to differences in the printing state (such as the difference in the way the ink dries before and after standby).

On the other hand, if there is not much of a difference in drying of ink, then the above-described embodiment allows the entire image "A" to be printed evenly because the relative movement distance of the head before and after entering the standby state is constant (or the relative movement distance of the head before and after printing the joining section between the image "A" and the image "B" is constant).

<About the Margins>

In the above-described embodiment, margin portions were provided between the image and the ends (the upper end or side ends) of the paper. Further, in the above-described embodiment, a margin portion was provided between the images. The margin portions, however, do not have to be provided. It should be noted that when no margin is provided between the image and the ends of the paper, then it is preferable not to provide a margin between the images.

Further, in the above-described embodiment, a margin was simply provided between the images. However, a cut-off line may be provided in the margin portion. This enables easier cutting when the plurality of images printed on the paper are cut.

Second Embodiment

Below, the second embodiment is described in detail with reference to FIG. 25 through FIG. 33. As described below, in the present embodiment, the print mode that is used for the first image is used for all the other images when a plurality of images are read and when they are laid out and printed on a piece of print-recording medium.

Figure 25:
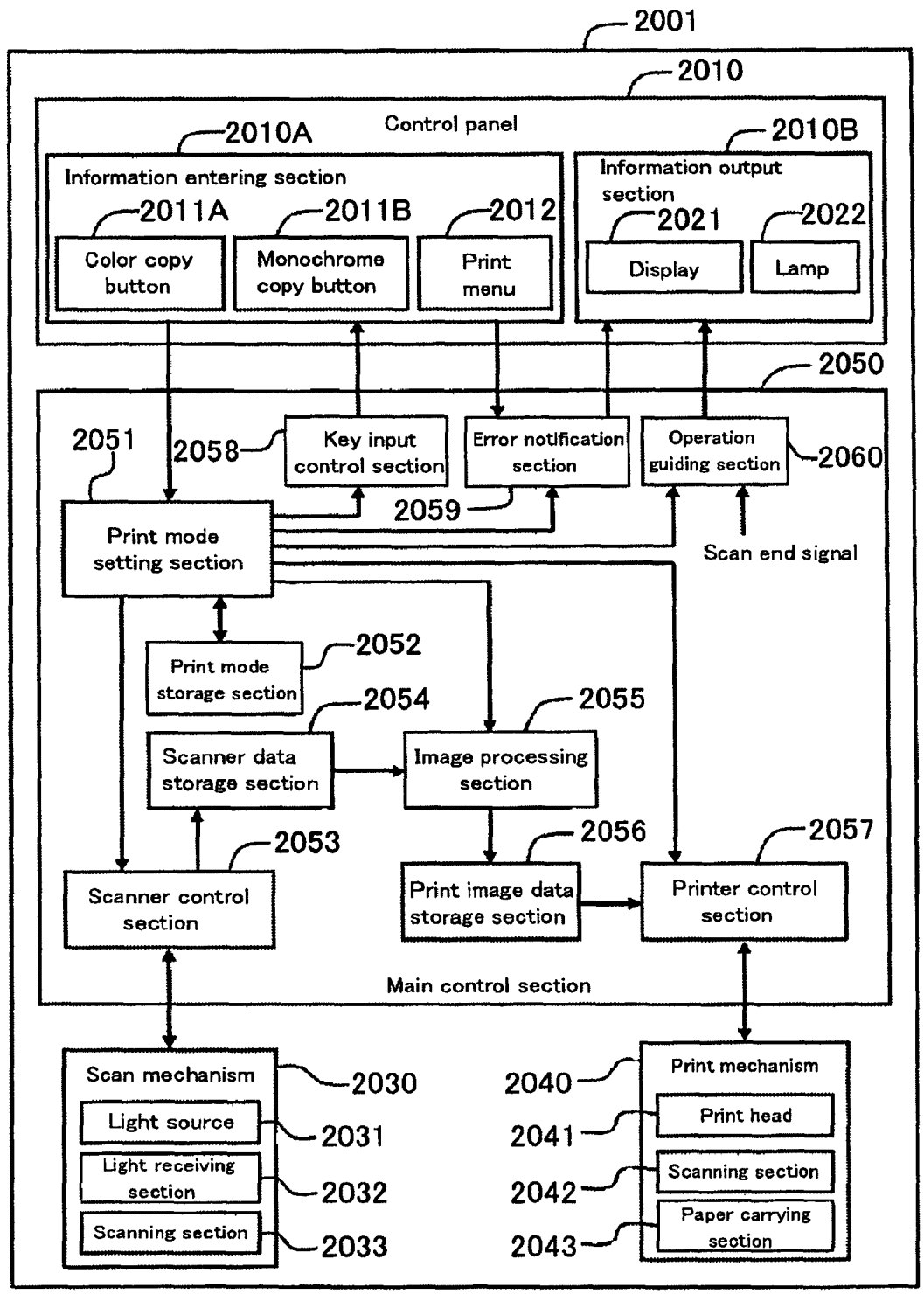
FIG. 25 is a block diagram showing a functional configuration of an SPC multifunction apparatus according to a second embodiment.

FIG. 25 is a block diagram showing a configuration of functions of the SPC multifunction apparatus 2001 according to the present example. The SPC multifunction apparatus 2001 (the SPC multifunction apparatus is also a type of printer) is configured to include a control panel 2010, a scan mechanism 2030, a print mechanism 2040, and a main control section 2050, as will be described later. More specifically, the SPC multifunction apparatus 2001 at least comprises a scanner function for reading an image from an original and turning the image into digital data, and a printer function (a copier function) for printing the digital data that has been read on print paper. Further, although this is omitted from the figures, the SPC multifunction apparatus 2001 comprises, for example, the function of receiving image data from a computer device, such as a digital camera and a personal computer, and printing it. Further, other than this, the SPC multifunction apparatus 2001 can read in image data from an attachable/detachable memory device (not shown) and print this, or write the image data read with the scanner function into the memory device; description of these functions is omitted because they are not the main points of the present invention.

Further, it should be noted that the present SPC multifunction apparatus 2001 does not have an automatic document feeder (ADF). The present SPC multifunction apparatus 2001 improves the user operability etc. in cases where the user manually changes originals so that a plurality of images are read and they are printed together on a piece of print-recording medium, without using an ADF.

The control panel 2010 is provided on the surface of the SPC multifunction apparatus 2001 in consideration of visibility and operability, and provides a man-machine interface having an information entering section 2010A and an information output section 2010B. The information entering section 2010A includes, for example, a plurality of information entering means such as a color copy button 2011A, a monochrome copy button 2011B, and a menu button 2012. The information output section 2010B includes, for example, a display 2021 and a lamp 2022. It should be noted that details on the control panel 2010 will be described later with FIG. 28.

The scan mechanism 2030 is provided, for example, in the upper section of the SPC multifunction apparatus 2001. The scan mechanism 2030 comprises a light source 2031, a light receiving section 2032, and a scanning section 2033 for making the light receiving section 2032 move in a predetermined direction. This scan mechanism 2030, an original bed 2035, an original bed cover 2034, and a scanner control section 2053, which are described later, structure a scanner device. The light receiving section 2032 can be made up, for example, of a plurality of line CCDs (Charge Coupled Device), each having RGB color filters. The types of color filters, however, is not limited to RGB. The light from the light source 2031 is reflected from the surface of an original and becomes reflected light that includes the color of the object. The reflected light reaches the light receiving section 2032, via a lens, reflection mirrors, and so forth, and is converted by the light receiving section 2032 into electric signals. The structure of the optical system of the scanner device is not limited to the above and various structures may be adopted. For example, it is possible to use a reduced-size optical system made up of CCDs shorter than the image-reading surface of the original bed 2035, a lens, and a plurality of reflection mirrors, or it is possible to use CCDs having substantially the same length as the image-reading surface. Alternatively, it is possible to structure the system using spectral elements such as a diffraction grating.

The print mechanism 2040 is provided, for example, in the lower section of the SPC multifunction apparatus 2001. The print mechanism 2040 comprises a print head 2041, a scanning section 2042 for making the print head 2041 move in a predetermined direction, and a paper carrying section 2043 for carrying print paper. This print mechanism 2040, a paper supply tray 2044, a paper discharge tray 2045, and a printer control section 2057, which are described later, structure a printer device. The print head 2041 is structured comprising, for example, a multitude of nozzles for ejecting ink droplets in each colors, for example, of cyan, magenta, yellow, and black, and drive elements for making each of the nozzles eject ink droplets. The scanning section (carriage) 2042 comprises a carriage motor etc., and makes the print head 2041 move back and forth in a main-scanning direction that is orthogonal to the print-paper carrying direction (sub-scanning direction). The paper carrying section 2043 comprises a paper end detecting sensor, a paper feed motor, etc., and carries the print paper by predetermined amounts. The print mechanism 2040 can be structured to be, for example, a serial type print engine that enables printing character by character, or a line type print engine that enables printing line by line.

The main control section 2050 is configured as a microcomputer system comprising, for example, a processing unit (CPU etc.), memory devices (ROM, RAM, etc.), input/output circuits, and so forth. Further, the main control section 2050 may comprise a dedicated hardware circuit (ASIC (Application Specific Integrated Circuit)) for executing certain processing. The main control section 2050 comprises a print mode setting section 2051, a print mode storage section 2052, the scanner control section 2053, a scan data storage section 2054, an image processing section 2055, a print image data storage section 2056, the printer control section 2057, a key input control section 2058, an error notification section 2059, and an operation guiding section 2060, each of which being described later. These functions are achieved by hardware circuits or software, or through cooperation of hardware circuits and software.

The print mode setting section 2051 is for applying, to image reading and image printing, the print mode (copy mode) that is first instructed through either the color copy button 2011A or the monochrome copy button 2011B of the control panel 2010. The initially instructed print mode is stored in the print mode storage section 2052. The print mode storage section 2052 is formed, for example, from a memory device such as a RAM.

The scanner control section 2053 is for making the scan mechanism 2030 drive to read the image in the original placed on the original bed 2035 when execution of printing is instructed through either the color copy button 2011A or the monochrome copy button 2011B during the later-described N-up printing. The scanner control section 2053 stores the image data (scan data), which has been read, in the scan data storage section 2054. The scan data storage section 2054 is configured, for example, from a memory device such as a RAM.

The image processing section 2055 reads in the scan data stored in the scan data storage section 2054 to generate image data for printing by performing predetermined image processing. The print image data generated by the image processing section 2055 is stored in the print image data storage section 2056. The print image data storage section 2056 may be structured, for example, from a memory device such as a RAM. The image processing section 2055 generates the print image data for driving the print head 2041 by performing, for example, color conversion processing from the RGB color system to the CMYK color system, size-enlargement processing, size-reduction processing, turning processing, various kinds of correction processing, and halftone processing. The printer control section 2057 obtains the print image data from the print image data storage section 2056, transfers it to the print head 2041, and makes the head perform predetermined printing. Further, the printer control section 2057 also controls the operation of the scanning section 2042 and the paper carrying section 2043.

The key input control section 2058 is for setting, as valid, only button operations corresponding to the print mode that has been initially designated by the user when N-up printing is performed, that is, the print mode that is set by the print mode setting section 2051, and setting operations of other buttons as invalid. For example, when the initially designated print mode is the color mode, only operations of the color copy button 2011A are regarded as valid in the operations for the second time and thereafter, whereas operations of the monochrome copy button 2011B are regarded as invalid. In the same way, when the button that is initially operated by the user in N-up printing is the monochrome copy button 2011B, only operations of the monochrome copy button 2011B are regarded as valid in the operations for the second time and thereafter, whereas operations of the color copy button 2011A are regarded as invalid. In the present example, the validation/invalidation of key input operations is controlled electrically or by software. However, this is not a limitation, and a configuration in which the button operations are controlled mechanically may also be adopted.

The error notification section 2059 is for issuing predetermined warnings when a button corresponding to a print mode other than the print mode that is set by the print mode setting section 2051, that is, the print mode that has been initially selected by the user in N-up printing (which can also be referred to as the initially selected print mode) is operated. For example, when the color copy button 2011A has been operated first and the color mode has been set, the error notification section 2059 displays an error message on the display 2021 if the user operates the monochrome copy button 2011B. In the same way, when the monochrome mode has been set, the error notification section 2059 displays an error message on the display 2021 if the user operates the color copy button 2011A. Displaying of an error message on the display 2021 is not a limitation, and an error may be notified to the user, for example, by reading out a warning sentence with a voice synthesizer, or by lighting up the lamp 2022.

The operation guiding section 2060 is for notifying the user of the print mode that is set by the print mode setting section 2051 in the second operation and thereafter when N-up printing is performed. For example, when receiving a scan-finished signal from the scanner control section 2053, the operation guiding section 2060 displays, before the next operation is performed, the initially set print mode on the display 2021 to call the user's attention. For example, when the user's first execution instruction is the color mode, the operation guiding section 2060 displays, after reading of the image in the original according to this first execution instruction is finished, a message on the display 2021 to give some advice for the next execution instruction, and prompts the user to operate the color copy button 2011A.

Figure 26:
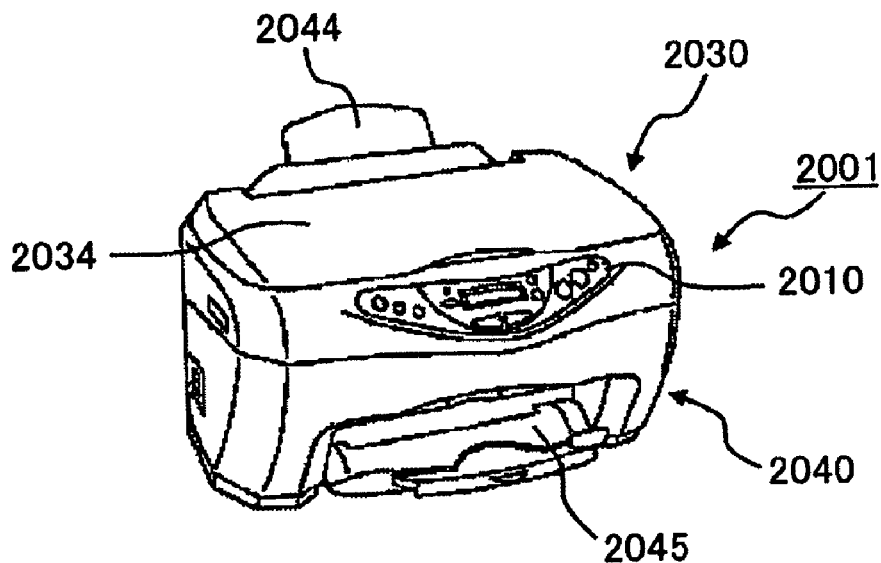
FIG. 26 is an external diagram of the SPC multifunction apparatus in a state in which an original bed cover is closed.
Figure 27:
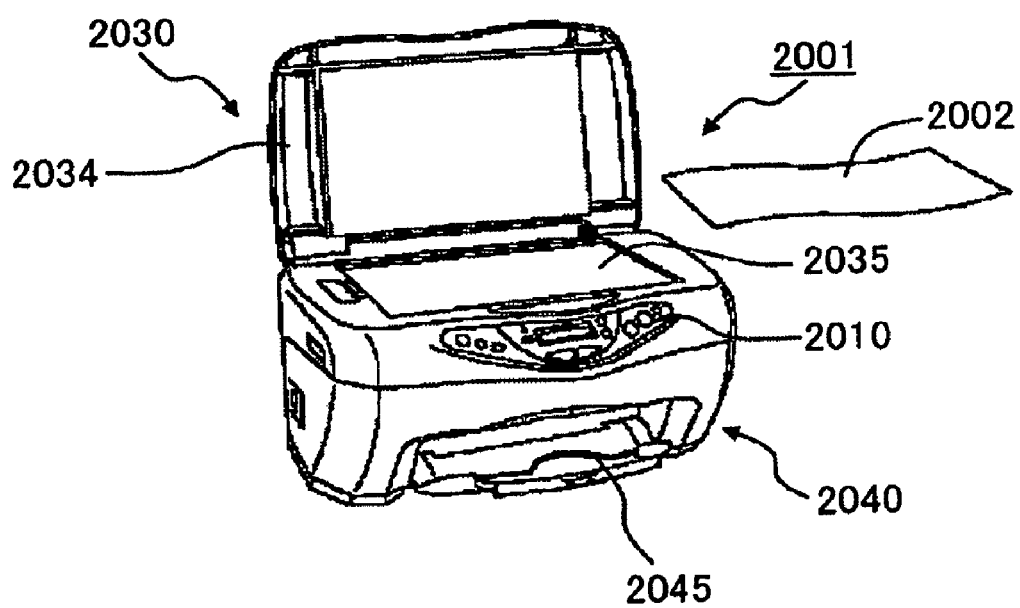
FIG. 27 is an external diagram of the SPC multifunction apparatus in a state in which an original bed cover is opened.

Next, an external configuration of the SPC multifunction apparatus 2001 is described according to FIG. 26 and FIG. 27. FIG. 26 shows a state in which the original bed cover 2034 is closed. The scan mechanism 2030 is provided in the upper section of the SPC multifunction apparatus 2001, and the print mechanism 2040 is provided in the lower section of the SPC multifunction apparatus 2001. Further, the control panel 2010 is provided on the front face in the upper section of the SPC multifunction apparatus 2001. Furthermore, the paper supply tray 2044 is provided on the rear surface of the SPC multifunction apparatus 2001, and the paper discharge tray 2045 is provided on the front face in the lower section of the SPC multifunction apparatus 2001. The SPC multifunction apparatus 2001 is configured in this way as a multifunction apparatus that has the scan mechanism 2030 and the print mechanism 2040 built into the same housing.

FIG. 27 shows a state in which the original bed cover 2034 is opened. When the original bed cover 2034 is opened, the original bed 2035 appears in the upper section of the SPC multifunction apparatus 2001. The original bed 2035 is formed, for example, in a flat shape from transparent glass material, and below the original bed 2035 are arranged the light source 2031, the light receiving section 2032, and so forth. The user positions the original 2002 on the original bed 2035 placing its face downwards, closes the original bed cover 2034, and instructs the scanning to start. When image reading is finished, the user opens the original bed cover 2034, takes out the original 2002 from the original bed 2035, and places a new original 2002 on the original bed 2035. In the present example, since the scan range is determined in beforehand, a new image is read by changing originals 2002. However, this is not a limitation, and it is also possible to read a plurality of images from the same original 2002 if it is possible to variably set the scan range.

Figure 28:
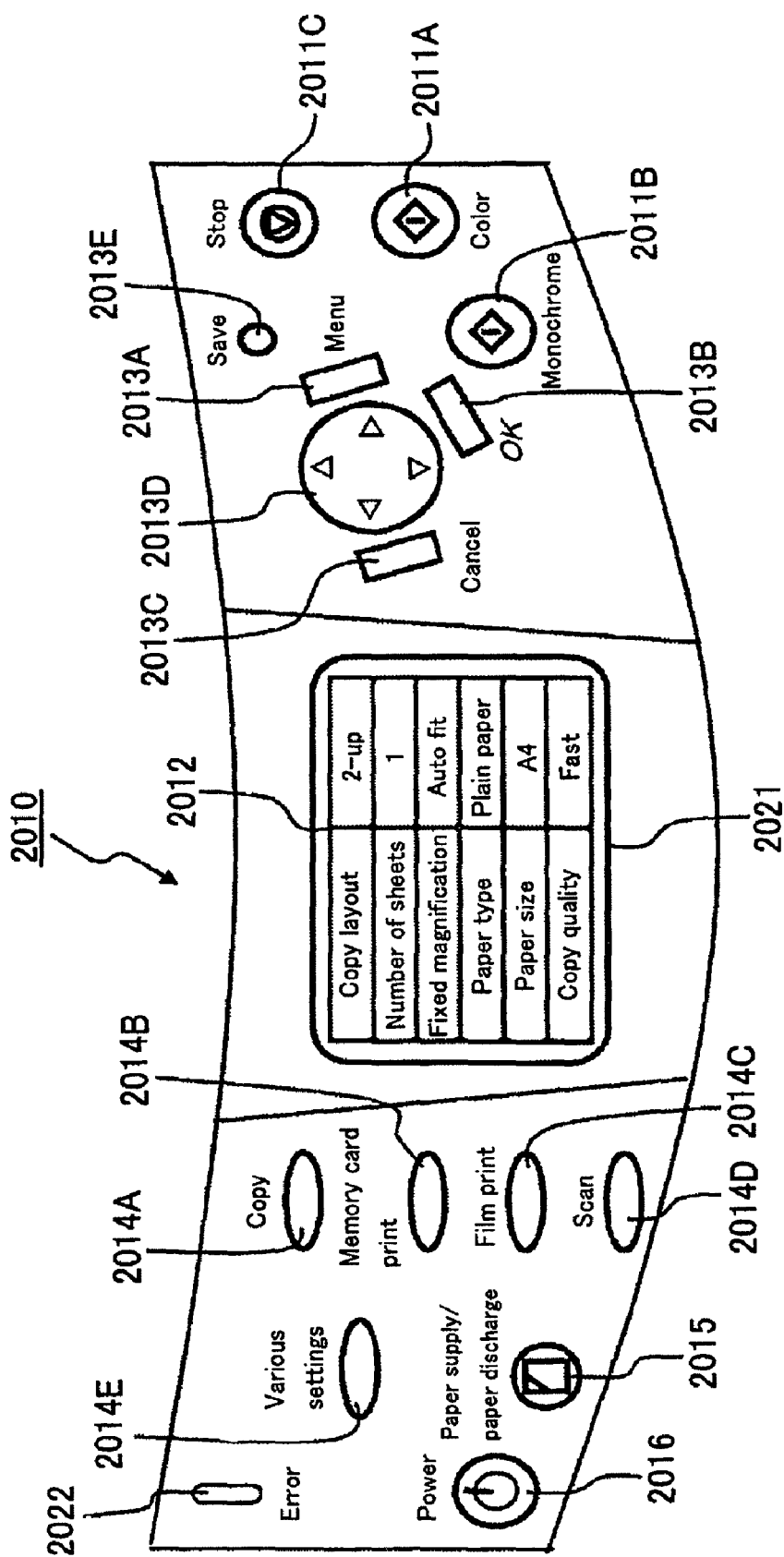
FIG. 28 is an explanatory diagram showing an example of a control panel.

FIG. 28 is an explanatory diagram showing the exterior of the control panel 2010. In the central section of the control panel 2010 is provided, for example, the display 2021 made of a liquid crystal display. The display 2021 has the ability to display, for example, seven lines by sixteen columns (full size characters). On one side of the display 2021 (towards the right in the figure), there are arranged various buttons 2011A through 2011C relating to execution instructions (relating to starting) and various buttons 2013A through 2013E relating to menu operations. On the other side of the display 2021 (towards the left in the figure), there are arranged various buttons 2014A through 2014E for selecting various processing-manner modes that can be executed during stand-alone operation, a paper supply/paper discharge button 2015, a power button 2016, and the lamp 2022 for error notification.

Functions of each of the buttons etc. are described. The color copy button 2011A is for instructing execution of color copying. The monochrome copy button 2011B is for instructing execution of monochrome copying. The color copy button 2011A and the monochrome copy button 2011D achieve both the execution instructing function for instructing the copying operation to start, and the selection function for selecting the type of image (color image or monochrome image) to be copied. The stop button 2011C is for terminating a process. The menu button 2013A is for selecting the menu to be displayed on the display 2021. The enter button 2013B is for confirming the contents of the selected instructions. The cancel button 2013C is for canceling the contents of the selected instructions. The cross key button 2013D is for the operation of switching the display contents of the items in the menu displayed on the display 2021.

The SPC multifunction apparatus 2001 of the present example includes a plurality of processing manners such as local copying, memory card printing, film printing, and scanning. The copy button 2014A is for selecting local copying. The memory card print button 2014B is for selecting the mode for reading out image data from a memory card mounted to the SPC multifunction apparatus 2001 and printing it. The film print button 2014C is for selecting the mode for reading images from a film such as a 35 mm film or a slide film and printing them. The scan mode button 2014D is the button for selecting the mode for, for example, recording an image read from an original into a memory card mounted on the SPC multifunction apparatus 2001, sending such an image to a host computer, and so forth. The various settings button 2014E is, for example, for adjusting the contrast of the display 2021, cleaning the print head 2041 and checking the nozzles thereof, displaying details on the remaining amount of ink, exchanging ink cartridges, and so forth.

Further, the paper supply/paper discharge button 2015 is for instructing paper supply operations and paper discharge operations. The power button 2016 is for controlling power supply to the SPC multifunction apparatus 2001. The lamp 2022 is for calling the user's attention by lighting up in case an error occurs.

Next, operations of the present example are described with reference to FIG. 29 through FIG. 33. First, a summary of N-up printing is described according to FIG. 29 and FIG. 30. N-up printing as used in this example is for laying out and printing N pieces of images (N being a natural number of two or greater) on one sheet of print paper. In the present example, two images (2-up printing) or four images (4-up printing) are laid out and printed on a single sheet of image. It should be noted that, according to the relationship between the size of the images that are read and the size of the print paper on which the plurality of images are printed together, the images that have been read are subjected to size-reduction processing and are arranged according to a predetermined layout for printing on the print paper.

Figure 29:
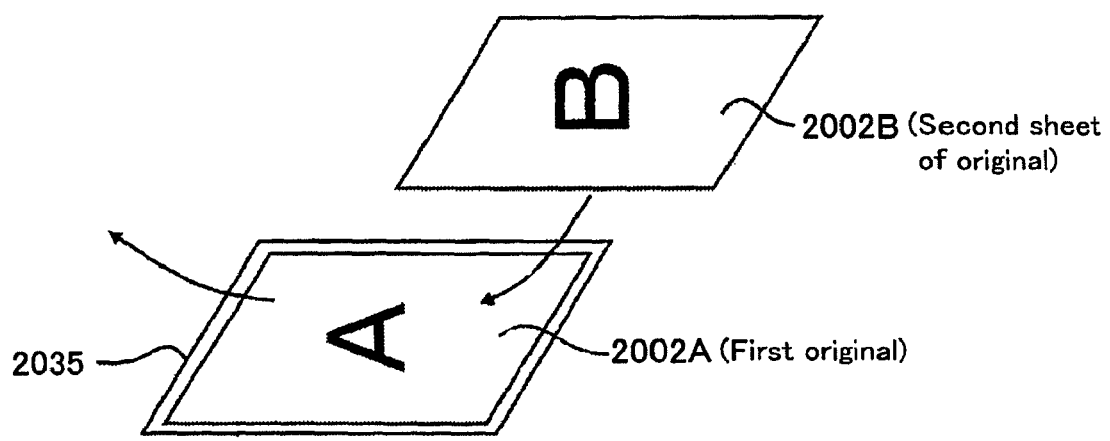
FIG. 29 is an explanatory diagram schematically showing how images are read while a plurality of originals are changed during N-up printing.

As shown in FIG. 29, when 2-up printing is performed, the first original 2002A is first placed on the original bed 2035 and an image is read therefrom. Next, after reading of the first image is finished, the first original 2002A is removed from the original bed 2035, a second original 2002B is placed on the original bed 2035, and reading of the second image is instructed.

Figure 30:
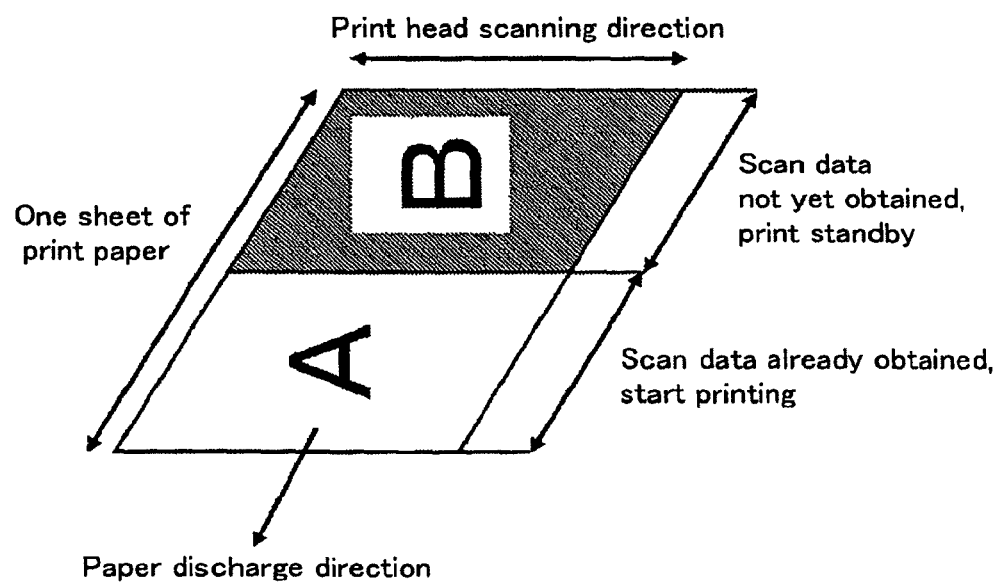
FIG. 30 is a schematic diagram showing how images that have been read are laid out and printed on one sheet of print paper.

FIG. 30 is a schematic diagram showing how two images that have been read are laid out on one sheet of print paper and printed. Each image is laid out on the print paper in, for example, the same direction as the direction in which it is placed on the original bed 2035. That is, a layout in which size-reduction processing is possible while maintaining the ratio in the vertical and horizontal directions is selected. However, this is not a limitation, and it is possible to lay the two images out according to various layouts. When the first image "A" has been read, the image processing section 2055 immediately starts generating print image data based on the first scan data. For example, when the print image data for one scan movement is generated, the print mechanism 2040 starts printing. In this way, printing is performed before reading of all the images that make up the 2-up printing is finished, but from the image that has been read. As shown by the diagonally shaded section in FIG. 30, the second image "B" is in a print-data-generation-wait (image-read-wait) state, and will not be printed just by finishing printing the first image. 2-up printing is once interrupted until the second image is read and the print image data therefor is generated. Printing is restarted when the second image has been read and the print image data has been generated. It should be noted that, if both the first image and the second image are read at once, 2-up printing is performed at once without any interruption in printing.

Figure 31:
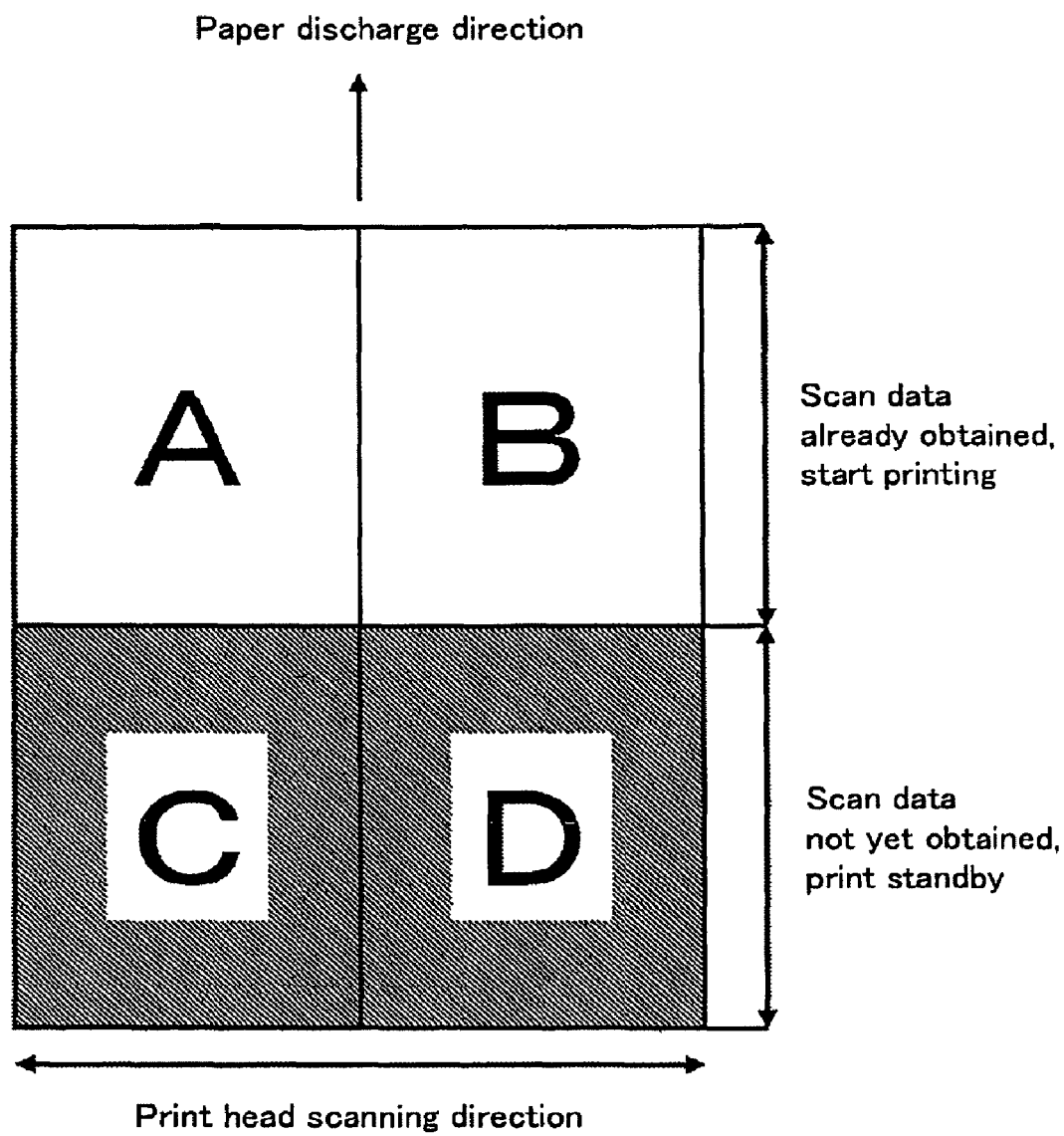
FIG. 31 is an explanatory diagram showing how four images are laid out and printed on one sheet of print paper.

4-up printing in which four images are laid out on one piece of print paper and printed is performed in the same way as 2-up printing. As shown in FIG. 31, an example in which four images are arranged in twos in the vertical and horizontal directions is described. In this case, the first image is "A", the second image is "B" the third image is "C", and the fourth image is "D". When the first and second images are read and print image data for one scan movement or a plurality of scan movements are generated; printing of the first and second images is started. The third and fourth images still have not been read, and therefore, they are in a print-wait state.

Figure 32:
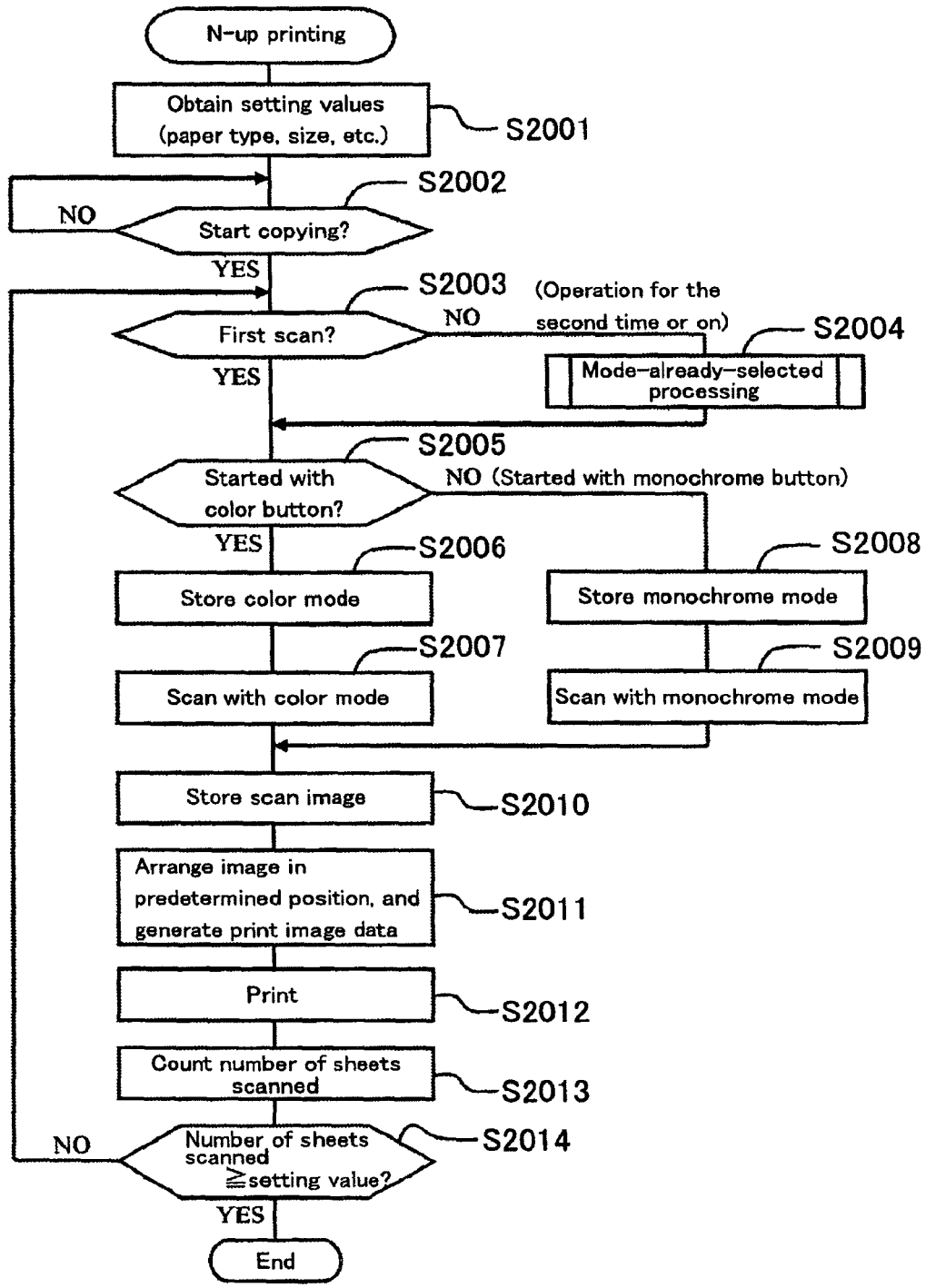
FIG. 32 is a flowchart schematically showing N-up printing processing.

FIG. 32 is a flowchart showing the N-up printing process. When the user instructs N-up printing according to the print menu 2012 displayed on the display 2021, the processes shown in FIG. 32 are started. The description below is mainly about 2-up printing.

First, the main control section 2050 obtains various setting values for N-up printing instructed by the user (S2001). It is possible to list, for example, a copy layout selection value (the selection of the number of images to be laid out on one sheet of print paper), the number of copies to be made, printing scale, type of print paper (plain paper, glossy paper, etc.), paper size, and copy quality, as the various setting values. The configuration may be that initial values, which are set in advance, are forcefully selected for some setting values among the above and those values cannot be changed.

After setting the various setting values and placing the first original on the original bed 2035, the user operates one of either the color copy button 2011A or the monochrome copy button 2011B to instruct the N-up printing to start (S2002). When either the color copy button 2011A or the monochrome copy button 2011B is operated (S2002: YES), it is determined whether or not this is the first time an image is read in the N-up printing (S2003). If it is not the first image reading (S2003: NO), the later-described mode-already-selected processing is performed.

If it is the first image reading (S2003: YES), then it is determined which of either the color copy button 2011A or the monochrome copy button 2011B has been operated (S2005). If execution of the first image reading has been instructed through the color copy button 2011A (S2005: YES), then the initially selected color mode is stored in the print mode storage section 2052 (S2006). Then, the scanner control section 2053 reads the image from the original placed on the original bed 2035 according to the color mode (S2007). On the other hand, if the user has instructed the N printing to start through the monochrome copy button 2011B (S2005: NO), the monochrome mode is stored in the print mode storage section 2052 as the initially selected print mode (S2008), and the scanner control section 2053 reads the image according to the monochrome mode (S2009). As described later, in the present example, the initially selected print mode (the color mode or the monochrome mode) is used for all of the images relating to the N-up printing.

The images that have been read by the scan mechanism 2030 according to either the color mode or the monochrome mode are stored in the scan data storage section 2054 (S2010). The image processing section 2055 reads out from the scan data storage section 2054 the images that have been read, and arranges these images according to a predetermined copy layout to generate print image data (S2011). The generated print image data is stored in the print image data storage section 2056.

When print image data for one or a plurality of number of times of scan operation(s) has been generated, the printer control section 2057 drives the print mechanism 2040 to start printing (S2012). As for 2-up printing, printing is started when the first image has been read and print image data that allows the printing to start has been generated. As for 4-up printing, printing is started when the first and second images have been read and print image data that allows the printing to start has been generated.

The main control section 2050 allows the printing to start (S2012), as well as counts the number of images that have been read (S2013). Then, the main control section 2050 determines whether or not the counted number of images that have been read has reached the number of images that has been set in S2001 (S2014). If all of the images relating to N-up printing have not been read (S2014), then the process returns to S2003, and the image reading process for the second time and thereafter is executed. That is, the user removes the first original from the original bed 2035, sets the second original, closes the cover 2034, and operates the start button (color copy button or monochrome copy button) to execute the processing for the second time and thereafter.

Figure 33:
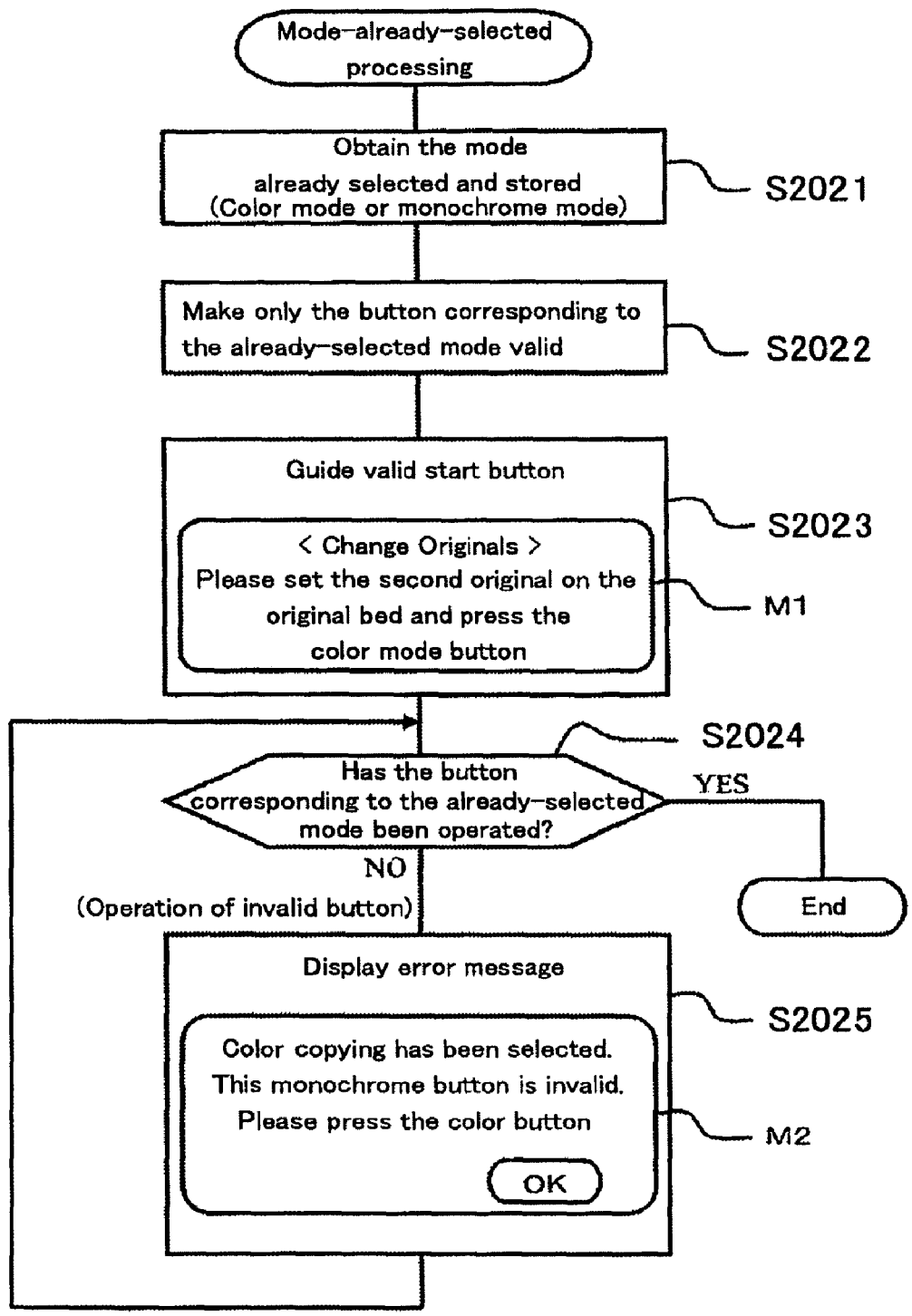
FIG. 33 is a flowchart showing mode-already-selected processing.

In the present example, S2003 and S2004 are provided for using the initially selected print mode for all of the images relating to N-up printing. As for the start operation for the second time and thereafter (S2003: NO), the mode-already-selected processing, which is shown in detail in FIG. 33, is started. In the mode-already-selected processing, first, the print mode that is stored in the print mode storage section 2052 is read out and obtained (S2021).

Next, with the key input control section 2058, only the copy button that corresponds to the already-selected print mode is made valid (S2022). Further, by displaying a guidance message M1 on the display 2021 with the operation guiding section 2060, the valid copy button is indicated to the user (S2023). As for the guidance message M1, it is possible to use a message such as "Please set the second original on the original bed and press the color mode button" (if the initially selected print mode is the color mode).

The main control section 2050 monitors whether or not the user operated the valid copy button (S2024), and if the valid copy button is operated (S2024: YES), the mode-already-selected processing is ended and the process proceeds to S2005 in FIG. 32. On the other hand, if the user operates the invalid copy button even though the guidance message M1 is shown on the display 2021 (S2024: NO), the error notification section 2059 displays an error message M2 on the display 2021 (S2025) to call the user's attention. As for the error message M2, it is possible to use a message such as "Color copying has been selected. This monochrome copy button is invalid. Please press the color copy button". The error message M2 can be made up of a section notifying the print mode that has already been selected, a section notifying the invalid copy button that has been operated, and a section indicating the valid copy button that should be operated. When the user operates the valid copy button according to this error message M2 (S2024: YES), the mode-already-selected processing ends.

According to the present embodiment configured in this way, it is possible to simplify user operations and improve usability because the initially selected print mode is used for all images for the second time and thereafter when N-up printing is performed. Particularly, the operability is improved because the initially selected print mode is automatically applied to other images, even in cases where the number of images to be laid out on a sheet of print paper is large or in cases where a task is restarted after a temporary interruption.

Further, since only the copy button corresponding to the initially selected print mode is made valid and other copy buttons are made invalid, it is possible to prevent user misoperation.

Furthermore, if the user operates an invalid copy button, it is possible to call the user's attention since an error message M2 is displayed.

Further, convenience is improved because the print mode that has been initially set is guided to the user by the guidance message M1 when images are read for the second time and thereafter.

Further, the user can get hold of the initially selected print mode as well as perform N-up printing at once, based on the print results according to prior printing because before reading all of the images relating to the N-up printing, printing is started from parts that are printable.

It should be noted that the above-mentioned embodiments are examples given for explanation, and the scope of the present invention is not to be limited only to those embodiments. Persons skilled in the art will be able to work the present invention according to various other embodiment without departing from the gist thereof.

For example, the color copy button and the monochrome copy button may be configured as light-up type buttons with built-in LED lamps etc., and it is possible to call the user's attention by lighting up or flashing only the valid copy button corresponding to the initially selected print mode.

Further, for example, it is possible to provide a sensor for detecting the opening and closing of the original bed cover 2034, and when operations are performed for the second time and thereafter, it is possible to instruct image reading and printing according to the already-set print mode at the time when the original bed cover 2034 is closed.

Furthermore, in the present example, cases in which two or four images are laid out and printed on one sheet of print paper were described; however, this is not a limitation, and it is possible to lay three, or even five or more images out on a sheet of print paper and print them.

Further, in S2001 of FIG. 32, a case in which the paper size was also obtained as one of the various kinds of setting values was described; however, it is possible to fix, to fixed values, all or some of the various setting values, such as the paper size and paper type, when N-up printing is performed.

Further, in the present embodiment, if the initially designated print mode is the color mode, only operations of the color copy button 11A were regarded as valid in the operations for the second time and thereafter, and operations of the monochrome copy button 11B were regarded as invalid. However, the method of using, for other images, the print mode that has been used for the first image is not limited to this. For example, it is possible to perform controlling so that, in operations for the second time and thereafter, only the same print mode as the print mode used for the first image is used for the rest of the images, regardless of whether the color copy button is operated or the monochrome button 86 is operated.

The printing apparatus (the SPC multifunction apparatus) of the above-described embodiments is a printing apparatus capable of laying out a plurality of images on one medium (also referred to as a print-recording medium) and printing them, and includes print mode selecting means for selecting a print mode of either a color mode or a monochrome mode, image reading means for reading an image from an original according to the selected print mode, image obtaining means for obtaining a plurality of images by making the image reading means perform its reading operation for a plurality of number of times, image data generating means for laying out the obtained plurality of images on one print-recording medium and generating print image data according to the selected print mode, printing means for printing the generated print image data on the print-recording medium, and print mode setting means for applying the print mode initially selected through the print mode selecting means to all of the plurality of images that have been read by the image reading means.

Print paper, for example, may be exemplified as the print-recording medium, but the material therefor does not matter. The printing apparatus of the present embodiment reads an image in an original using the image reading means, lays out the plurality of images obtained by a plurality of times of reading operations on one print-recording medium, and prints them. The print mode setting means applies the initially selected print mode for the series of processes for laying out and printing the plurality of images on one print-recording medium, that is, for all of the plurality of images printed together on one print-recording medium. Therefore, the user can make the image reading means read in the plurality of images, while changing originals, according to the print mode that he/she initially selected, and can obtain a printed object in which the plurality of images have been laid out on one print-recording medium. It should be noted that, for example, printed pamphlets, photographs, and so forth, can be exemplified as the originals from which images are read.

Further, particularly, the present embodiment is useful in cases where original supplying means for automatically supplying originals to the image reading means is not provided. That is, if the printing apparatus of the present invention does not comprise original supplying means for automatically supplying to the image reading means the originals on which images, which are to be read by the image reading means, are printed, the user has to change the originals manually and instruct image reading operations for a plurality of number of times in such a printing apparatus. According to the printing apparatus of the present embodiment, however, since the print mode initially selected by the user is used for all of the images, the user does not have to set the print mode every time he/she changes originals.

In the present embodiment, the print mode selecting means is configured comprising two selecting means—the color mode selecting means for executing printing in the color mode and the monochrome mode selecting means for executing printing in the above-mentioned monochrome mode—and includes mode selection controlling means for allowing only the print mode set by the print mode setting means to be selected when images are read for the second time and thereafter with the image reading means.

If the user wishes to print in the color mode, he/she instructs execution of printing through the color mode selecting means. If the user wishes to print in the monochrome mode, he/she instructs execution of printing through the monochrome mode selecting means. According to the print-execution instruction through either the color mode selecting means or the monochrome mode selecting means, the images in the originals are read by the image reading means, laid out on one print-recording medium, and printed. In this case, the print mode setting means regards as valid only the selection of the mode selecting means, among the above-mentioned mode selecting means, corresponding to the print mode initially selected by the user, and regards the selection of the other mode selecting means as invalid. Therefore, even if the user inadvertently operates the invalidated mode selecting means, it is possible to ignore such execution instructions due to misoperation.

The printing apparatus of the present embodiment comprises error notification means that provides notification of an error if a print mode different from the initially selected print mode is selected through the print mode selecting means when the images are read with the image reading means for the second time and thereafter.

As regards the method for providing notification of an error, there are methods, for example, of displaying predetermined warning messages on the display screen or reading out a warning message with a voice synthesizer. Further, it is also possible to notify the user of an error, for example, by lighting up a warning lamp or sounding a warning buzzer. Through this error notification, it is possible to call the user's attention.

The printing apparatus of the present embodiment comprises guiding means for providing guidance about the print mode that has been initially selected through the print mode selecting means when the image reading means reads images for the second time and thereafter.

As regards the guiding method, it is possible to exemplify a method, for example, of notifying to the user a predetermined message indicating the initially selected print mode through the display screen, the voice synthesizer, and so forth.

In the printing apparatus of the present embodiment, before the image reading means finishes its reading operation for a plurality of number of times, the printing means starts printing the image that has already been read.

That is, printing is started successively from the images that have been read by the image reading means, instead of starting printing after obtaining all of the plurality of images that are to be gathered in one print-recording medium. More specifically, for example, if the printing apparatus comprises serial-type or line-type printing means that starts printing character-by-character or line-by-line, the printing apparatus can start printing when print image data that allows printing to be started is obtained (for example, when print image data for one line or one band has been generated), without waiting for the other images to be read. In this way, it is possible to shorten the time until printing is started and to obtain the printed object promptly. Further, the user can confirm the initially selected print mode based on the print results on the print-recording medium that have been printed and output at a prior timing. Therefore, according to the structure in which printing is started before finishing the plurality of times of image reading operations, it is possible to use the print-recording medium as means for confirming the print mode.

A printing apparatus according to another aspect of the present embodiment comprises selecting means for selecting plural-image printing in which the obtained plurality of images are reduced in size and laid out and printed on one print-recording medium according to a predetermined layout, color-print execution instructing means for causing printing to be executed according to the color mode, monochrome-print execution instructing means that is provided independent of the color-print execution instructing means and that is for causing printing to be executed according to the monochrome mode, image reading means for reading an image from an original according to an execution instruction from either one of the color-print execution instructing means or the monochrome-print execution instructing means, print mode storing means for storing the print mode that was applied to the reading operation by the image reading means, image obtaining means for obtaining a plurality of images by making the image reading means perform its reading operation for a plurality of number of times in case plural-image printing has been selected, image data generating means for laying out the obtained plurality of images on one print-recording medium and generating print image data according to the stored print mode, printing means for printing the generated print image data on the print-recording medium, and print mode setting means for applying, to the reading operations for the second time and thereafter, the print mode stored in the print mode storing means when the image reading means executed its first reading operation.

A printing method according to another aspect of the present embodiment is a printing method for laying out a plurality of images on one print-recording medium and printing them using a printing apparatus that includes image reading means and printing means, comprising a step of selecting one print mode of either a color mode or a monochrome mode by using either one of color-print execution instructing means or monochrome-print execution instructing means that are provided separately, a step of reading an image in an original with the image reading means according to the selected print mode, a step of storing, in print mode storing means, the print mode selected for the reading operation by the image reading means for the first image, a step of obtaining a plurality of images by performing a plurality of times of reading operations applying the stored print mode to the reading operations by the image reading means for the second time and thereafter, a step of laying out the obtained plurality of images on one print-recording medium and generating print image data according to the stored print mode, and a step of printing the generated print image data on the print-recording medium with the printing means.

A computer program according to a further aspect of the present embodiment is a computer program for causing a computer that includes image reading means and printing means to execute a method for laying out a plurality of images on one print-recording medium and printing them, the program causing the computer to execute the following: a step of selecting one print mode of either a color mode or a monochrome mode, a step of reading an image in an original with the image reading means according to the selected print mode, a step of storing the print mode selected for the reading operation by the image reading means for the first image, a step of obtaining a plurality of images by performing a plurality of times of reading operations applying the stored print mode to the reading operations by the image reading means for the second time and thereafter, a step of laying out the obtained plurality of images on one print-recording medium and generating print image data according to the stored print mode, and a step of printing the generated print image data on the print-recording medium with the printing means.

What is claimed is:

1. A printing apparatus comprising:
  (A) a reading section for reading an image from an original;
  (B) a printing section for printing an image on a medium;
  (C) a storage section for storing head-drive data; and
  (D) a controlling section that, upon obtaining N pieces of images including at least a first image and a second image by making the reading section perform a reading operation for reading the images from at least one sheet of original and making the printing section perform N-up printing for printing the N pieces of images in predetermined positions on a medium, generates head-drive data based on the images having been obtained and stores the head-drive data in the storage section, and makes the printing section carry out a printing operation to perform printing on the medium based on the head-drive data stored in the storage section, the controlling section being designed in such a manner that:
  the controlling section makes the reading section start the reading operation for reading the first image and starts to store, in the storage section, first head-drive data based on the first image;
  the controlling section makes the printing section start the printing operation for performing printing on the medium based on the first head-drive data stored in the storage section;
  after printing on the medium has been started based on the first head-drive data, the controlling section suspends the printing operation while a portion of the first head-drive data that has not yet been printed is still stored in the storage section;
  while the printing operation is being suspended, the controlling section makes the reading section start the reading operation for reading the second image and starts to generate second head-drive data based on the second image;
  the controlling section stores, in the storage section, the generated second head-drive data in addition to the portion of the first head-drive data that has not yet been printed; and
  the controlling section makes the printing section restart the printing operation and makes the printing section start printing based on the first head-drive data stored in the storage section and the second head-drive data stored in the storage section.

2. A printing method in which, upon obtaining N pieces of images including at least a first image and a second image by performing a reading operation for reading the images from at least one sheet of original and performing N-up printing for printing the N pieces of images in predetermined positions on a medium, head-drive data is generated based on the images having been obtained and is stored in a storage section, and a printing operation is carried out to perform printing on the medium based on the head-drive data stored in the storage section, the method comprising:
  (1) starting the reading operation for reading the first image and starting to store, in the storage section, first head-drive data based on the first image;
  (2) starting the printing operation for performing printing on the medium based on the first head-drive data stored in the storage section;
  (3) after starting to perform printing on the medium based on the first head-drive data, suspending the printing operation while a portion of the first head-drive data that has not yet been printed is still stored in the storage section;
  (4) while the printing operation is being suspended, starting the reading operation for reading the second image and starting to generate second head-drive data based on the second image;
  (5) storing, in the storage section, the generated second head-drive data in addition to the portion of the first head-drive data that has not yet been printed; and
  (6) restarting the printing operation and starting printing based on the first head-drive data stored in the storage section and the second head-drive data stored in the storage section.

3. A printing method according to claim 2, wherein:
  when the second head-drive data is stored following the first head-drive data in the storage section, data corresponding to a margin or a cut-off line is inserted between the first head-drive data and the second head-drive data.

4. A printing method according to claim 2, wherein:
  the printing operation is carried out by driving a plurality of nozzles; and
  in step (5), a set of head-drive data for the plurality of nozzles is prepared by storing at least a portion of the second head-drive data in addition to the first head-drive data.

* * * * *